United States Patent

Murai et al.

[11] Patent Number: 5,751,438
[45] Date of Patent: May 12, 1998

[54] DATA TRANSFER METHOD AND DATA TRANSFER APPARATUS FOR IMAGE READING APPARATUS AND IMAGE READING APPARATUS WITH DATA TRANSFER APPARATUS

[75] Inventors: Yukako Murai; Akio Suzuki; Yoshio Tabata; Keiichi Saito; Tamio Amagai, all of Kawasaki, Japan

[73] Assignee: Fujitsu Limited, Kawasaki, Japan

[21] Appl. No.: 819,802

[22] Filed: Mar. 18, 1997

Related U.S. Application Data

[63] Continuation of Ser. No. 407,471, Mar. 20, 1995, abandoned.

[30] Foreign Application Priority Data

Apr. 7, 1994 [JP] Japan ................... 6-069311

[51] Int. Cl.[6] ............... H04N 1/00; H04N 1/04; G03G 15/00
[52] U.S. Cl. ............... 358/403; 358/400; 358/401; 358/408; 358/474; 399/364; 399/374
[58] Field of Search ............... 358/400, 401, 358/403, 408, 412, 425, 434, 442, 444, 448, 468, 474, 496; 399/320, 364, 374, 388, 394, 396

[56] References Cited

U.S. PATENT DOCUMENTS

| | | | |
|---|---|---|---|
| 4,908,719 | 3/1990 | Nonoyama | 358/496 |
| 5,136,665 | 8/1992 | Inoue | 358/496 |
| 5,444,554 | 8/1995 | Muramatsu et al. | 358/496 |

FOREIGN PATENT DOCUMENTS 2-311077  12/1990  Japan.
3-3564   1/1991  Japan.

Primary Examiner—Edward L. Coles, Sr.
Assistant Examiner—Kimberly A. Williams
Attorney, Agent, or Firm—Armstrong, Westerman, Hattori, McLeland & Naughton

[57] ABSTRACT

A data transfer method and apparatus for an image reading apparatus suitably used with an image scanner is improved in that a transfer line apparatus is simplified in construction and produced with a reduced cost by an improved transferring technique of data. The data transfer apparatus is incorporated in an image reading apparatus including first and second optical image reading units and comprises a storage section for storing data from a first operating one of the first and second optical image reading units from which paper image information is to be read out later, a first data transfer section for successively transferring, by way of a data transfer line, data from the first operating image reading unit, and a second data transfer section for successively transferring, after the data from the first operating image reading unit have been transferred by the first data transfer means, the data from the other later operating image reading unit stored in the storage means at a rate higher than the data transfer rate at which data are transferred by the first data transfer means by way of the data transfer line.

11 Claims, 35 Drawing Sheets

PRESENT CONTROL IS NOT PERFORMED WHEN BOTTOM SENSOR ALREADY DETECTS LOWER END OF TABLE

L1: OVERRUN AMOUNT

L2: MANUAL INSERTION OVERRUN AMOUNT
T3: MANUAL INSERTION START TIME
T4: STACKER DISCHARGE TIME AFTER START OF PAPER SUPPLY

FIG. 28

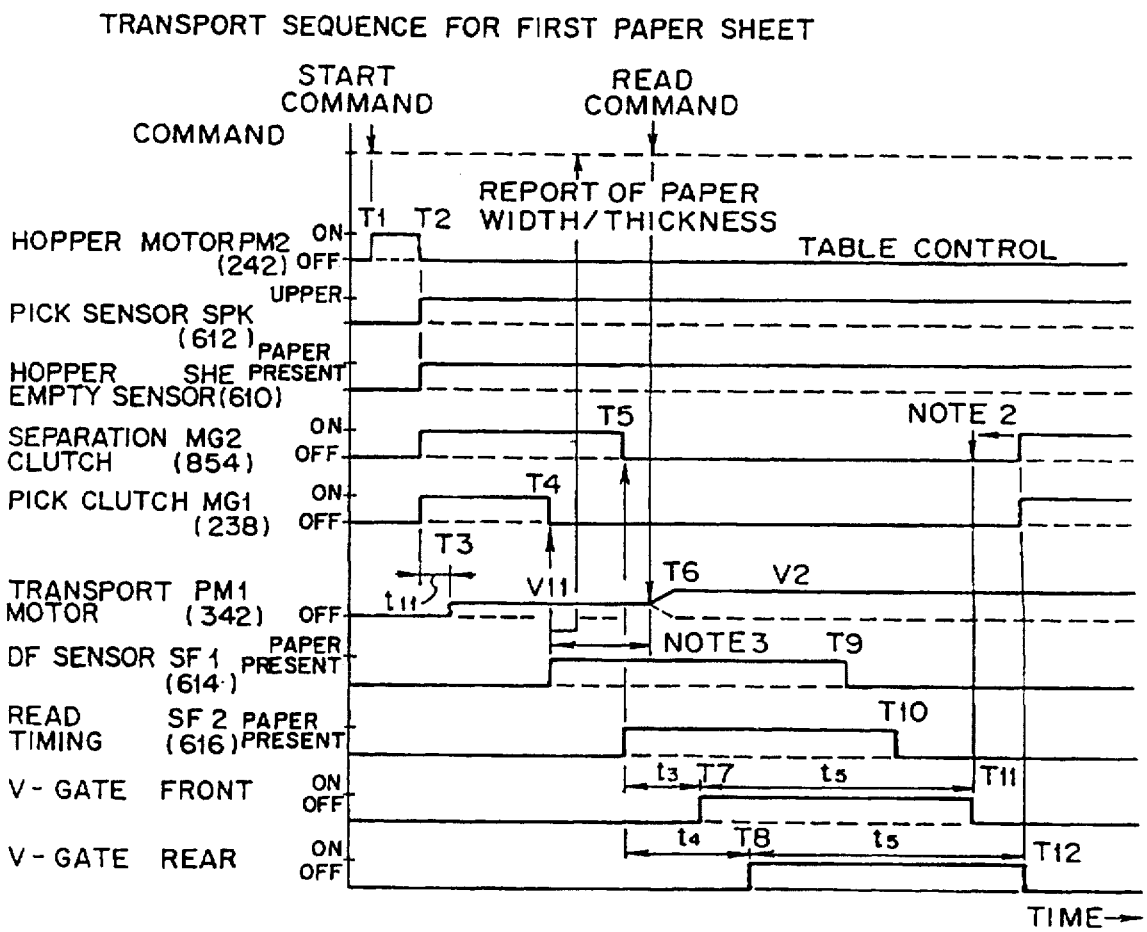

- $t_3$ ---- TIME REQUIRED FOR PAPER TO PASS FROM SF2 TO READING POINT R1  $t_3 = L_2 / V_2$
- $t_4$ ---- TIME REQUIRED FOR PAPER TRAILING END TO PASS FROM SF2 TO READING POINT R2  $t_4 = L_1 / V_2$
- $t_5$ ---- TIME REQUIRED TO FETCH IMAGE
  $t_5$ = READ LINE NUMBER × INTEGRATION TIME
- $V_1$ ---- PAPER TRANSPORT VELOCITY OF SEPARATE ROLLER (SR)
  WHEN VELOCITY FOR FIRST PAPER SHEET IS $V_{11}$, VELOCITY FOR SECOND OR FOLLOWING PAPER SHEET OF THICKNESS WITHIN SPECIFICATIONS IS SET HIGHER THAN $V_{11}$, BUT VELOCITY FOR PAPER SHEET OUTSIDE SPECIFICATIONS IS SET TO $V_{11}$
- $V_2$ ---- PAPER TRANSPORT VELOCITY OF FR1 TO FR5 ROLLERS

FIG. 29

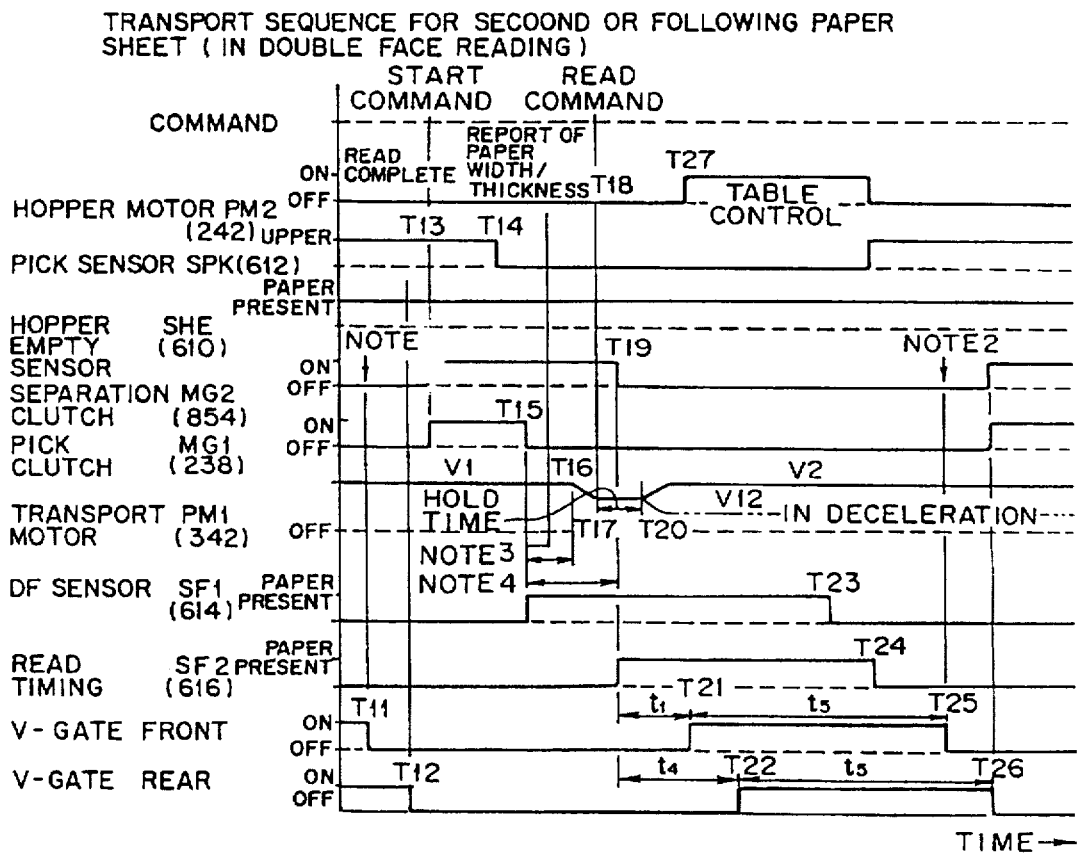

NOTE 1 : FOR ONE FACE READING, READ COMPLETE IS RETURNED WHEN V-GATE IS TURNED OFF

NOTE 2 : FOR ONE FACE READING, CLUTCH IS ENGAGED SIMULTANEOUSLY WITH TURNING OFF OF V-GATE

NOTE 3 : AFTER PS1 PULSES AFTER PAPER LEADING END PASSES SF1, DECELERATION IS STARTED, & DECELERATION IS CONTINUED TO $V_{12}$

NOTE 4 : WHEN NO READ COMMAND IS RECEIVED WITHIN PS2 (>PS1) PULSES AFTER PAPER LEADING END PASSES SF1, TRANSPORTATION IS STOPPED TO WAIT READ COMMAND. WHEN READ COMMAND IS RECEIVED WITHIN THAT PERIOD, MOTOR IS ACCELERATED OR DECELERATED IN RESPONSE TO READING SPEED.

DATA TRANSFER METHOD AND DATA TRANSFER APPARATUS FOR IMAGE READING APPARATUS AND IMAGE READING APPARATUS WITH DATA TRANSFER APPARATUS

This application is a continuation of application Ser. No. 08/407,471 filed Mar. 20, 1995, now abandoned.

BACKGROUND OF THE INVENTION

1. Field of the Invention

This invention relates to a data transfer method and a data transfer apparatus for an image reading apparatus which is suitably used with an image scanner and an image apparatus with such data transfer apparatus.

2. Description of the Related Art

In recent years, image reading apparatus as image inputting apparatus such as image scanners have been and are being developed in order to input image information to a computer (host computer) or a like apparatus.

Some of image reading apparatus conventionally proposed include a pair of optical image reading units for optically reading front face image information and rear face image information of a paper sheet. In an image reading apparatus of the both face reading type just mentioned, data from the image reading units are processed independently of each other and then sent to a host computer by way of independent transfer lines. In particular, a data output port of the apparatus has two connectors, from which different data are extracted and sent to the host computer.

With the conventional apparatus, however, because data from the image reading units are processed independently of each other and sent to a host computer by way of independent transfer lines, and particularly because two systems of transfer lines are connected to the connectors, there is a subject to be solved in that the transfer lines are complicated and a high cost is required.

SUMMARY OF THE INVENTION

It is an object of the present invention to provide a data transfer method and a data transfer apparatus wherein a transfer line apparatus is simplified in construction and produced with a reduced cost by an improved transferring technique of data and an image reading apparatus with such data transfer apparatus.

In order to attain the object described above, according to an aspect of the present invention, there is provided a data transfer method for an image reading apparatus which includes a first optical image reading unit located at a location along a paper transport path for optically reading front face image information from a paper sheet transported along the paper transport path, and a second optical image reading unit located at another location along the paper transport path for optically reading rear face image information from the paper sheet transported along the paper transport path, comprising the steps of successively transferring, by way of a data transfer line, data from a first operating image reading unit from one of the first optical image reading unit and the second optical image reading unit from which paper image information is to be read out first, temporarily storing data from a later operating image reading unit from one of the first optical image reading unit and the second optical image reading unit from which paper image information is to be read out later, and successively transferring, after the data from one of the operating image reading units have been transferred, the stored data from the later operating image reading unit at a rate higher than the transfer rate at which the data from one of the operating image reading units have been transferred.

In the data transfer method, data from one of the operating image reading units are successively transferred by way of the data transfer line, and then, data from the later operating image reading unit are temporarily stored once and then successively transferred, after the data from one of the first operating image reading unit is transferred, at the rate higher than the transfer rate of the data from the first operating image reading unit by way of the data transfer line. Accordingly, even if image reading by the later operating image reading unit is started before image reading by the one of the operating image reading unit is completed, data during the overlapping period of time can be held with certainty, and besides, data from the later operating image reading unit which are to be transferred later can be transferred rapidly to the host computer side. Consequently, even where the image reading units are disposed in the proximity of the paper transport path in order to achieve minimization, reduction in weight and compaction of the apparatus, data of the front and rear faces of a paper sheet can be transferred to the host computer side before the paper sheet is discharged to a stacking mechanism. Consequently, even if paper sheets are successively transferred at a high speed while achieving minimization, reduction in weight and compaction of the apparatus, data of the front and rear faces of each paper sheet can be read and transferred to the host computer side satisfactorily.

The data from the later operating image reading unit may be stored for one full paper sheet. This facilitates memory control.

Alternatively, data from the later operating image reading unit may be held stored until the data from the later operating image reading unit are permitted to be transferred through the image reading apparatus after outputting of the data from the first operating image reading unit for one full paper sheet has been completed. This can reduce the memory capacity.

Completion of transfer of the data from the first operating image reading unit may be detected based on paper trailing end detection information. This allows a wide variety of paper sheets of various sizes to be transported in the image reading apparatus comparatively readily in order to read information on them.

According to another aspect of the present invention, there is provided a data transfer apparatus for an image reading apparatus which includes a first optical image reading unit located at a location along a paper transport path for optically reading front face image information from a paper sheet transported along the paper transport path, and a second optical image reading unit located at another location along the paper transport path for optically reading rear face image information from the paper sheet transported along the paper transport path, comprising storage means for storing data from a later operating image reading unit from one of the first optical image reading unit and the second optical image reading unit from which paper image information is to be read out later, first data transfer means for successively transferring, by way of a data transfer line, data from a first operating image reading unit from one of the first optical image reading unit and the second optical image reading unit from which paper image information is to be read out first, and second data transfer means for successively transferring, after the data from the first operating image reading unit have been transferred by the first data transfer means, the data from the later operating image reading unit stored in the storage means at a rate higher than the data transfer rate at which data are transferred by the first data transfer means by way of the data transfer line.

In the data transfer apparatus, data from the first operating image reading unit are successively transferred by way of the data transfer line by the first data transfer means, and then, data from the later operating image reading unit are temporarily stored into the storage means once and then successively transferred, after the data from the first operating image reading unit are transferred, at the rate higher than the transfer rate of the data from the first operating image reading unit by way of the data transfer line by the second data transfer means. Accordingly, even if image reading by the later operating image reading unit is started before image reading by the first operating image reading unit is completed, data during the overlapping period of time can be held with certainty, and besides, data from the later operating image reading unit which are to be transferred later can be transferred rapidly to the host computer side. Consequently, even where the image reading units are disposed in the proximity of the paper transport path in order to achieve minimization, reduction in weight and compaction of the apparatus, data of the front and rear faces of a paper sheet can be transferred to the host computer side before the paper sheet is discharged to a stacking mechanism. Consequently, even if paper sheets are successively transferred at a high speed while achieving minimization, reduction in weight and compaction of the apparatus, data of the front and rear faces of each paper sheet can be read and transferred to the host computer side satisfactorily.

The data transfer apparatus for an image reading apparatus may further comprise auxiliary storage means for storing partial paper image information read out from the storage means between successive writing operations of data into the storage means. Where such auxiliary storage means is provided, data can be read out little by little from the storage means while giving priority to writing into the storage means, and consequently, the data transfer time can be reduced.

According to a further aspect of the present invention, there is provided an image reading apparatus with a data transfer apparatus, comprising a first optical image reading unit located at a location along a paper transport path for optically reading front face image information from a paper sheet transported along the paper transport path, a second optical image reading unit located at another location along the paper transport path for optically reading rear face image information from the paper sheet transported along the paper transport path, and a data transfer apparatus for transferring paper image information from the first optical image reading unit and the second optical image reading unit, the data transfer apparatus including storage means for storing data from a later operating image reading unit from one of the first optical image reading unit and the second optical image reading unit from which paper image information is to be read out later, first data transfer means for successively transferring, by way of a data transfer line, data from a first operating image reading unit from between the first optical image reading unit and the second optical image reading unit from which paper image information is to be read out first, and second data transfer means for successively transferring, after the data from the first operating image reading unit have been transferred by the first data transfer means, the data from the later operating image reading unit stored in the storage means at a rate higher than the data transfer rate at which data are transferred by the first data transfer means by way of the data transfer line.

In the image reading apparatus with a data transfer apparatus, data from the first operating image reading unit are successively transferred by way of the data transfer line by the first data transfer means, and then, data from the later operating image reading unit are temporarily stored into the storage means once and then successively transferred, after the data from the first operating image reading unit are transferred, at the rate higher than the transfer rate of the data from the first operating image reading unit by way of the data transfer line by the second data transfer means. Accordingly, even if image reading by the later operating image reading unit is started before image reading by the first operating image reading unit is completed, data during the overlapping period of time can be held with certainty, and besides, data from the later operating image reading unit which are to be transferred later can be transferred rapidly to the host computer side. Consequently, even where the image reading units are disposed in the proximity of the paper transport path in order to achieve minimization, reduction in weight and compaction of the apparatus, data of the front and rear faces of a paper sheet can be transferred to the host computer side before the paper sheet is discharged to a stacking mechanism. Consequently, even if paper sheets are successively transferred at a high speed while achieving minimization, reduction in weight and compaction of the apparatus, data of the front and rear faces of each paper sheet can be read and transferred to the host computer side satisfactorily.

According to a still further aspect of the present invention, there is provided a data transfer method for an image reading apparatus which includes a first optical image reading unit located at a location along a paper transport path for optically reading front face image information from a paper sheet transported along the paper transport path, and a second optical image reading unit located at another location along the paper transport path for optically reading rear face image information from the paper sheet transported along the paper transport path, comprising the steps of temporarily storing data from the first optical image reading unit and the second optical image reading unit, reading out the stored data obtained from one of the first optical image reading unit and the second optical image reading unit at a reading out rate higher than the writing rate at which the stored data have been stored and successively transferring the thus read out data by way of a data transfer line, and reading out the stored data obtained from the other of the first optical image reading unit and the second optical image reading unit at a reading out rate higher than the writing rate at which the stored data have been stored and successively transferring the thus read out data by way of the data transfer line.

In the data transfer method, data from the first operating image reading unit and the second operating image reading unit are temporarily stored once, and then the stored data obtained from one of the first optical image reading unit and the second optical image reading unit are read out at the reading out rate higher than the writing rate and successively transferred by way of the data transfer line, whereafter the stored data obtained from the other of the first optical image reading unit and the second optical image reading unit are read out at the reading out rate higher than the writing rate and successively transferred by way of the data transfer line. Accordingly, even if image reading by the later operating image reading unit is started before image reading by the first operating image reading unit is completed, data during the overlapping period of time can be held with certainty, and besides, data from the later operating image reading unit which are to be transferred later can be transferred rapidly to the host computer side. Consequently, even where the image reading units are disposed in the proximity of the paper transport path in order to achieve minimization, reduction in weight and compaction of the apparatus, data of the front and rear faces of a paper sheet can be transferred to the host computer side before the paper sheet is discharged to a stacking mechanism. Consequently, even if paper sheets are successively transferred at a high speed while achieving minimization, reduction in weight and compaction of the apparatus, data of the front and rear faces of each paper sheet can be read and transferred to the host computer side satisfactorily.

A plurality of data may be obtained from each of the first optical image reading unit and the second optical image reading unit. This allows the data transfer method to be applied to transfer of read data of, for example, a color original.

According to a yet further aspect of the present invention, there is provided a data transfer apparatus for an image reading apparatus which includes a first optical image reading unit located at a location along a paper transport path for optically reading front face image information from a paper sheet transported along the paper transport path, and a second optical image reading unit located at another location along the paper transport path for optically reading rear face image information from the paper sheet transported along the paper transport path, comprising first storage means for storing data from the first optical image reading unit, second storage means for storing data from the second optical image reading unit, first data transfer means for reading out the stored data obtained from one of the first optical image reading unit and the second optical image reading unit at a reading out rate higher than the writing rate at which the stored data have been stored and successively transferring the thus read out data by way of a data transfer line, and second data transfer means for reading out, after the data stored in the first storage means have been transferred by the first data transfer means, the stored data obtained from the other of the first optical image reading unit and the second optical image reading unit at a reading out rate higher than the writing rate at which the stored data have been stored and successively transferring the thus read out data by way of the data transfer line.

In the data transfer apparatus, data from the first operating image reading unit and the second operating image reading unit are temporarily stored once into the first storage means and the second storage means, respectively, and then the stored data obtained from one of the first optical image reading unit and the second optical image reading unit are read out at the reading out rate higher than the writing rate and successively transferred by way of the data transfer line, whereafter the stored data obtained from the other of the first optical image reading unit and the second optical image reading unit are read out at the reading out rate higher than the writing rate and successively transferred by way of the data transfer line. Accordingly, even if image reading by the later operating image reading unit is started before image reading by the first operating image reading unit is completed, data during the overlapping period of time can be held with certainty, and besides, data from the later operating image reading unit which are to be transferred later can be transferred rapidly to the host computer side. Consequently, even where the image reading units are disposed in the proximity of the paper transport path in order to achieve minimization, reduction in weight and compaction of the apparatus, data of the front and rear faces of a paper sheet can be transferred to the host computer side before the paper is sheet is discharged to a stacking mechanism. Consequently, even if paper sheets are successively transferred at a high speed while achieving minimization, reduction in weight and compaction of the apparatus, data of the front and rear faces of each paper sheet can be read and transferred to the host computer side satisfactorily.

According to a yet further aspect of the present invention, there is provided an image reading apparatus with a data transfer apparatus, comprising a first optical image reading unit located at a location along a paper transport path for optically reading front face image information from a paper sheet transported along the paper transport path, a second optical image reading unit located at another location along the paper transport path for optically reading rear face image information from the paper sheet transported along the paper transport path, and a data transfer apparatus for transferring paper image information from the first optical image reading unit and the second optical image reading unit, the data transfer apparatus including first storage means for storing data from the first optical image reading unit, second storage means for storing data from the second optical image reading unit, first data transfer means for reading out the stored data obtained from one of the first optical image reading unit and the second optical image reading unit at a reading out rate higher than the writing rate at which the stored data have been stored and successively transferring the thus read out data by way of a data transfer line, and second data transfer means for reading out, after the data stored in the first storage means have been transferred by the first data transfer means, the stored data obtained from the other of the first optical image reading unit and the second optical image reading unit at a reading out rate higher than the writing rate at which the stored data have been stored and successively transferring the thus read out data by way of the data transfer line.

In the image reading apparatus with a data transfer apparatus, data from the first operating image reading unit and the second operating image reading unit are temporarily stored once into the first storage means and the second storage means, respectively, and then the stored data obtained from one of the first optical image reading unit and the second optical image reading unit are read out at the reading out rate higher than the writing rate and successively transferred by way of the data transfer line, whereafter the stored data obtained from the other of the first optical image reading unit and the second optical image reading unit are read out at the reading out rate higher than the writing rate and successively transferred by way of the data transfer line. Accordingly, even if image reading by the later operating image reading unit is started before image reading by the first operating image reading unit is completed, data during the overlapping period of time can be held with certainty, and besides, data from the later operating image reading unit which are to be transferred later can be transferred rapidly to the host computer side. Consequently, even where the image reading units are disposed in the proximity of the paper transport path in order to achieve minimization, reduction in weight and compaction of the apparatus, data of the front and rear faces of a paper sheet can be transferred to the host computer side before the paper sheet is discharged to a stacking mechanism. Consequently, even if paper sheets are successively transferred at a high speed while achieving minimization, reduction in weight and compaction of the apparatus, data of the front and rear faces of each paper sheet can be read and transferred to the host computer side satisfactorily.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 28 is a sequence diagram illustrating operation of a transport system of the image reading apparatus of FIG. 4;

FIG. 29 is a similar view but illustrating operation of the transport system at a different stage;

DESCRIPTION OF THE PREFERRED EMBODIMENTS a. Aspects of the Invention

Figure 1:
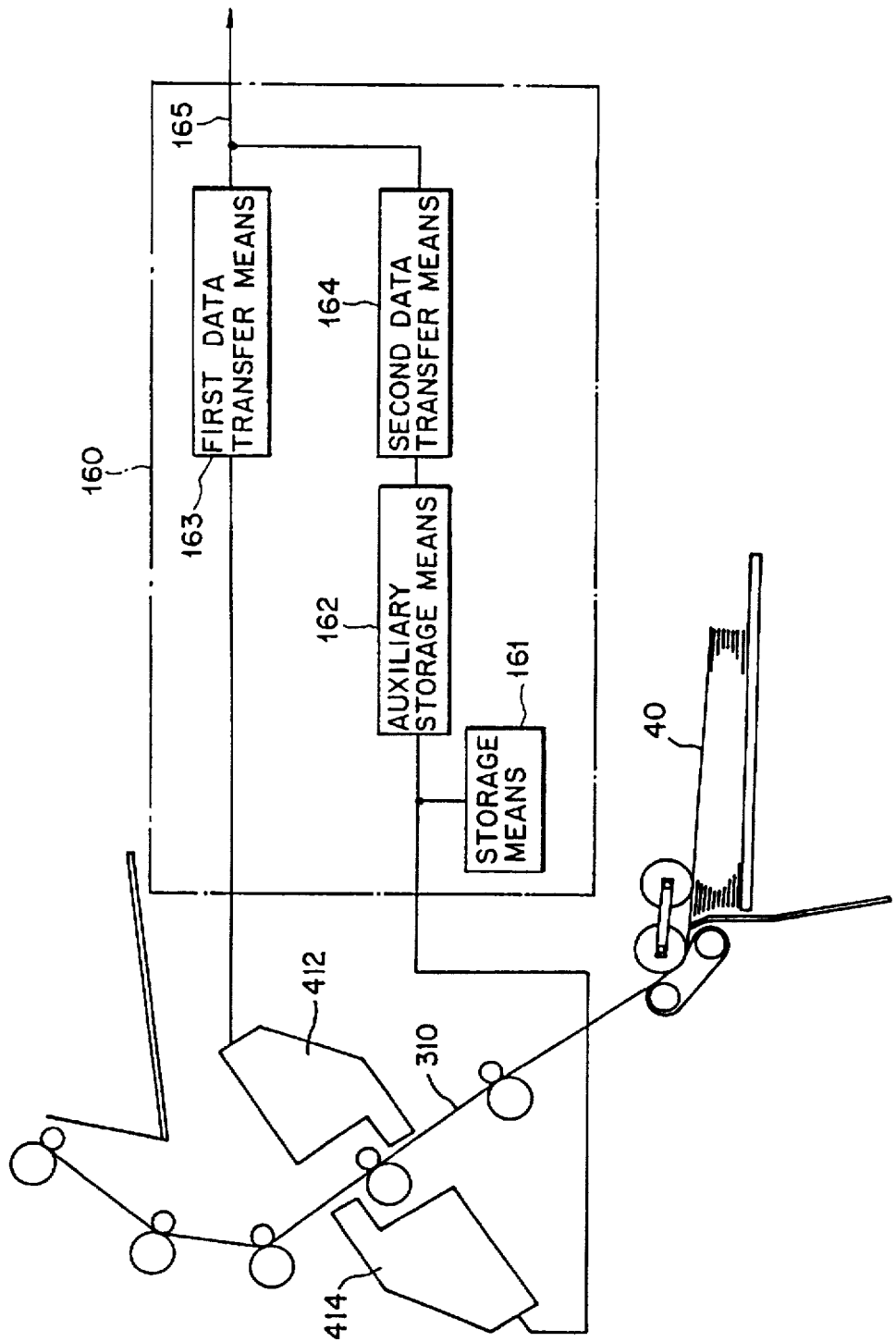
FIG. 1 is a diagrammatic view illustrating an aspect of the present invention.

Referring first to FIG. 1, there is shown an image reading apparatus with a data transfer apparatus according to an aspect of the present invention. The image reading apparatus includes a paper transport path 310 for transporting a paper sheet 40 from which an image is to be read, a first optical image reading unit 412 located at a location along the paper transport path 310 for optically reading front face image information from a paper sheet 40 transported along the paper transport path 310, and a second optical image reading unit 414 located at another location along the paper transport path 310 for optically reading rear face image information from the paper sheet 40 transported along the paper transport path 310.

The image reading apparatus is provided with a data transfer apparatus 160 for transferring paper image information from the first optical image reading unit 412 and the second optical image reading unit 414. The data transfer apparatus 160 includes storage means 161, first data transfer means 163, and second data transfer means 164.

The storage means 161 stores data from a later operating image reading unit from one of the first optical image reading unit 412 and the second optical image reading unit 414 from which paper image information is to be read out later.

The first data transfer means 163 successively transfers, by way of a data transfer line 165, data from a first operating image reading unit from one of the first optical image reading unit 412 and the second optical image reading unit 414 from which paper image information is to be read out first.

The second data transfer means 164 successively transfers, after the data from the first operating image reading unit have been transferred by the first data transfer means 163, the data from the later operating image reading unit stored in the storage means 161 at a rate higher than the data transfer rate at which data are transferred by the first data transfer means 163 by way of the data transfer line 165.

The data transfer apparatus 160 further comprises auxiliary storage means 162 for storing partial paper image information read out from the storage means 161 between successive writing operations of data into the storage means 161.

Further, a method according to the present invention is applied to such an image reading apparatus as shown in FIG. 1 which includes a first optical image reading unit 412 located at a location along a paper transport path 310 for optically reading front face image information from a paper sheet 40 transported along the paper transport path 310, and a second optical image reading unit 414 located at another location along the paper transport path 310 for optically reading rear face image information from the paper sheet 40 transported along the paper transport path 310, and comprises the steps of:

1-1. successively transferring, by way of a data transfer line 165, data from a first operating image reading unit from one of the first optical image reading unit 412 and the second optical image reading unit 414 from which paper image information is to be read out first;

1-2. temporarily storing data from a later operating image reading unit from one of the first optical image reading unit 412 and the second optical image reading unit 414 from which paper image information is to be read out later; and 1-3. successively transferring, after the data from the first operating image reading unit have been transferred, the stored data from the later operating image reading unit at a rate higher than the transfer rate at which the data from the first operating image reading unit have been transferred.

In this instance, the data from the later operating image reading unit may be stored for one full paper sheet or else may be held stored until the data from the later operating image reading unit are permitted to be transferred through the image reading apparatus after outputting of the data from the first operating image reading unit for one full paper sheet has been completed.

The data transfer method may further comprise the step of detecting completion of transfer of the data from the first operating image reading unit based on paper trailing end detection information.

In the image reading apparatus shown in FIG. 1 which includes the first optical image reading unit 412 located at a location along the paper transport path 310 for optically reading front face image information from a paper sheet 40 transported along the paper transport path 310 and the second optical image reading unit 414 located at another location along the paper transport path 310 for optically reading rear face image information from the paper sheet 40 transported along the paper transport path 310, data from the first operating image reading unit from one of the first optical image reading unit 412 and the second optical image reading unit 414 from which paper image information is to be read out first are successively transferred by way of the data transfer line 165 by the first data transfer means 163 (step 1-1), and then, data from the later operating image reading unit from one of the first optical image reading unit 412 and the second optical image reading unit 414 from which paper image information is to be read out later are temporarily stored once into the storage means 161 (step 1-2), whereafter, after the data from the first operating image reading unit have been transferred, the stored data from the later operating image reading unit are successively transferred by way of the data transfer line 165 by the second data transfer means 164 at a rate higher than the transfer rate at which the data from the first operating image reading unit have been transferred (step 1-3).

In this instance, the data from the later operating image reading unit are stored for one full paper sheet or else are held stored until the data from the later operating image reading unit are permitted to be transferred through the image reading apparatus after outputting of the data from the first operating image reading unit for one full paper sheet has been completed.

Meanwhile, partial paper image information read out from the storage means 161 between successive writing operations of data into the storage means 161 is stored into the auxiliary storage means 162.

Further, completion of transfer of the data from the first operating image reading unit is detected based on paper trailing end detection information.

According to the data transfer method, the data transfer apparatus for an image reading apparatus and the image reading apparatus with a data transfer apparatus described above, the following effects or advantages are achieved.

1. Since the data transfer apparatus for an image reading apparatus is constructed such that it comprises the storage means 161 for storing data from a later operating image reading unit from one of the first optical image reading unit 412 and the second optical image reading unit 414 from which paper image information is to be read out later, the first data transfer means 163 for successively transferring, by way of the data transfer line 165, data from a first operating image reading unit from one of the first optical image reading unit 412 and the second optical image reading unit 414 from which paper image information is to be read out first, and the second data transfer means 164 for successively transferring, after the data from the first operating image reading unit 412 have been transferred by the first data transfer means 163, the data from the later operating image reading unit stored in the storage means 161 at a rate higher than the data transfer rate at which data are transferred by the first data transfer means 163 by way of the data transfer line 165 and that data from the first operating image reading unit are successively transferred by way of the data transfer line 165, and then, data from the later operating image reading unit are temporarily stored once and then successively transferred, after the data from the first operating image reading unit are transferred, at the rate higher than the transfer rate of the data from the first operating image reading unit by way of the data transfer line, even if image reading by the later operating image reading unit is started before image reading by the first operating image reading unit is completed, data during the overlapping period of time can be held with certainty, and besides, data from the later operating image reading unit which are to be transferred later can be transferred rapidly to the host computer side. Consequently, even where the image reading units are disposed in the proximity of the paper transport path in order to achieve minimization, reduction in weight and compaction of the apparatus, data of the front and rear faces of a paper sheet can be transferred to the host computer side before the paper sheet is discharged to a stacking mechanism. Consequently, even if paper sheets are successively transferred at a high speed while achieving minimization, reduction in weight and compaction of the apparatus, data of the front and rear faces of each paper sheet can be read and transferred to the host computer side satisfactorily.

2. Where the data from the later operating image reading unit are stored for one full paper sheet, memory control is facilitated.

3. Where data from the later operating image reading unit are held stored until the data from the later operating image reading unit are permitted to be transferred through the image reading apparatus after outputting of the data from the first operating image reading unit for one full paper sheet has been completed, the memory capacity can be reduced.

4. Where completion of transfer of the data from the first operating image reading unit is detected based on paper trailing end detection information, it is comparatively easy for a wide variety of paper sheets of various sizes to be transported in the image reading apparatus in order to read information on them.

5. Where the data transfer apparatus for an image reading apparatus further comprises the auxiliary storage means 162 for storing partial paper image information read out from the storage means 161 between successive writing operations of data into the storage means 161, data can be read out little by little from the storage means 161 while giving priority to writing into the storage means 161, and consequently, the data transfer time can be reduced.

Figure 2:
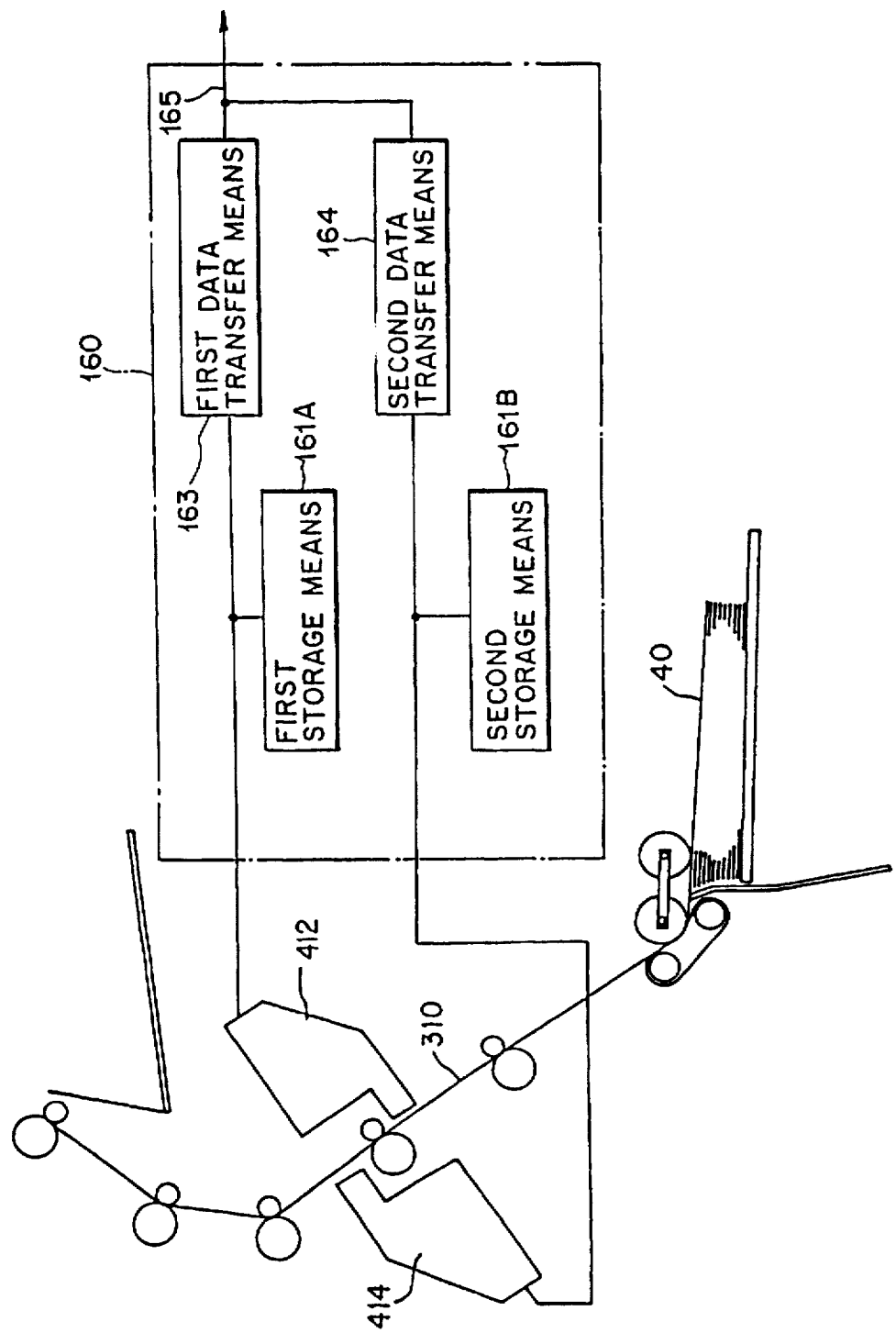
FIG. 2 is a similar view illustrating another aspect of the present invention.

Referring now to FIG. 2, there is shown an image reading apparatus with a data transfer apparatus according to another aspect of the present invention. The image reading apparatus includes a paper transport path 310 for transporting a paper sheet 40 from which an image is to be read, a first optical image reading unit 412 located at a location along the paper transport path 310 for optically reading front face image information from a paper sheet 40 transported along the paper transport path 310, and a second optical image reading unit 414 located at another location along the paper transport path 310 for optically reading rear face image information from the paper sheet 40 transported along the paper transport path 310.

The image reading apparatus is provided with a data transfer apparatus 160 for transferring paper image information from the first optical image reading unit 412 and the second optical image reading unit 414. The data transfer apparatus 160 includes first storage means 161A, second storage means 161B, first data transfer means 163, and second data transfer means 164.

The first storage means 161A stores data from the first optical image reading unit 412, and the second storage means 161B stores data from the second optical image reading unit 414.

The first data transfer means 163 reads out the stored data obtained from one of the first optical image reading unit 412 and the second optical image reading unit 414 at a reading out rate higher than the writing rate at which the stored data have been stored, and successively transfers the thus read out data by way of a data transfer line 165.

The second data transfer means 164 reads out, after the data stored in the first storage means 161A have been transferred by the first data transfer means 163, the stored data obtained from the other of the first optical image reading unit 412 and the second optical image reading unit 414 at a reading out rate higher than the writing rate at which the stored data have been stored, and successively transfers the thus read out data by way of the data transfer line 165.

Further, another method according to the present invention is applied to such an image reading apparatus as shown in FIG. 2 which includes a first optical image reading unit 412 located at a location along a paper transport path 310 for optically reading front face image information from a paper sheet 40 transported along the paper transport path 310, and a second optical image reading unit 414 located at another location along the paper transport path 310 for optically reading rear face image information from the paper sheet 40 transported along the paper transport path 310, and comprises the steps of:

2-1: temporarily storing data from the first optical image reading unit 412 and the second optical image reading unit 414;

2-2. reading out the stored data obtained from one of the first optical image reading unit 412 and the second optical image reading unit 414 at a reading out rate higher than the writing rate at which the stored data have been stored and successively transferring the thus read out data by way of a data transfer line 165; and 2-3. reading out the stored data obtained from the other of the first optical image reading unit 412 and the second optical image reading unit 414 at a reading out rate higher than the writing rate at which the stored data have been stored and successively transferring the thus read out data by way of the data transfer line 165.

It is to be noted that a plurality of data may be obtained from each of the first optical image reading unit 412 and the second optical image reading unit 414.

In the image reading apparatus shown in FIG. 2 which includes the first optical image reading unit 412 located at a location along the paper transport path 310 for optically reading front face image information from a paper sheet 40 transported along the paper transport path 310 and the second optical image reading unit 414 located at another location along the paper transport path 310 for optically reading rear face image information from the paper sheet 40 transported along the paper transport path 310, data from the first optical image reading unit 412 and the second optical image reading unit 414 are temporarily stored into the first storage means 161A and the second storage means 161B, respectively (step 2-1), and then, the stored data obtained from one of the first optical image reading unit 412 and the second optical image reading unit 414 are read out at a reading out rate higher than the writing rate and successively transferred by way of the data transfer line 165 by the first data transfer means 163 (step 2-2), whereafter the stored data obtained from the other of the first optical image reading unit 412 and the second optical image reading unit 414 are read out at a reading out rate higher than the writing rate and successively transferred by way of the data transfer line 165 by the second data transfer means 164.

In the data transfer method, a plurality of data may be obtained from each of the first optical image reading unit 412 and the second optical image reading unit 414.

According to the data transfer method, the data transfer apparatus for an image reading apparatus and the image reading apparatus with a data transfer apparatus described above, the following effects or advantages are achieved.

1. Since the data transfer apparatus is constructed such that it comprises the first storage means 161A for storing data from the first optical image reading unit 412, the second storage means 161B for storing data from the second optical image reading unit 414, the first data transfer means 163 for reading out the stored data obtained from one of the first optical image reading unit 412 and the second optical image reading unit 414 at a reading out rate higher than the writing rate and successively transferring the thus read out data by way of the data transfer line 165, and the second data transfer means 164 for reading out, after the data stored in the first storage means 161A have been transferred by the first data transfer means 163, the stored data obtained from the other of the first optical image reading unit 412 and the second optical image reading unit 414 at a reading out rate higher than the writing rate and successively transferring the thus read out data by way of the data transfer line 165 and that data from the first operating image reading unit 412 and the second operating image reading unit 414 are temporarily stored once and then the stored data obtained from one of the first optical image reading unit 412 and the second optical image reading unit 414 are read out at the reading out rate higher than the writing rate and successively transferred by way of the data transfer line 165, whereafter the stored data obtained from the other of the first optical image reading unit 412 and the second optical image reading unit 414 are read out at the reading out rate higher than the writing rate and successively transferred by way of the data transfer line 165, even if image reading by the later operating image reading unit is started before image reading by the first operating image reading unit is completed, data during the overlapping period of time can be held with certainty, and besides, data from the later operating image reading unit which are to be transferred later can be transferred rapidly to the host computer side. Consequently, even where the image reading units are disposed in the proximity of the paper transport path in order to achieve minimization, reduction in weight and compaction of the apparatus, data of the front and rear faces of a paper sheet can be transferred to the host computer side before the paper sheet is discharged to a stacking mechanism. Consequently, even if paper sheets are successively transferred at a high speed while achieving minimization, reduction in weight and compaction of the apparatus, data of the front and rear faces of each paper sheet can be read and transferred to the host computer side satisfactorily.

2. Where a plurality of data are obtained from each of the first optical image reading unit 412 and the second optical image reading unit 414, the data transfer method can be applied to transfer of read data of, for example, a color original.

b. Embodiment of the Invention

An image reading apparatus according to a preferred embodiment of the present invention will be described in detail below with reference to the accompanying drawings.

1. General Construction of the Image Reading Apparatus

Referring first to FIGS. 4 to 7, there is shown an image reading apparatus according to a preferred embodiment of the present invention. The general structure of the image reading apparatus shown can be divided into an apparatus body 10 and an apparatus lid unit 20. The apparatus lid unit 20 is mounted for pivotal motion around a fulcrum 32 to open or close the apparatus body 10. When the image reading apparatus is used, the apparatus lid unit 20 is fixed to such a closing condition as indicated by solid lines in FIGS. 4 to 6 by a body-lid unit locking mechanism 30. Various other components of the image reading apparatus are mounted on the apparatus body 10 and the apparatus lid unit 20.

Figure 4:
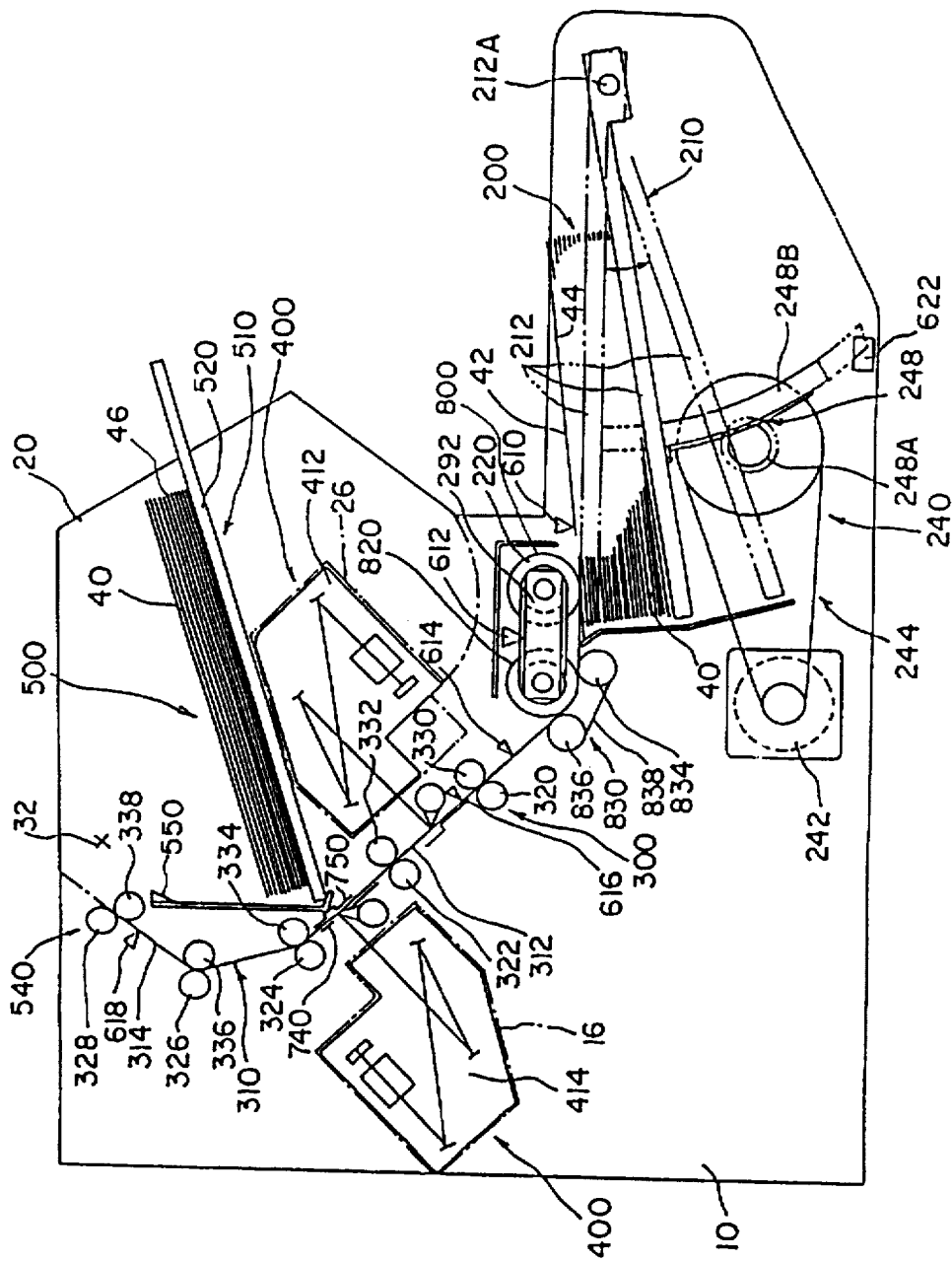
FIG. 4 is a schematic side elevational sectional view of an image reading apparatus to which the image data processing system is incorporated.
Figure 7:
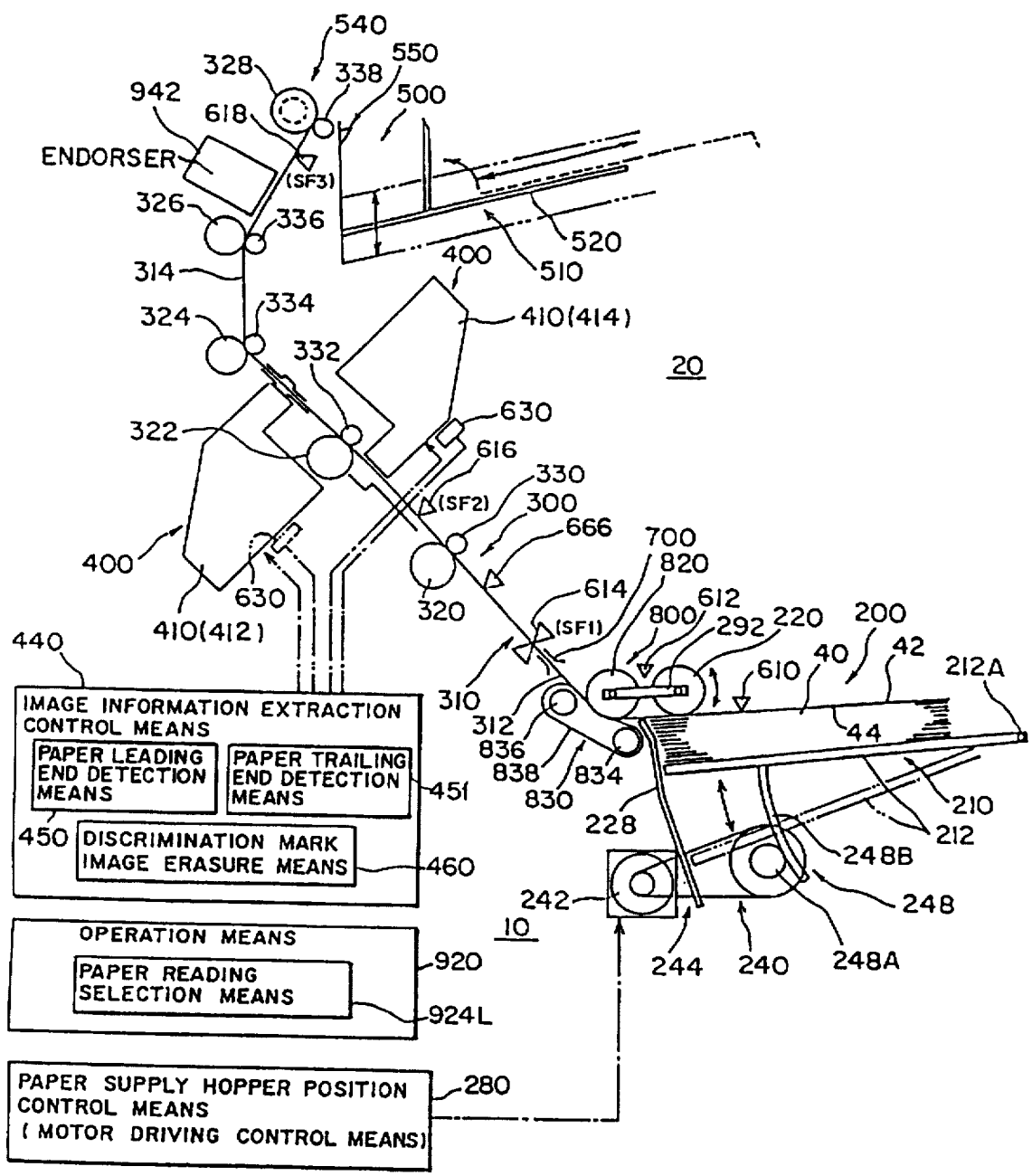
FIG. 7 is a diagrammatic view schematically showing, in side elevation, an arrangement of principal components of the image reading apparatus of FIG. 4.
Figure 8:
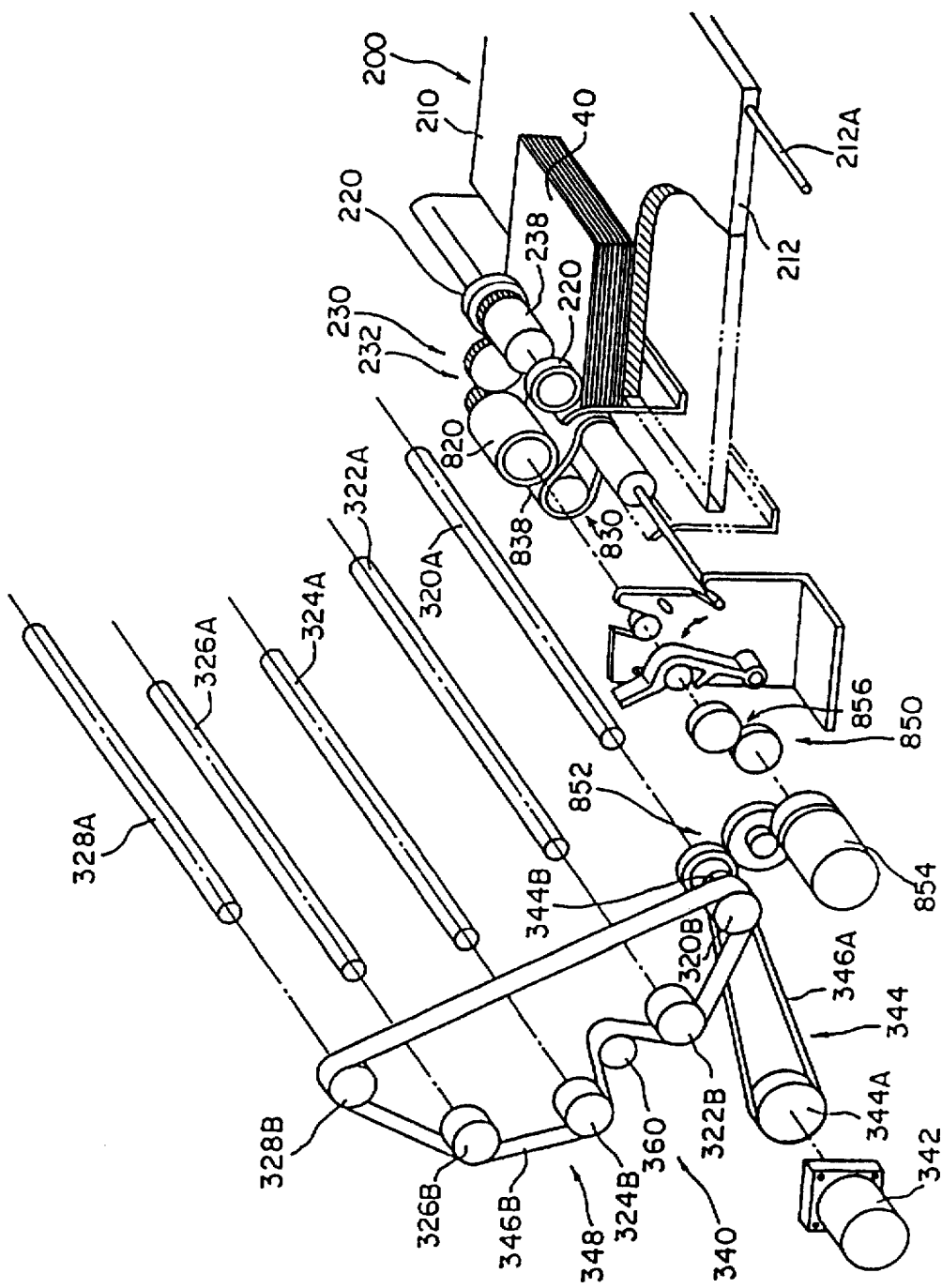
FIG. 8 is an exploded perspective view schematically showing a driving system of the image reading apparatus of FIG. 4.
Figure 9:
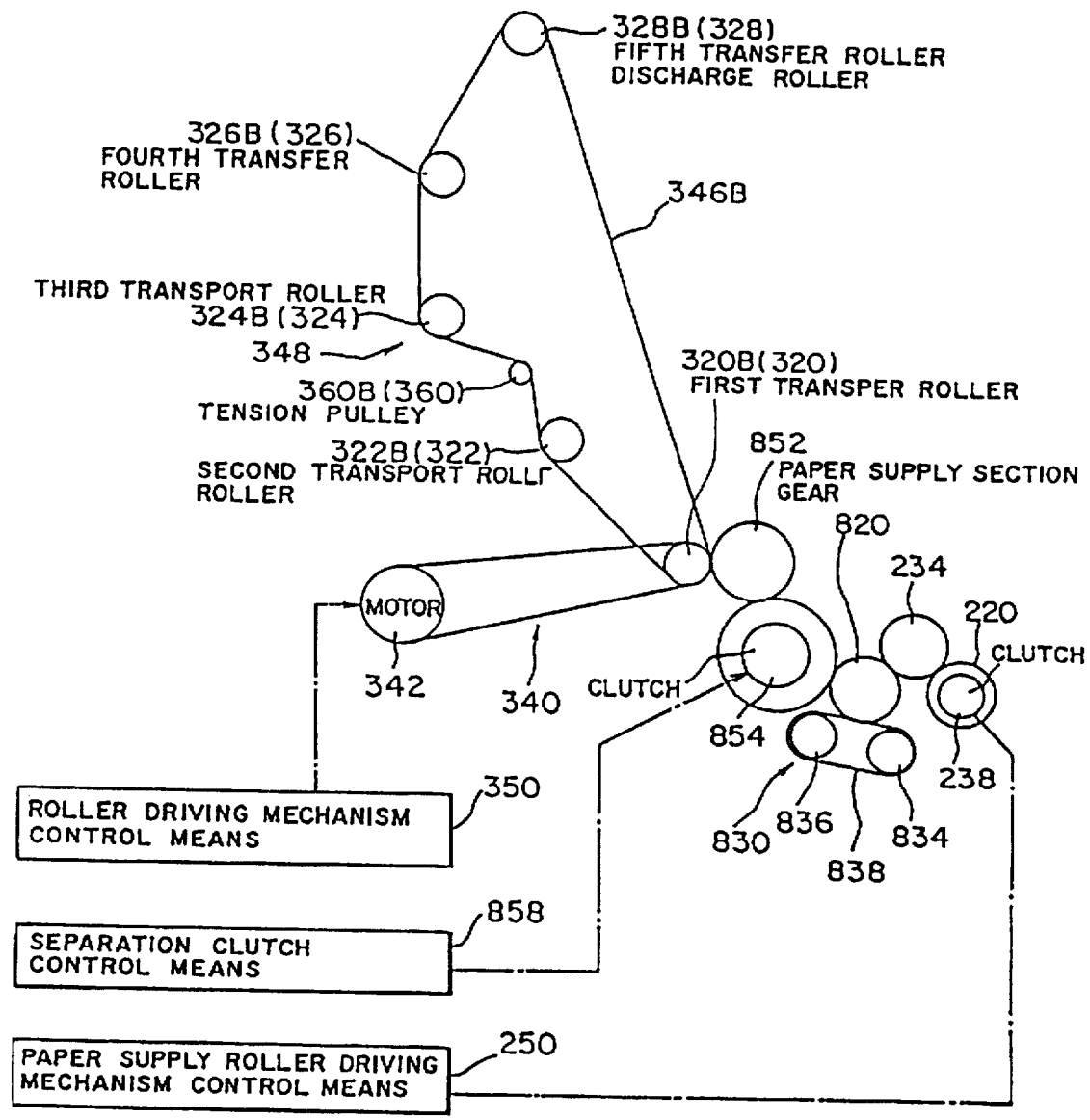
FIG. 9 is a diagrammatic view schematically showing, in side elevation, the driving system shown in FIG. 8.

Referring to FIGS. 4 and 7, the image reading apparatus includes, as components thereof, a paper supply mechanism 200 which can successively supply paper sheets 40 accommodated therein, a paper transport mechanism 300 for transporting a paper sheet 40 supplied from the paper supply mechanism 200, an optical image reading mechanism 400 for optically reading information on a paper sheet 40 being transported by the paper transport mechanism 300, and a paper stacking mechanism 500 for receiving a paper sheet 40 discharged from the paper transport mechanism 300 to stack such paper sheets 40.

The paper supply mechanism 200 includes a paper supply hopper 210 which can accommodate therein paper sheets 40 to be read, a paper supply roller 220 located above the paper supply hopper 210 for supplying one of paper sheets 40 accommodated in the paper supply hopper 210 toward the paper transport mechanism 300, a paper supply roller driving mechanism 230 for driving the paper supply roller 220 to rotate, a paper supply hopper driving mechanism 240 for driving the paper supply hopper 210 to an inclined position in response to the amount of paper sheets 40 accommodated in the paper supply hopper 210, and a paper separation mechanism 800 for preventing two or more paper sheets supplied by the paper supply roller 220 from being fed to the paper transport mechanism 300.

Figure 5:
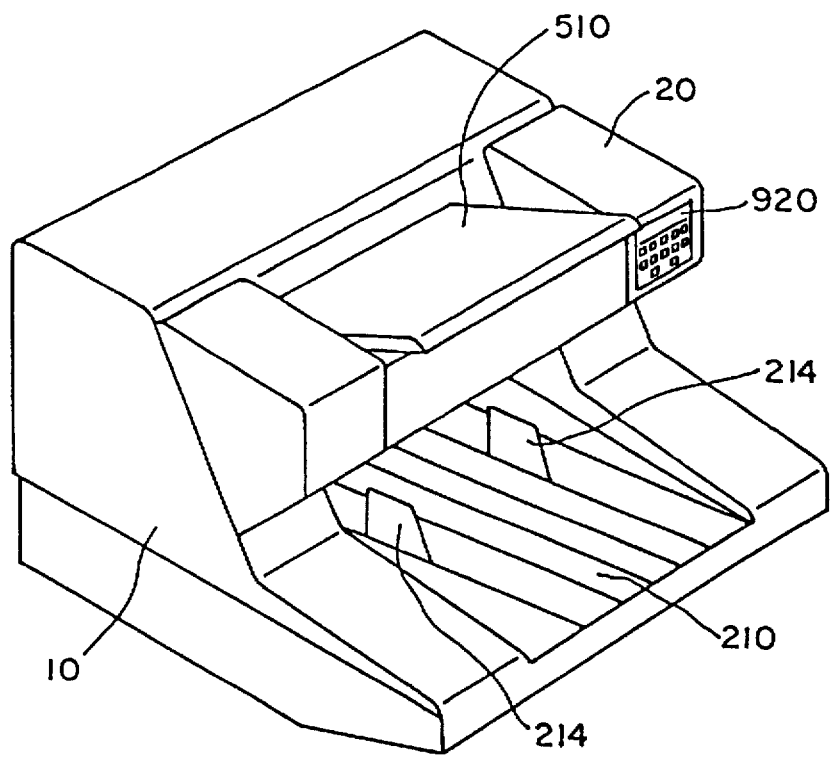
FIG. 5 is a perspective view showing an outer profile of the image reading apparatus of FIG. 4.
Figure 6:
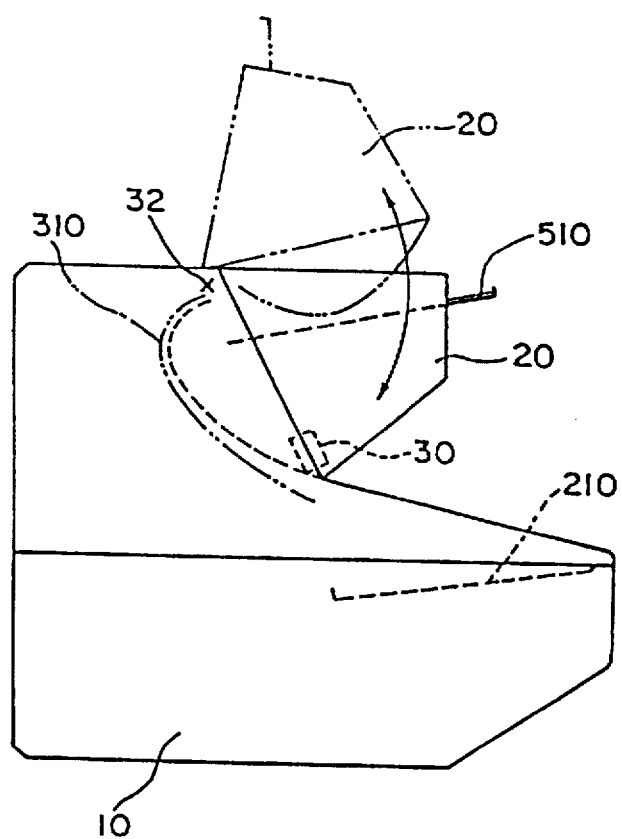
FIG. 6 is a schematic side elevational view showing an outer profile of the image reading apparatus of FIG. 4.

The paper supply hopper 210 includes a hopper table 212 supported for pivotal motion on a rotatable shaft 212A located at a rear end portion (right end portion in FIGS. 4 and 7) of the image reading apparatus. The hopper table 212 is driven at an end portion (left end portion in FIGS. 4 and 7) thereof by a rack-and-pinion mechanism 248 (including a pinion 248A and a rack 248B) of the paper supply hopper driving mechanism 240 so that it is pivoted upwardly and downwardly and adjusted to a predetermined inclined position. The hopper table 212 includes, as shown in FIG. 5, a pair of tiltable paper edge guide members 214 for guiding the opposite side edges of the paper sheets 40 accommodated in the paper supply hopper 210.

The paper supply hopper driving mechanism 240 includes, as a driving source, a hopper motor 242 constituted from a stepper motor. The driving force of the hopper motor 242 is transmitted to the rack-and-pinion mechanism 248 by way of a belt-and-pulley mechanism 244.

Meanwhile, the paper supply roller 220 is supported for rocking motion around an axis of a separation roller 820 by way of a rockable arm 292 such that it can be retracted upwardly from a space above the paper supply hopper 210 by a paper supply roller retraction mechanism 270. Such upward retraction of the paper supply roller 220 can be performed artificially. However, in a normal condition wherein no artificial force is applied to the paper supply roller 220, the paper supply roller 220 remains at a position suitably moved down by the weight of the paper supply roller 220 itself or by means of a spring not shown, at which the paper supply roller 220 is received by the hopper table 212 below. Then, when the paper supply hopper 210 is pivoted, the paper supply roller 220 is moved upwardly by a required amount in response to the position of the upper face of the paper sheets 40 accommodated in the hopper table 212 which is moved upwardly or downwardly by pivotal motion of the paper supply hopper 210.

Referring now to FIGS. 4, 7, 8 and 9, the paper supply roller driving mechanism 230 for driving the paper supply roller 220 to rotate includes, as a driving source, a transport motor 342 constituted from a stepper motor. The paper supply roller driving mechanism 230 further includes a first belt-and-pulley mechanism 344 and first to third gear mechanisms 852, 856 and 232 interposed between the transport motor 342 and the paper supply roller 220. A pick clutch 238 constituted from an electromagnetic clutch is provided at an inputting portion of the driving force to the paper supply roller 220 from the third gear mechanism 232.

The paper supply roller driving mechanism 230 is controlled by paper supply roller driving mechanism control means 250 in response to the paper supplying position (hopper paper supplying position) of the paper supply hopper 210. More particularly, the paper supply roller driving mechanism control means 250 controls the pick clutch 238 between on and off states to control operation of the paper supply roller driving mechanism 230, that is, the rotation condition of the paper supply roller 220.

The paper separation mechanism 800 includes a separation roller 820, a rotation member 830 disposed in an opposing relationship to the separation roller 820 with a small gap left therebetween, and a separation roller driving mechanism 850 for driving the separation roller 820 to rotate.

The rotation member 830 is located below the separation roller 820, that is, nearer to the apparatus body 10 than the separation roller 820, with a small gap left therebetween. The rotation member 830 includes a pair of pulleys 834 and 836 disposed in a spaced relationship from each other in the paper transporting direction and an endless belt 838 wound between and around the pulleys 834 and 836.

The separation roller driving mechanism 850 is constituted from components substantially common to those of the paper supply roller driving mechanism 230 described hereinabove. In particular, as shown in FIGS. 4, 7, 8 and 9, the separation roller driving mechanism 850 includes the transport motor 342 described hereinabove as a driving source and further includes the first belt-and-pulley mechanism 344 and the first and second gear mechanisms 852 and 856 interposed between the transport motor 342 and the paper supply roller 220. A separation clutch 854 constituted from an electromagnetic clutch is interposed in the first gear mechanism 852. In short, the paper supply roller driving mechanism 230 has a construction wherein the third gear mechanism 232 is provided in addition to the separation roller driving mechanism 850. It is to be noted that operation of the separation clutch 854 is controlled by separation clutch control means 858.

Meanwhile, the paper transport mechanism 300 includes a paper transport path 310 for transporting a paper sheet 40 supplied thereto from the paper supply mechanism 200, a plurality of paper transporting rollers 320 to 328 disposed along the paper transport path 310, a roller driving mechanism 340 for driving the paper transporting rollers 320 to 328, and roller driving mechanism control means 350 for controlling the roller driving mechanism 340. Idler rollers 330 to 338 are provided corresponding to the paper transporting rollers 320 to 328, respectively.

The paper transport path 310 includes an inclined transport path 312 for transporting a paper sheet supplied thereto from the paper supply mechanism 200 in an inclined condition, and a paper reversing transport path 314 provided contiguously to the inclined transport path 312 for reversing the paper sheet 40 transported by the inclined transport path 312.

Due to the construction of the paper transport path 310, the posture of one of the paper sheets 40 supplied from the paper supply hopper 210 is changed first from a substantially horizontal posture in the paper supply hopper 210 to a rearwardly inclined posture in the inclined transport path 312 and is then reversed by the paper reversing transport path 314, and then, in this posture, the paper sheet 40 is discharged to the paper stacking mechanism 500.

Consequently, a paper sheet which is directed upwardly in the paper supply hopper 210 is directed downwardly in the paper stacking hopper 500, and the paper sheets 40 accommodated one on another in the paper supply hopper 210 are successively stacked into the paper stacking mechanism 500 without changing the order of them.

Meanwhile, the paper transporting rollers 320 to 328 and the idler rollers 330 to 338 are disposed in a condition distributed discretely at a distance smaller than the length of the paper sheets 40 in the transporting direction as seen from FIGS. 4, 7, 8 and 9.

The roller driving mechanism 340 includes the transport motor 342 described above as a driving source and further includes a second belt-and-pulley mechanism 348 in addition to the first belt-and-pulley mechanism 344. The first and second belt-and-pulley mechanisms 344 and 348 will be described here. The first belt-and-pulley mechanism 344 includes a pulley 344A mounted on a rotary shaft of the transport motor 342, another pulley 344B mounted on a rotary shaft 320A of the paper transporting roller 320, and a belt 346A wound between and around the pulleys 344A and 344B. The second belt-and-pulley mechanism 348 includes pulleys 320B to 328B mounted on the rotary shafts 320A to 328A of the paper transporting rollers 320 to 328, respectively, and a belt 346B wound between and around the pulleys 320B to 328B.

Accordingly, when the transport motor 342 operates, the driving force is transmitted from the rotary shaft of the transport motor 342 to the pulley 344B by way of the pulley 344A and the belt 346A so that the rotary shaft 320A of the paper transporting roller 320 is driven to rotate. Further, from the pulley 320B, the rotary shafts 322A to 328A of the other paper transporting rollers 322 to 328 are driven to rotate by way of the belt 346A and the pulleys 322B to 328B so that the paper transporting rollers 320 to 328 are driven to rotate simultaneously.

It is to be noted that reference numeral 360 denotes a tension pulley.

Figure 10:
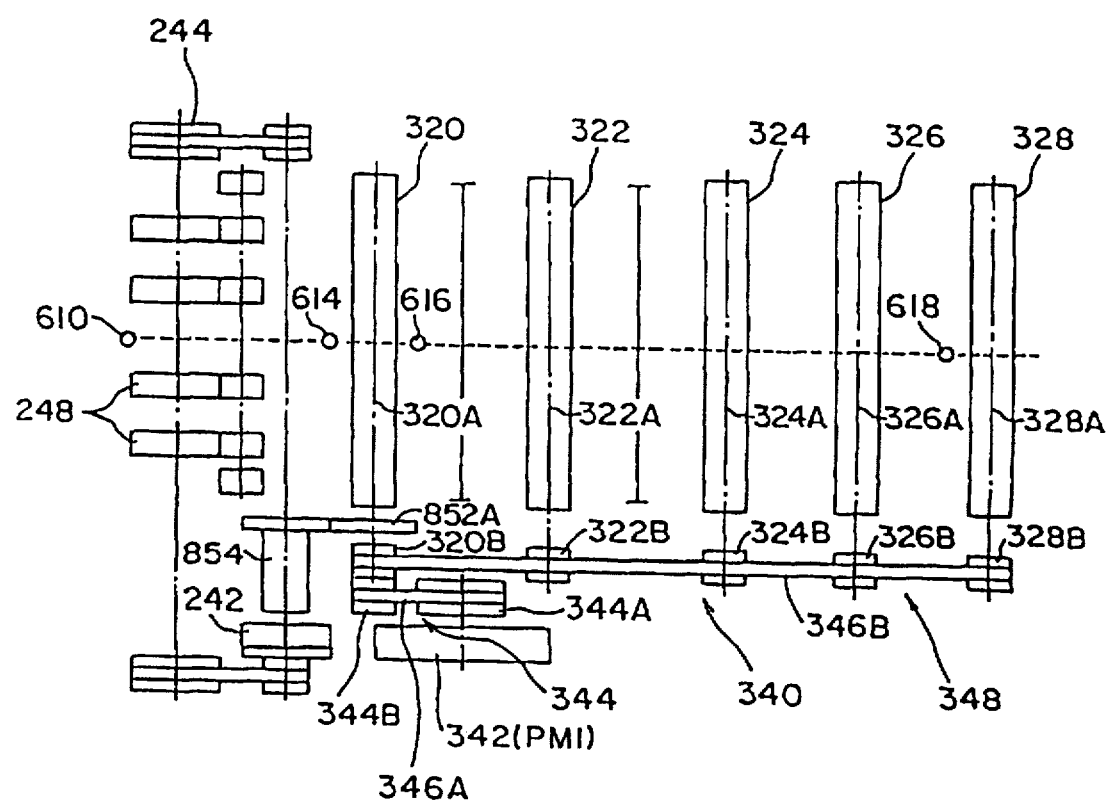
FIG. 10 is a diagrammatic view schematically showing, in plan, the driving system shown in FIG. 8.
Figure 11A:
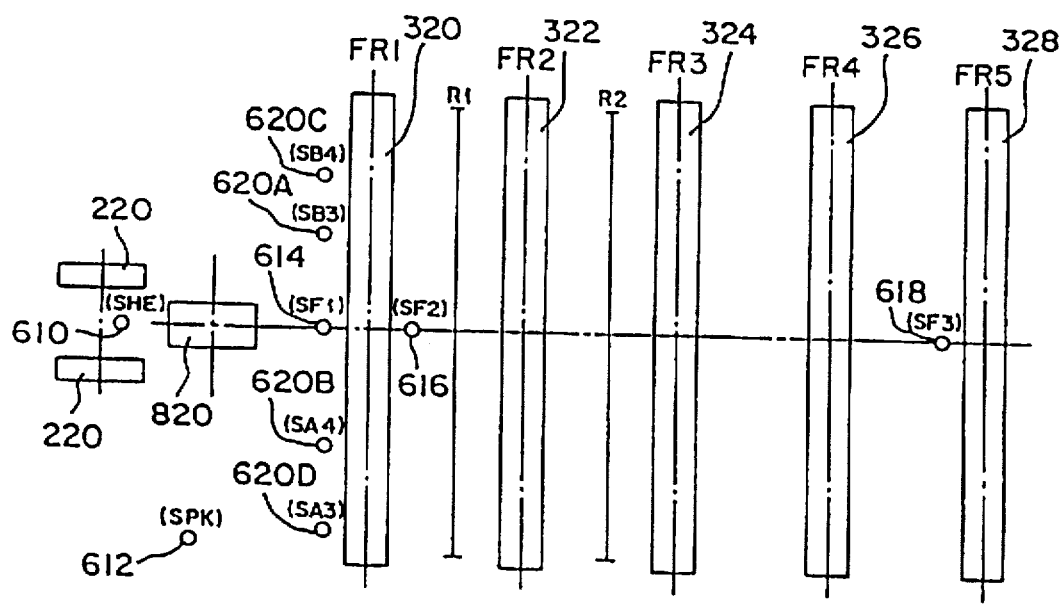
FIGS. 11(A) and 11(B) are a schematic plan view and a schematic side elevational view, respectively, showing a paper transport system of the image reading apparatus of FIG. 4.
Figure 11B:
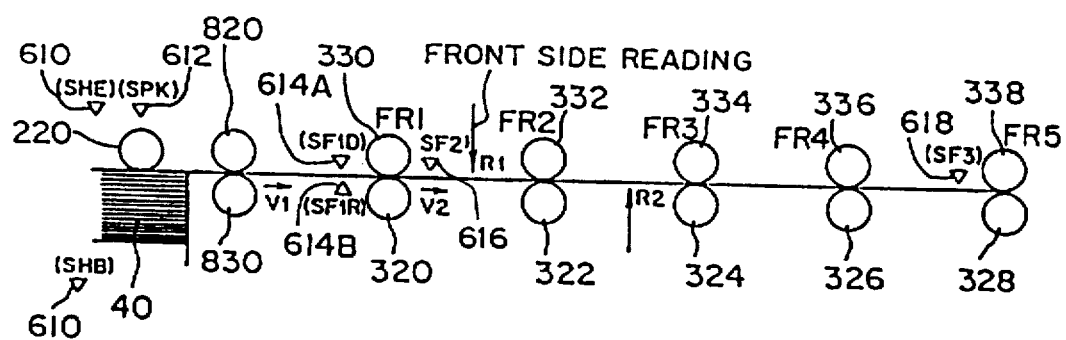

The paper transport mechanism 300 described above is schematically shown in FIGS. 10 and 11. Referring to FIGS. 10 and 11, the components are shown such that the paper supply hopper 210 is positioned on the left side while a paper stacker 510 is positioned on the right side and a paper sheet 40 is transported from the left to the right side reversely to those in FIGS. 4 to 9 so as to conform to time charts which will be hereinafter described.

Figure 12:
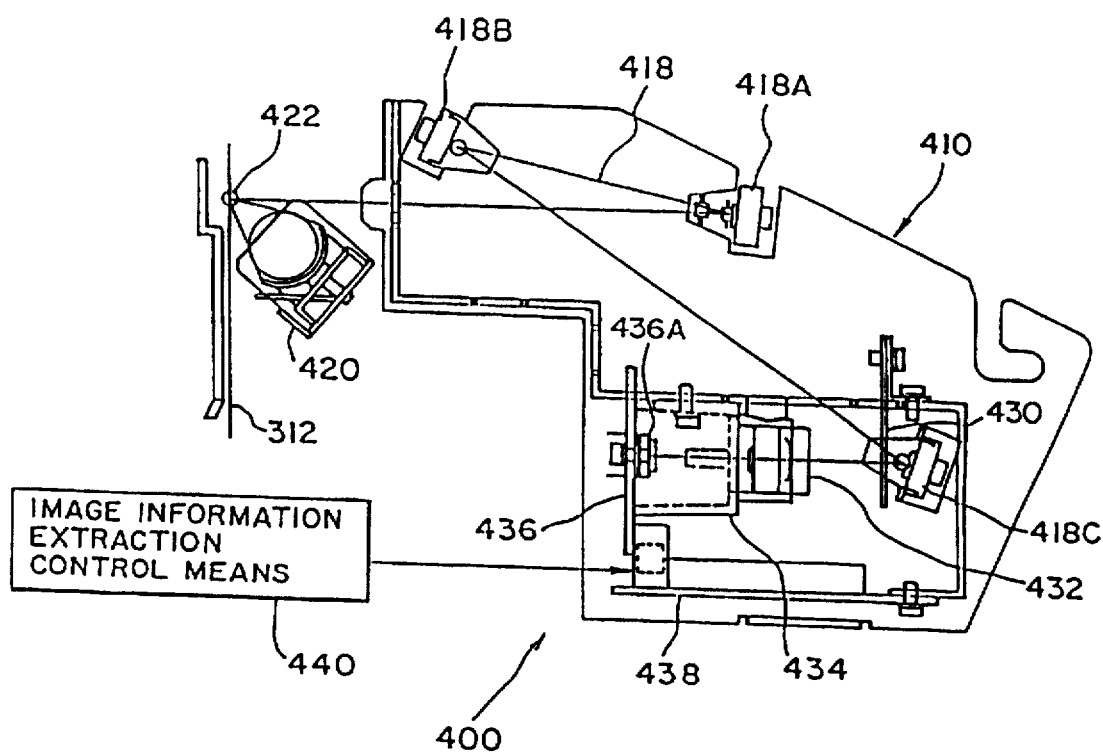
FIG. 12 is a schematic side elevational view showing the construction of an image reading mechanism of the image reading apparatus of FIG. 4.

Referring now to FIG. 12, the optical image reading mechanism 400 includes an optical image reading unit 410 having a reading point 422 located intermediately of the inclined transport path 312 for optically reading information on a paper sheet 40, and image information extraction control means 440 for controlling extraction of image information read by the optical image reading unit 410.

Referring to FIGS. 4 and 7, the optical image reading unit 410 includes, in the arrangement shown, two units of a first optical image reading unit 412 and a second optical image reading unit 414. The optical image reading units 412 and 414 are located intermediately of the inclined transport path 312, and the first optical image reading unit 412 optically reads information on the front face 42 of a paper sheet 40 while the second optical image reading unit 414 optically reads information on the rear face 44 of the paper sheet 40.

Here, each of the optical image reading units 412 and 414 is constituted as an image reading unit of common specifications. For example, FIG. 12 is a schematic side elevational view showing the construction of the image reading unit of common specifications. Referring to FIG. 12, the optical image reading unit 410 shown includes a fluorescent lamp unit 420 serving as a lighting element for irradiating light upon the reading point 422 on the inclined transport path 312, a CCD (charge coupled device) circuit board 436 including a CCD array 436A (CCD array 436A denotes a plurality of CCDs arranged in an array) for optically reading information on a paper sheet 40, and a video circuit board 438 for processing information from the CCD array 436A. It is to be noted that reference numeral 434 in FIG. 12 denotes a black box.

A light path 418 from the reading point 422 to the CCD array 436A is constituted from a plurality of (in the arrangement shown, three, first to third) mirrors 418A, 418B and 418C for reflecting light. A shading plate 430 and a lens 432 are located intermediately of the light path 418 between the mirror 418C and the CCD array 436A so that an image from the mirror 418C may be introduced into the CCD array 436A by way of the lens 432 after it is corrected, particularly at peripheral portions thereof, by the shading plate 430.

Since the light path 418 is formed by the plurality of mirrors 418A, 418B and 418C for reflection of light, the light path 418 can have a sufficient length while the reading point 422 and the CCD circuit board 436 are located at comparatively near locations to each other. Consequently, even where the lens 432 has a great focal length, the reading point 422 can be disposed at a focus position of the lens 432.

A paper sheet 40 from which information has been read by the optical image reading mechanism 400 in this manner is discharged from the paper transport mechanism 300 to the paper stacking mechanism 500. Here, at the terminal end of the paper transport mechanism 300, a paper discharge roller mechanism 540 is located so that the paper sheet 40 may be discharged to the paper stacking mechanism 500 while being driven by the paper discharge roller mechanism 540.

The paper stacking mechanism 500 includes a stacker table 520 having, at the bottom thereof, the paper stacker 510 on which paper sheets 40 can be stacked. A paper trailing end guide mechanism 550 for guiding the rear end 48 of a paper sheet 40 to be stacked into the paper stacker 510.

Referring back to FIGS. 4, 7 and 11, several sensors 610 to 618, 620A to 620D and 622 are provided. Thus, operations of the driving systems described above, that is, operations of the hopper motor 242 of the paper supply hopper driving mechanism 240, the pick clutch 238 of the paper supply roller driving mechanism 230, the separation clutch 854 and the roller driving mechanism 340 of the separation roller driving mechanism 850, and the transport motor 342 for the separation roller driving mechanism 850 and the paper supply roller driving mechanism 230 and extraction operations of the image information extraction control means 440 of the first optical image reading unit 412 and the second optical image reading unit 414 are controlled in response to detection signals from the sensors 610 to 618 and 620A to 620D.

The sensor (SHE) 610 is a hopper empty sensor for detecting whether or not the paper supply hopper 210 is empty. The sensor (SPK) 612 is a paper supply sensor for detecting whether or not the posture of the paper supply hopper 210 is in an optimum condition (that is, a hopper paper supplying position) for supplying a paper sheet. Here, since the paper supply roller 220 is put into a paper supplying position (optimum condition) in response to the paper supplying position of the paper supply hopper 210, the sensor 612 actually detects whether or not the paper supply hopper 210 and the paper supply roller 220 are in their individual paper supplying positions. The hopper empty sensor 610 and the paper supply sensor 612 may each be constituted from, for example, a photo-interrupter.

The sensor (SF1) 614 and the sensor (SF2) 616 are transport sensors for detecting a paper sheet 40 is transported by the paper transport mechanism 300. The sensor (SF3) 618 is a discharge sensor for detecting whether or not a paper sheet 40 is discharged from the paper transport mechanism 300 to the paper stacking mechanism 500. The transport sensors 614 and 616 and the discharge 618 may each be constituted from, for example, a photo-sensor. Here, the transport sensor 614 is a transmission type photo-sensor which includes a light emitting element and a light receiving element located on the opposite sides of the paper transport mechanism 300, and each of the transport sensor 616 and the discharge sensor 618 is a reflection type sensor wherein a light emitting element and a light receiving element are provided as a unitary member.

The sensor (SB5) 620A, the sensor (SA4) 620B, the sensor (SB4) 620C and the sensor (SA3) 620D are sheet width detection sensors. The sensor 620A is a B5 width detection sensor provided for detection of a paper width of a paper sheet of the "B5 size"; the sensor 620B is an A4/LT width detection sensor provided for detection of a paper width of a paper sheet of the "A4 size" or "LT size"; the sensor 620C is a B4 width detection sensor provided for detection of a paper width of a paper sheet of the "B4 size"; and the sensor 620D is an A4/DL width sensor provided for detection of a paper width of a paper sheet of the "A3 size" or "DL size". The sensors 620A to 620D may each be constituted from, for example, a photo-sensor (in the arrangement shown, a reflection type photo-sensor is employed).

Meanwhile, the sensor 622 is a bottom sensor for discriminating whether or not the hopper table 212 of the paper supply hopper 210 is at its lowermost position (bottom position). The sensor 622 may be, for example, a photo-interrupter.

For starting and stopping operations, setting of an operation condition and so forth of the image reading apparatus described above, an operation panel 920 is provided at the front of the image reading apparatus as shown, for example, in FIG. 5.

2. Image Reading Mechanism

The optical image reading unit 410 includes, in the arrangement shown, two units of the first optical image reading unit 412 and the second optical image reading unit 414 as described hereinabove. The optical image reading units 412 and 414 are located intermediately of the inclined transport path 312, and the first optical image reading unit 412 optically reads information on the front face 42 of a paper sheet 40 while the second optical image reading unit 414 optically reads information on the rear face 44 of the paper sheet 40.

Figure 13:
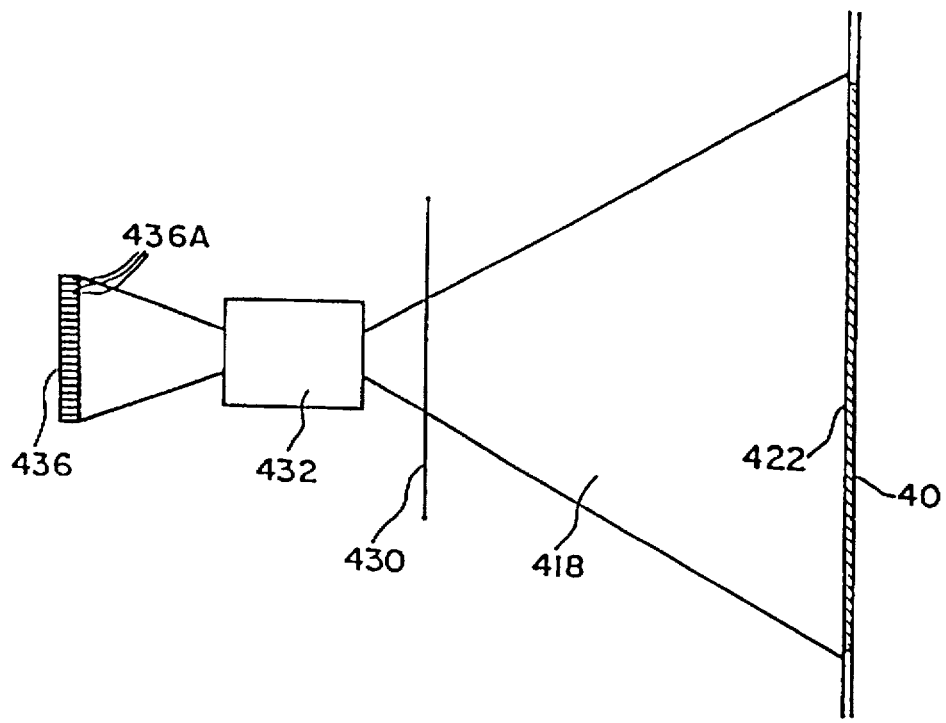
FIG. 13 is a diagrammatic view schematically showing the construction of the optical image reading mechanism shown in FIG. 12.

As described above, since the optical image reading units 412 and 414 are constructed as image reading units of common specifications, when there is no necessity of distinguishing them from each other in the description of each optical image reading unit, the optical image reading unit is represented by the optical image reading unit 10. In particular, the light path 418 from the reading point 422 to the CCD circuit board 336 in the optical image reading unit 410 is schematically shown in FIG. 13 wherein the light path 418 is generally represented as a straight line omitting the reflections by the mirrors 418A, 418B and 418C. Referring to FIG. 13, pieces of image information arranged in the widthwise direction of a paper sheet 40 are collected by the lens 432 and come to the CCD circuit board 436. The CCD circuit board 436 is constituted from a plurality of CCDs arranged in a juxtaposed relationship to each other so as to catch the pieces of information arranged in the widthwise direction.

The shading plate 430 located forwardly of the lens 432 corrects the image information since the image information is distorted by an increasing amount toward the opposite left and right ends and of the paper sheet 40.

The CCD array 436A operates under the control of respective CCD drivers to catch image information, and the image information is sent to and processed by a video circuit provided on the video circuit board 438.

By the way, in each of the optical image reading units 410, the fluorescent lamp unit 420 is provided in order to make the reading point 422 light.

It is to be noted that a heater (not shown) is provided along the rear face of the fluorescent lamp of the fluorescent lamp unit 420. When the temperature is low, the heater is rendered operative, and after it is started, the fluorescent lamp is warmed up rapidly so that the reading point 422 can be illuminated with a sufficient amount of light.

3. Read Image Data Processing 3-1. Outline of the Read Image Data Processing System Referring to FIG. 3, the image reading apparatus includes a first image data processing system D1 for processing image data read by the first optical image reading unit 412 for reading information on the front face of a paper sheet, and a second image data processing system D2 for processing image data read by the second optical image reading unit 414 for reading information on the rear face of the paper sheet.

The first image data processing system D1 includes a CCD array 436AA of the first optical image reading unit 412, an amplification circuit (AMP) 64A, a sample hold circuit 66A, an analog to digital (A/D conversion circuit 60A, and an image processing section 68A. Meanwhile, the second image data processing system D2 includes a CCD array 436AB of the second optical image reading unit 414, an amplification circuit 64B, a sample hold circuit 66B, an analog to digital conversion circuit 60B and an image processing section 68B.

The CCD arrays 436AA and 436AB read image data of a paper sheet by way of the image reading units 412 and 414, respectively, as described hereinabove. The amplification circuits 64A and 64B amplify the image data of the paper sheet obtained from the CCD arrays 436AA and 436AB, respectively, and the sample hold circuits 66A and 66B sample and hold the image data of the paper sheet after amplified by the amplification circuits 64A and 64B, respectively.

The analog to digital conversion circuits 60A and 60B convert analog data obtained from the image reading units 412 and 414 into digital data using white level information and black level information of the image information of the paper sheet as indices for a conversion criterion. The image processing sections 68A and 68B process the digital data from the analog to digital conversion circuits 60A and 60B, respectively, by various processes such as binary digitization, emphasis and smoothing.

The image data processing system further includes an outputting section 90 for selectively sending out paper front face image data and paper rear face image data to a host computer (not shown) in response to an instruction from an output control circuit 100 which is part of the image information extraction control means 440. In particular, in the present embodiment, since the image reading units 412 and 414 are provided in the proximity of each other, it sometimes occurs that the image reading units 412 and 414 read images simultaneously. Therefore, information from the second optical image reading unit 414 for reading information on the rear face of a paper sheet is stored once into a buffer storage apparatus (DRAM) of the rear face reading board 944 (refer to FIG. 32) and, after information from the first optical image reading unit 412 is sent to the host computer, the information from the second optical image reading unit 414 is sent from the buffer storage apparatus to the host computer. Such control means is provided in the outputting section 90, and details of the same will be hereinafter described.

In this manner, image information read by the image reading units 412 and 414 is read out under the control of the output control circuit 100 of the image information extraction control means 440 as seen from FIG. 7. In this instance, in the image information extraction control means 440, transfer control of image information to the host computer and like control are performed in response to results of detection of a paper leading end detection circuit (paper leading end detection means) 450 and a paper trailing end detection circuit (paper trailing end detection means) 451. It is to be noted that the paper leading end detection circuit 450 and the paper trailing end detection circuit 451 will be hereinafter described.

In particular, the paper leading end detection circuit 450 detects the paper leading end 46 from a variation of the output of each of the optical image reading units 410, and the paper trailing end detection circuit 451 detects the paper trailing end 48 from a variation of the output of each of the optical image reading units 410. The paper lead end detection circuit 450 and the paper trailing end detection circuit 451 are both provided in the image information extraction control means. It is to be noted that also the paper leading end detection circuit 450 and the paper trailing end detection circuit 451 will be hereinafter described.

Further, the image information extraction control means 440 controls extraction of image information obtained from the first optical image reading unit 412 and the second optical image reading unit 414 in response to a result of selection by the original selection switch 924L serving as the paper reading selection means and a discrimination mark (not shown) applied to a paper sheet 40.

In particular, it can be selected by the original selection switch 924L whether both face reading should be performed or one face reading should be performed, and the image information extraction control means 440 performs reading control in response to a result of the selection by the original selection switch 924L. However, paper sheets which require both face reading and paper sheets which allow one face reading may possibly be present in a mixed condition. In this instance, when paper sheets should be read in a different manner from other paper sheets in which the paper sheets are mixed, a discrimination mark is applied to each of the paper sheets so that they may be read in a different manner. The discrimination mark is provided for discrimination whether the paper sheet should be read by one face reading or by both face reading, and is applied to a location outside an original reading area such as, for example, a corner of the leading end of the paper sheet 40 so that it may be distinguished from image information in the original reading area which should originally be read.

Therefore, for example, when one face reading originals are mixed in both face reading originals, if a discrimination mark which designates one face reading is applied to each of the one face reading originals the quantity of which is smaller than that of the both face reading originals and it is selectively set by way of the original selection switch 924L that both faces of each paper sheet 40 should usually be read, then image information on both faces of a paper sheet is normally read by both of the first optical image reading unit 412 and the second optical image reading unit 414. However, when a discrimination mark 50 is detected, image information only on the front face or the rear face of the paper sheet 40 is read by the first optical image reading unit 412 or the second optical image reading unit 414.

On the contrary, when both face reading originals are mixed in one face reading originals, if a discrimination mark which designates double face reading is applied to each of the double face reading originals the quantity of which is smaller than that of the one face reading originals and it is selectively set by way of the original selection switch 924L that one face of each paper sheet 40 should usually be read, then image information only on the front face or the rear face of a paper sheet is normally read by the first optical image reading unit 412 or the second optical image reading unit 414. However, when a discrimination mark is detected, image information on the both faces of the paper sheet is read by both of the first optical image reading unit 412 and the second optical image reading unit 414.

The image information extraction control means 440 further includes discrimination mark image erasure means 460 so that the image of such discrimination mark applied to a paper sheet 40 may be erased and only image information to be read originally may be outputted.

By the way, the apparatus body 10 or the apparatus lid 20 assures an upper mounting space (space for the front face reading unit) 26 and a lower mounting space (space for the rear face reading unit) 16 having substantially similar sizes and shapes to each other to allow the optical image reading units 412 and 414 to be mounted in them, respectively (refer to FIG. 4). In the meantime, the optical image reading unit 410 is prepared by a plural number having different specifications having different performances but having substantially common sizes and profiles.

While, in the image reading apparatus of the present embodiment, the first optical image reading unit 412 and the second optical image reading unit 414 are constructed with common specifications, it is easy to construct the first optical image reading unit 412 and the second optical image reading unit 414 so as to have different specifications such that, for example, the optical image reading unit for front face reading of the construction described above has higher performances than the optical image reading unit for rear face reading of the construction described above.

Further, each of the optical image reading units 410 includes detection means (front/rear face detection means) 630 which can detect that it is installed as a unit for front face reading when it is installed in the upper mounting space 26 but detect that it is installed as a unit for rear face reading when it is installed in the lower mounting space 16. The detection means 630 may be constructed such that, for example, a front surface detection projection (not shown) is provided only in the upper mounting space 26 while a rear face detection projection (not shown) is provided only in the lower mounting space 16, and a front face detection switch (not shown) which is automatically contacted, when it is installed in the upper mounting space 26, by the front face detection projection to switch to an on-state and a rear face detection switch (not shown) which is automatically contacted, when it is installed in the lower mounting space 16, by the rear face detection projection to switch to an on-state are provided on each of the optical image reading units 410.

Information detected by the detection means 630 in this manner is sent to the image information extraction control means 440 and used for extraction control of image information.

Figure 3:
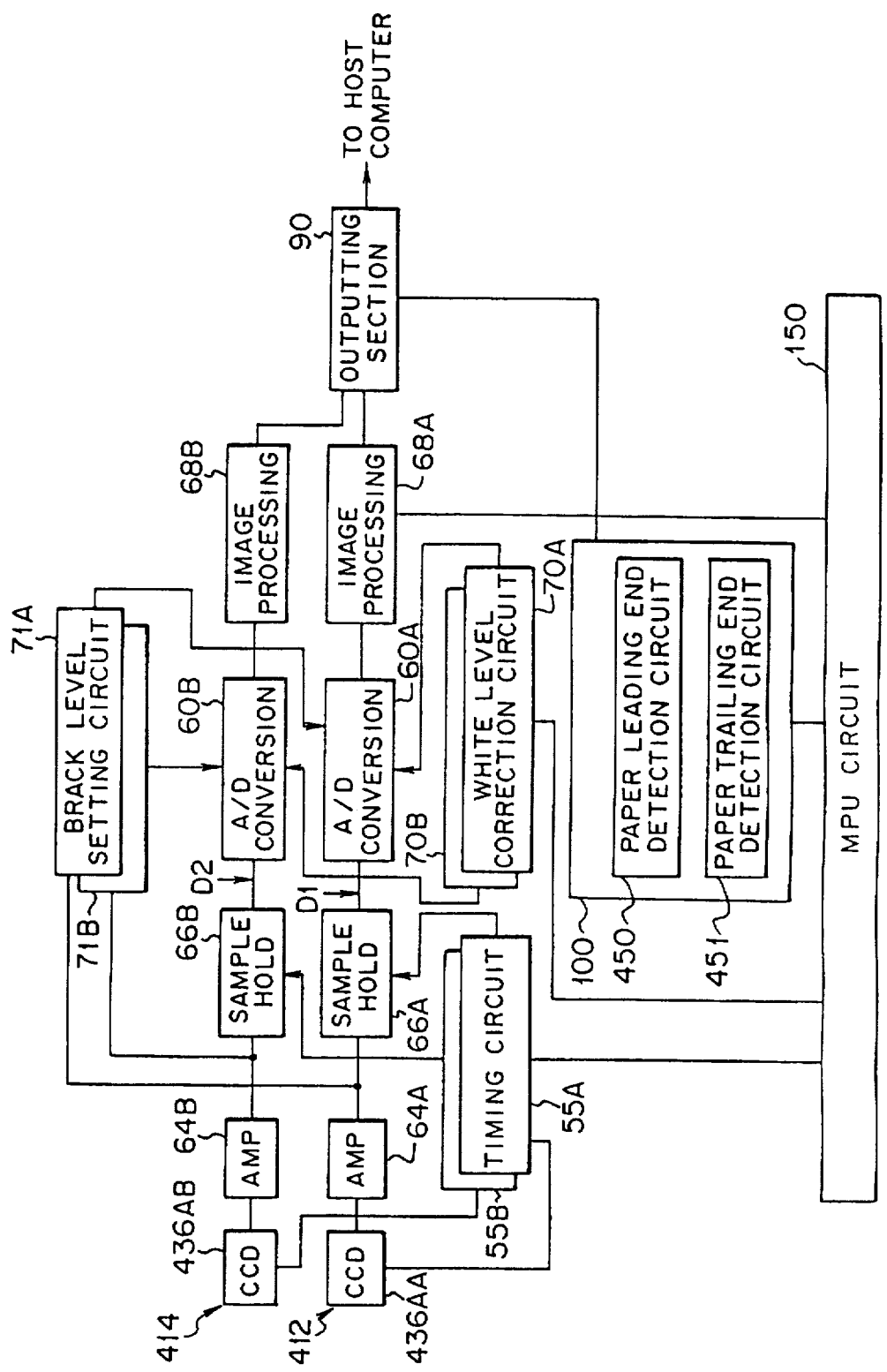
FIG. 3 is a block diagram of an image data processing system showing a preferred embodiment of the present invention.

The image data processing system shown in FIG. 3 further includes a pair of timing circuits 55A and 55B which define, for example, sample holding timings of the sample hold circuits 66A and 66B, respectively.

3-2. White Level Information Used upon Analog to Digital Conversion of Image Data and Associated Factors As shown in FIG. 3, each of the analog to digital conversion circuits 60A and 60B includes a white level information correction circuit (white level information correction apparatus) 70A or 70B and a black level setting circuit 61A or 61B.

The white level information correction circuits 70A and 70B individually set white level information to be used as indices for a conversion criterion of the analog to digital conversion circuits 60A and 60B, respectively, and suitably correct the thus set while level information. The black level setting circuits 61A and 61B individually set black level information to be used as indices for a conversion criterion of the analog to digital conversion circuits 60A and 60B, respectively. It is to be noted that the black level setting circuits 61A and 61B are each constructed as a sample hold circuit.

The white level information correction circuits 70A and 70B will be described in more detail below. Here, since the white level information correction circuits 70A and 70B have a same construction, reference characters to components of the white level information correction circuits 70A and 70B are not distinguished between A and B.

Figure 14:
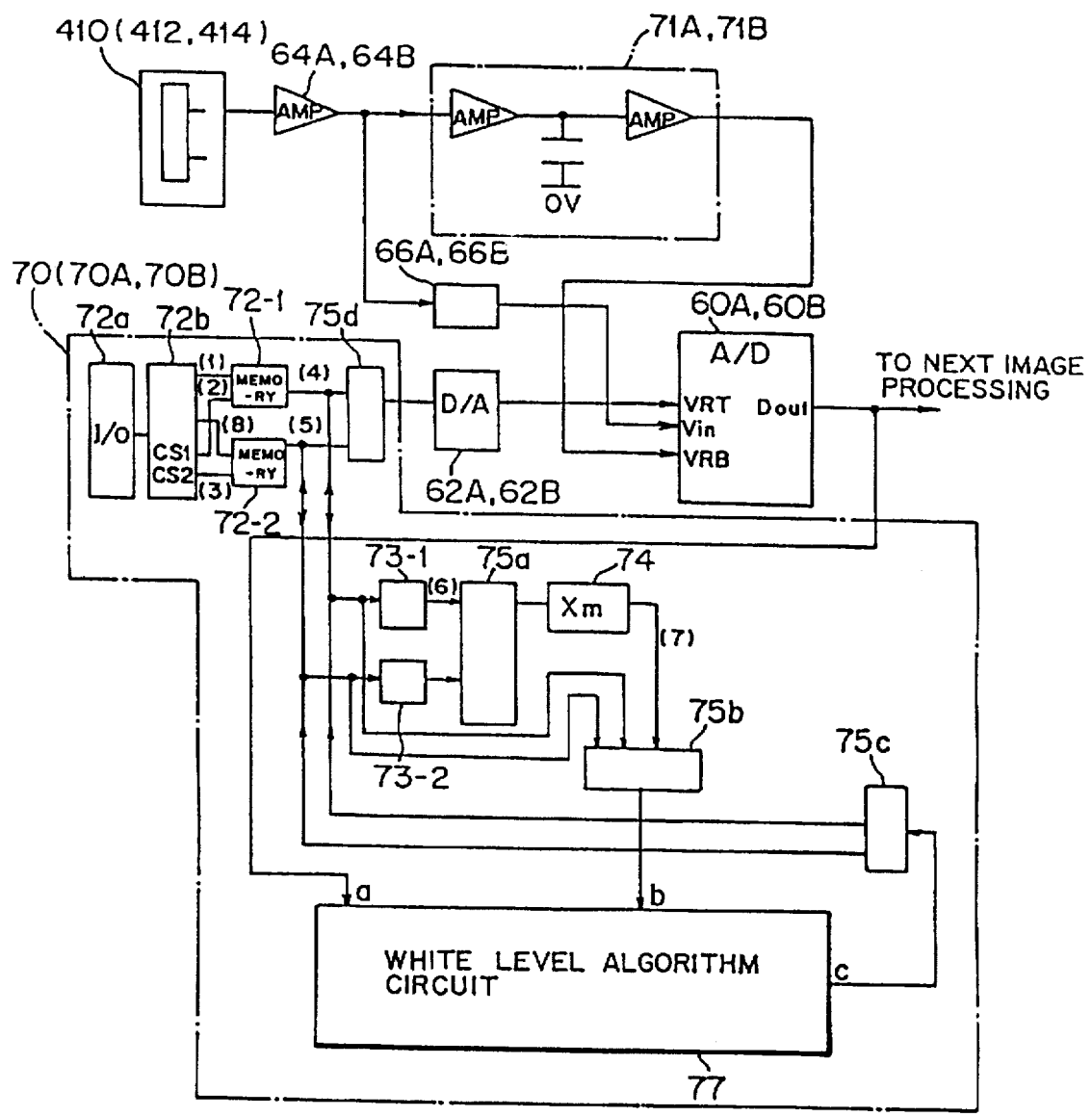
FIG. 14 is a block diagram showing the construction of a white level information correction apparatus to which the present invention is applied together with several associated elements.

In particular, referring to FIG. 14, the white level information correction circuit 70 includes a plurality of (for example, two) memory circuits 72-1 and 72-2 and registers 73-1 and 73-2, selection circuits 75a, 75b, 75c and 75d, a data magnification variation circuit 74, a white level algorithm circuit 77, and so forth.

The memory circuits 72-1 and 72-2 store a plurality of pieces of white level information (individual pieces of white level information correspond to originals having different ground colors) to be used as indices for a conversion criterion. Write/read control of each of the memory circuits 72-1 and 72-2 is performed in response to an instruction which is received from an MPU (microprocessor unit) circuit 150 by an address controller 72b by way of an input/output port (I/O port) 72a. It is to be noted that a RAM (random access memory) may be employed for the memory circuits 72-1 and 72-2.

The registers 73-1 and 73-2 serve as buffer circuits for temporarily storing the outputs of the memory circuits 72-1 and 72-2, respectively. Each of the selection circuits 75a, 75b, 75c and 75d selectively outputs desired data to a required output line. For example, a multiplexer is used for the selection circuits 75a, 75b, 75c and 75d.

In particular, the selection circuit 75a selectively outputs data from the register 73-1 or 73-2 to the data magnification variation circuit 74 side. The selection circuit 75b selectively outputs white level information varied by magnification variation by the data magnification variation circuit 74 or white level information from the memory circuit 72-1 or 72-2. The selection circuit 75c stores the output of the white level algorithm circuit 77 into and updates a required one of the memory circuits 72-1 and 72-2. The selection circuit 75d supplies the output of one of the memory circuits 72-1 and 72-2 to the analog to digital conversion circuit 60 side by way of a digital to analog conversion circuit 62 (actually, analog to digital conversion circuits 62A and 62B are provided in the data processing systems D1 and D2, respectively).

The data magnification variation circuit 74 varies data by magnification variation by multiplying white level information from the memory circuit 72-1 or 72-2 by a desired coefficient (m: in order to lower the white level, a value between 1 and 0 is selected for m, but in order to raise the white level, a value higher than 1 is selected for m). For example, a digital multiplier is used for the data magnification variation circuit 74. Further, the magnification variation coefficient m of the data magnification variation circuit 74 can be varied by an instruction from the MPU circuit 150.

Figure 15:
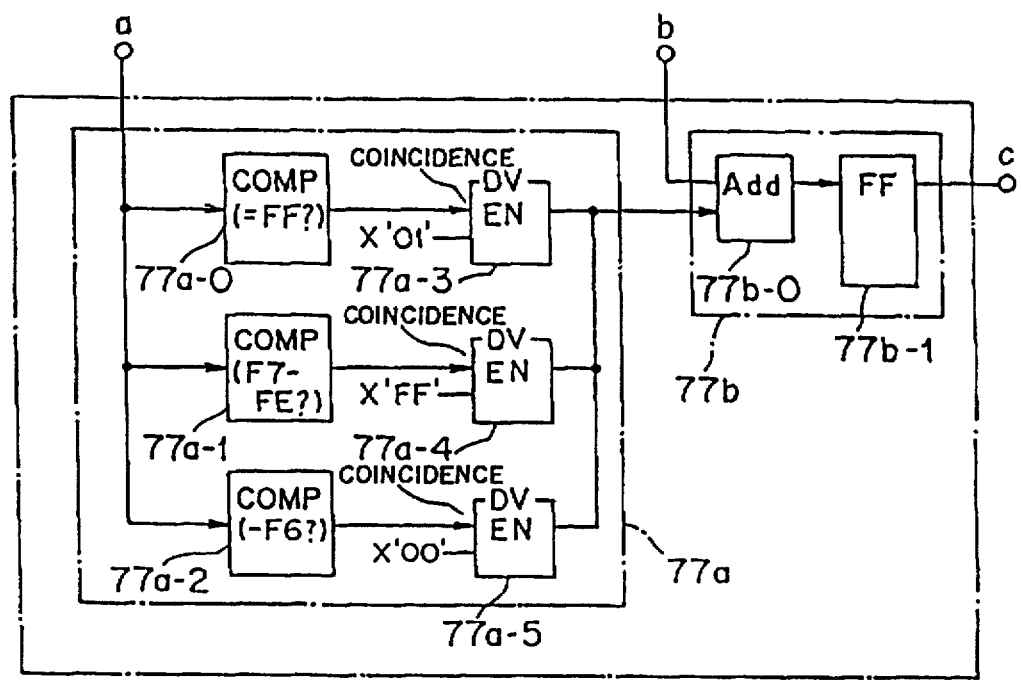
FIG. 15 is a block diagram showing a white level algorithm circuit of the white level information correction apparatus shown in FIG. 14.

The white level algorithm circuit 77 compares white level information and data obtained from the optical image reading unit 410 with each other and corrects the white level information in accordance with a result of the comparison. Referring to FIG. 15, the white level algorithm circuit 77 includes a video signal comparator 77a serving as a digital comparison circuit for comparing digital white level information selected by the selection circuit 75b and digital data obtained from the optical image reading unit 410 with each other, and an addition circuit 77b serving as a white level information correction circuit for correcting the white level information in accordance with a result of the comparison by the video signal comparator 77a.

The white level information correction circuit 70 will be described in more detail.

Referring first to FIG. 14, analog video signals from the CCD arrays 436AA and 436AB are amplified by the amplification circuits 64A and 64B, respectively, and, for example, those analog video signals of the outputs of the amplification circuits 64A and 64B in portions (bits) in which photosensitive portions of the CCD arrays 436AA and 436AB are masked are sampled and held by black level setting circuits (sample hold circuits) 71A and 71B, respectively. The thus held analog video signals are connected as reference signals for a black level to the lower limit sides (VRB) of the analog to digital conversion circuits 60A and 60B. Meanwhile, reference signals for a white level are obtained by converting white level values in lines obtained in the last scanning cycle and stored in the memory circuit 72-1 or 72-2 into analog signals by means of the digital to analog conversion circuits 62A and 62B, and are connected to the upper limit sides (VRT) of the analog to digital conversion circuits 60A and 60B, respectively.

Consequently, the analog to digital conversion circuits 60A and 60B output digital signals on the scale of 256 gradations between the white reference level (VRT) and the black reference level (VRB). In this instance, for the white reference level, an analog value of a white level produced corresponding to a white level obtained in the last scanning cycle for an image is used, and for the black reference level, an analog value of a dot at which the photosensitive portion of the CCD array 436AA or 436AB is masked is used.

By the way, white reference level data extracted from the memory circuit 72-1 or 72-2 is fetched into the corresponding register 73-1 or 73-2, and one of the outputs of the registers 73-1 and 73-2 is selected by the selection circuit 75a and then multiplied by m by the data magnification variation circuit 74.

Further, the output of the data magnification variation circuit 74 or data extracted from the memory circuit 72-1 or 72-2 is selected by the selection circuit 75b and inputted to the terminal b of the white level algorithm circuit 77.

Meanwhile, a digital value of a video signal which is the output of the analog to digital conversion circuit 60 is inputted to the other terminal a of the white level algorithm circuit 77. Consequently, the thus inputted digital value is inputted to comparators (COMP) 77a-0 to 77a-2 of the video signal comparator 77a shown in FIG. 15 and then outputted from the video signal comparator 77a as one of, for example, three different outputs including X"FF" (white represented by X"FF" by the 256 gradation representation), X"F7" to X"FE" (a little dark white represented by X"F7" to X"FE" by the 256 gradation representation) and X"F6" or less (white represented by X"F6" or less by the 256 gradation representation).

In the video signal comparator 77a, when the comparators (COMP) 77a-0 to 77a-2 detect that the digital output of the analog to digital conversion circuit 60 is X"FF" mentioned above (that is, when a coincidence output is obtained), it is recognized that the analog video signal obtained by scanning of the current scanning line of the image is equal to or much higher than a white level obtained by scanning in the last scanning cycle, and the white level value of the preceding cycle is incremented, for example, by one.

However, when it is detected that the digital output of the analog to digital conversion circuit 60 falls within the range from X"FE" to X"F7", it is recognized that the analog video signal is a little lower than the white level obtained in the last scanning cycle, and the white level value of the last cycle is incremented by, for example, "−1", that is, decremented by one. Particularly, since no carry need be taken into consideration, X"FF", which is a complementary number on 2, should be added.

When it is detected that the digital output of the analog to digital conversion circuit 60 is equal to or lower than X"F6", it is recognized that not the white level varies but the image now is on the gray level and is considered that it is not related to correction of the white level, and such control as to perform nothing (particular, to add X"00") is performed to calculate a new white level and determine the new white level as a correction value for scanning of the present scanning line.

When one of the comparators (COMP) 77a-0, 77a-1 and 77a-2 outputs "1", only a corresponding one of gate circuits (DV) 77a-3 to 77a-5 in the video signal comparator 77a outputs the value to be added (X"01", X"FF" or X"00" in FIG. 15) while the other gate circuits (DV) exhibit a high impedance state. For example, when the output is extracted from the gate circuit 77a-3, the other gate circuits 77a-4 and 77a-5 exhibit a high impedance state. Thus, the gate circuits 77a-3 to 77a-5 operate as tri-state elements.

Then, the output from one of the gate circuits (DV) 77a-3 to 77a-5 outputted from the video signal comparator 77a is added to a digital value (W0 to W7 in the last cycle) of the white level of the last cycle, which is the output of the selection circuit 75b, by the addition circuit 77b. Then, a result of the addition is outputted as a correction value (W0 to W7 in the present cycle) of the white level for the present scanning cycle from the terminal c of the white level algorithm circuit 77 and is stored into the memory circuit 72-1 or 72-2 selected by the selection circuit 75c. It is to be noted that, as shown in FIG. 15, the addition circuit 77b is constituted from an adder 77b-0 and a flip-flop 77b-1 of one stage. The flip-flop (FF) 77b-1 operates as a hazard prevention mechanism when the correction value in the present cycle is added to the white level corrected in the last scanning cycle and a result of the addition is stored into the memory circuit 72-1 or 72-2.

Such new white level values based on analog video signals of picture elements of a line obtained by scanning the image by means of the CCD array 436A in such a manner as described above are stored into an area of one of the memory circuits for corresponding picture elements of the line selected by the selection circuit 75d. Then, each time a next line is read and analog to digital conversion is performed, the white level values are read out as correction values and are each used as the upper limit value (VRT) for the analog to digital conversion circuit 60 and further referred to for correction of the white level of each picture element of the line.

Naturally, processing of scanning a certain line of the image by means of the CCD array 436A and reading out analog video signals of the individual picture elements and processing of reading out values of white levels of a line scanned in the last scanning cycle from the memory circuit 72-1 or 72-1 are synchronized with a shift pulse signal used to scan the image by means of the CCD array 436A, and the address in the scanning line and the address of the memory circuit 72-1 or 72-2 described hereinabove (the address of the memory circuit of the 8 Kword capacity) are synchronized with each other with an offset of one address.

Further, in the white level information correction circuit 70, for example, in such a case that paper sheets whose ground color is white have been read till now and blue print paper sheets of a different ground color are to be read subsequently, the white level value to be provided to the analog to digital conversion circuit 60A or 60B is varied in response to an instruction signal from the MPU circuit 150 when a manual instruction or an automatic instruction is provided to the MPU circuit 150. To this end, white level information stored in the memory circuit 72-1 (or 72-2) is taken out and stored into the register 73-1 (or 73-2), and then the output of the register 73-1 is selected by the selection circuit 75a so that it is subsequently multiplied by m by the data magnification variation circuit 74. The magnification variation factor m can be modified freely in response to an instruction from the MPU circuit 150. This increases the degree of freedom in correction of a white level.

Then, the output of the data magnification variation circuit 74 is selected by the selection circuit 75b and then processed by required processing by the white level algorithm circuit 77, and then the white level of the thus varied magnification is stored into the other memory circuit 72-2 (or 72-1) by way of the selection circuit 75c. Then, the white level of the varied magnification is used as a conversion reference of the analog to digital conversion circuit 60.

Figure 18:
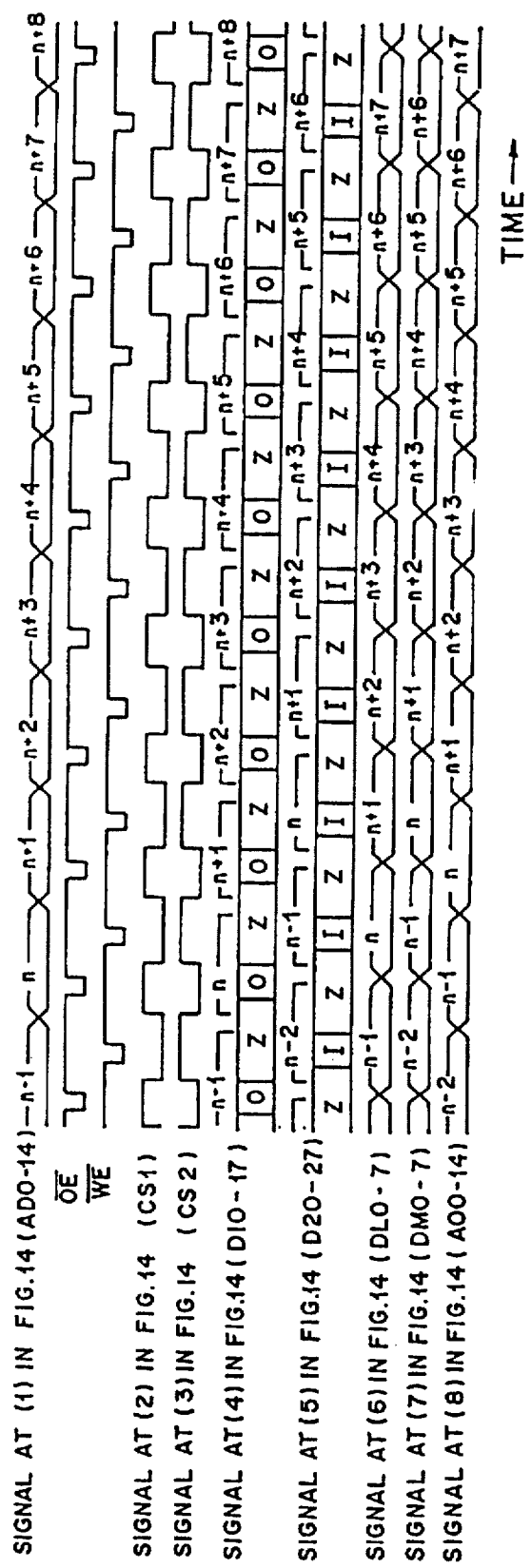
FIG. 18 is a time chart illustrating operation of the while level information correction apparatus shown in FIG. 14.

It is to be noted that signals at several locations of the circuitry shown in FIG. 14 in this instance (locations denoted at (1) to (8) in FIG. 14, and the output enable signal OE and the write enable signal WE for a memory circuit) are illustrated in the time chart of FIG. 18.

Thereafter, so far as such blue print paper sheets are used, white level information from the memory circuit 72-2 (or 72-1) in which data of the white level information multiplied by m is stored is extracted, and now, the output of the memory circuit 72-2 (or 72-1) is inputted by way of the selection circuit 75b to the white level algorithm circuit 77, by which the processing described above is performed subsequently so that the white level value may have an appropriate value to update the white level.

Consequently, even in such a case that paper sheets whose ground color is white have been read till now and blue print paper sheets of a different ground color are to be read subsequently, the white level information correction apparatus copes with this sufficiently and can perform analog to digital conversion with a high degree of accuracy. Besides, by constructing the correction circuit for a white level from a digital circuit, analog parts in the entire circuit and patterns of a printed circuit board of an image inputting device can be reduced to the minimum. Further, since correction of a white level is performed by digital processing, no oscillation occurs in a high frequency band whereas it occurs often with an analog comparator. Accordingly, also the advantage that an increase in stability of operation and in efficiency and certainty in designing can be achieved is obtained.

Figure 16:
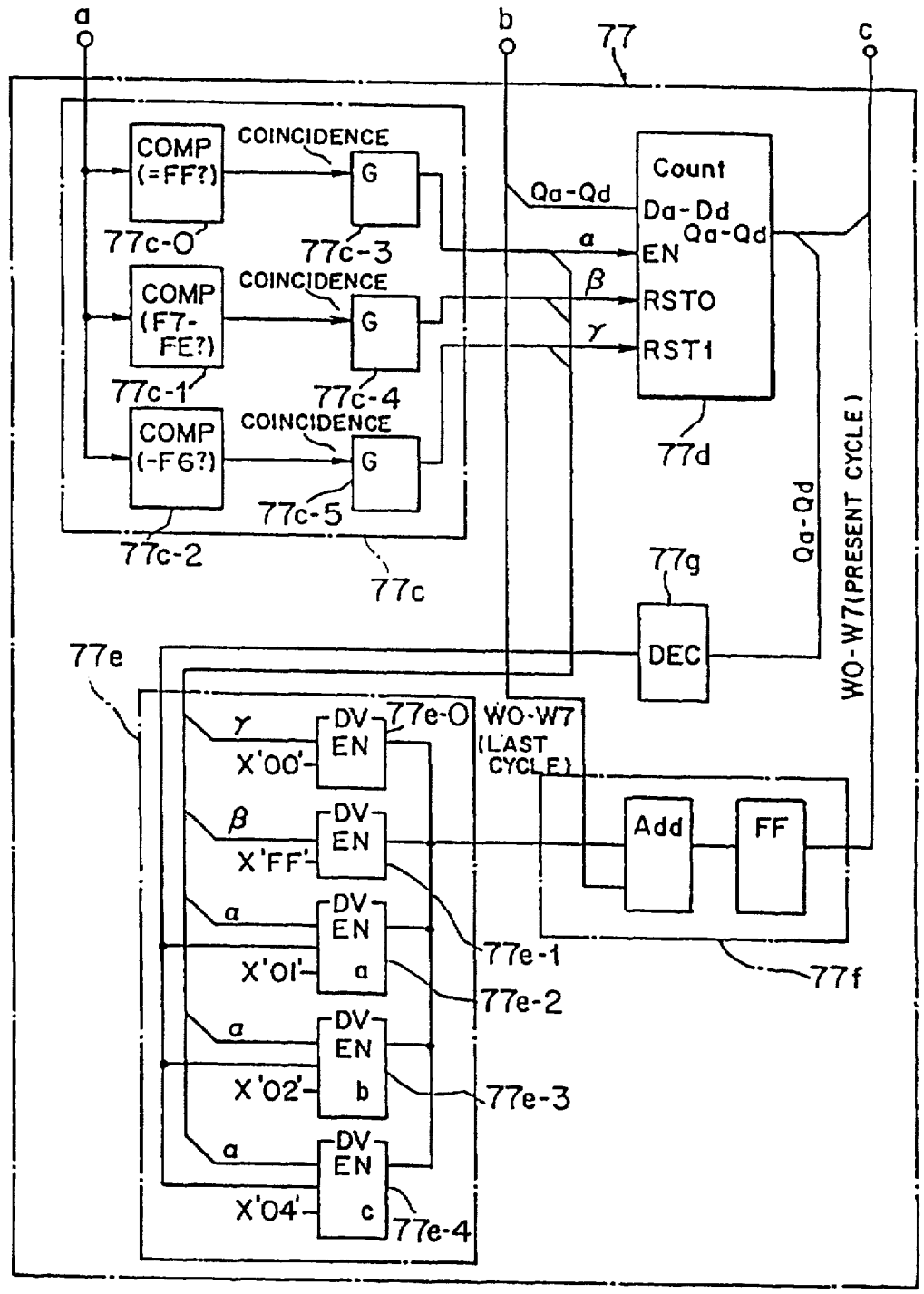
FIG. 16 is a block diagram showing another form of the white level algorithm circuit of the white level information correction apparatus shown in FIG. 14.

Further, the white level algorithm circuit 77 may include, as shown in FIG. 16, a video signal comparator 77c serving as a control signal generation circuit for comparing digital white level information selected by the selection circuit 75b and digital data obtained from the optical image reading unit 410 with each other and outputting, in accordance with a result of the comparison, a control signal representing that the digital data is a predetermined value, a counting section (counting circuit) 77d for counting the number of times by which a control signal is successively outputted in the direction of a line from the video signal comparator 77c, an addition value selecting multiplexer 77e serving as a white level information correction circuit for correcting white level information in accordance with a counted value of the counting section 77d, and an addition circuit 77f.

In particular, also in this instance, a digital signal from the analog to digital conversion circuit 60 is inputted to comparators (COMP) 77c-0 to 77c-2 in the video signal comparator 77c, by which it is divided, for example, into three different outputs (X"FF", X"F7" to X"FE", and X"F6" or less) by similar operation to that described hereinabove with reference to FIG. 15.

The outputs of the comparators (COMP) 77c-0 to 77c-2 in the video signal comparator 77c in this instance are outputted by way of gate circuits (G) 77c-3 to 77c-5 and inputted to the counting section (Count) 77d as seen from FIG. 16.

In this instance, each of the memory circuits 72-1 and 72-2 stores information of 8 bits (W0 to W7) necessary to store digital values of white levels of ordinary picture elements obtained by scanning in the last scanning cycle. The 8 bits mentioned above are a new white level signal to be used for a next line which has been produced from a digital value outputted from the analog to digital conversion circuit 60 described hereinabove and an upper limit signal used thereupon by the analog to digital conversion circuit 60. Each of the memory circuits 72-1 and 72-2 further stores, for example, the output of four bits (Qa to Qd) of the counting section (Count) 77d corresponding to each bit of the line.

The output signal of the comparator (COMP) (=FF?) 77c-0 mentioned above is connected to a count enable (EN) terminal of the counting section (Count) 77d, and the four bits (Qa to Qd) of the count value for each picture element obtained by scanning in the last scanning cycle and stored in the memory circuit 72-1 or 72-2 are inputted to terminals Da to Dd of the counting section (Count) 77d. While the count value (Da to Dd) is inputted, when the output of the analog to digital conversion circuit 60A or 60B in the present scanning cycle is X"FF" and consequently a coincidence signal is outputted from the comparator (COMP) (=FF?) 77c-0 so that the count enable (EN) terminal of the counting section (Count) 77d is energized, the counting section (Count) 77d counts up the input value (Da to Dd). However, when the count enable (EN) terminal is not energized and the output signal of one of the other comparators (COMP) (=F7 to FE?, −F6?) 77c-1 and 77c-2, the reset terminal (RST0 or RST1) of the counting section (Count) 77d is energized so that the count value (Da to Dd) for each picture element is cleared.

In particular, in the counting section (Count) 77d, the count value (Qa to Qd) in the last scanning line for each dot of the CCD array 436A is read out from a corresponding address of the memory circuit 72-1 or 72-2 in synchronism with a shift pulse for shifting the CCD array 436A and is loaded to the Da to Dd terminals of the counting section (Count) 77c so that X"FF" which represents a white level is counted for each dot to determine by what number of success lines X"FF" appears. When the digitally converted value of the dot falls within the range of X"F7" to X"FE" or X"F6" or less, the count value for the dot loaded to the Da to Dd terminals of the counting section (Count) 77d is cleared.

In the addition value selecting multiplexer (correction value conversion circuit) 77e shown in FIG. 16, one of gate circuits (DV) 77e-0 to 77e-4 is selected in response to a signal obtained from a decoder (DEC) 77g by decoding an output value of the counting section (Count) 77d and signals α, β and γ(τ) outputted from the comparators (COMP) 77c-0, 77c-1 and 77c-2 of the video signal comparator 77c by way of the gate circuits (G) 77c-3, 77c-4 and 77c-5, respectively, to select an addition value (X"01", "X02" or X"04") to be added to a white level of each picture element of a line obtained by the line scanning in the last scanning cycle and stored in the memory circuit 72-1 or 72-2.

The decoded signal from the decoder 77g is "01" when the count value of the counting section 77d is "1", that is, when the count value signifies that the white level corrected in the last scanning cycle is not X"FF" but the white level in the present scanning cycle is X"FF"; the decoded signal is "02" when the count value is "02", that is, when the count value signifies that the white level corrected in the last scanning cycle is X"FF" and also the white level in the present scanning cycle is X"FF"; and the decoded signal is "03" when the count value is "03", that is, when the count value signifies that the white level corrected in the second last scanning cycle is X"FF" and also the white level corrected in the last scanning cycle is X"FF" and besides also the white level in the present scanning cycle is X"FF".

Accordingly, when the count value (Qa to Qd) of the counting section (Count) 77d is, for example, "01", it is recognized that the corrected white level value in the last scanning cycle was not X"FF", and the gate circuit (DV) 77e-2 of the addition value selecting multiplexer 77e is selected. Consequently, the input α to the gate circuit (G) 77e-2 is energized to determine "+1" as the correction value for the white level value of the last scanning cycle so that the correction value "+1" may be added by the addition circuit 77f.

Similarly, when the count value (Qa to Qd) of the counting section (Count) 77d is, for example, "02", it is recognized that the corrected white level value in the last scanning cycle was X"FF" and then the white level of the dot in the present scanning cycle is X"FF", and the gate circuit (DV) 77e-3 is selected. Consequently, the input α to the gate circuit (C) 77e-3 is energized to determine "+2" as the correction value for the white level value of the last scanning cycle.

Further, similarly, when the count value (Qa to Qd) of the counting section (Count) 77d is, for example, equal to or higher than "03", it is recognized that the successive corrected white level values in the last scanning cycle and the second last scanning cycle were X"FF" and then also the white level of the dot in the present scanning cycle is X"FF", and the gate circuit (DV) 77e-4 is selected. Consequently, the input α to the gate circuit (G) 77e-4 is energized to determine "+4" as the correction value for the white level value of the last scanning cycle.

In any other instance, depending upon whether an output is outputted from the comparator (=F7 to FE?) 77c-1 or the comparator (−F6?) 77c-2 of the video signal comparator 77c, the corresponding gate circuit (DV) 77e-0 or 77e-1 is selected so that the input β or γ(τ) of the gate circuit (G) 77e-1 or 77e-0 is energized. Consequently, same correction as that described hereinabove with reference to FIG. 15 is performed.

In particular, the control method in the present example described above is characterized in that, when X"FF" as a white level successively appears in successive lines at a certain dot, it is recognized that a sudden variation in white has occurred and thus such a correction is performed that the white level value is raised progressively in accordance with such sudden variation in white.

Figure 17:
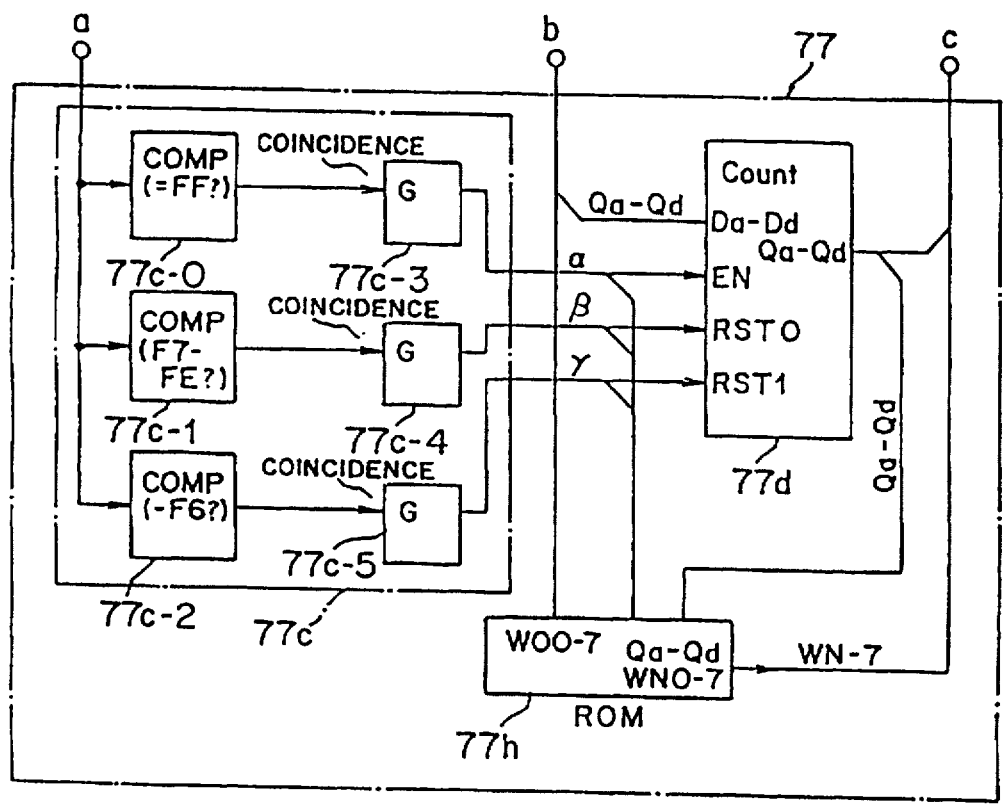
FIG. 17 is a block diagram showing a further form of the white level algorithm circuit of the white level information correction apparatus shown in FIG. 14.

FIG. 17 shows a modification to the white level algorithm circuit 77 shown in FIG. 16. In particular, referring to FIG. 17, the modified white level algorithm circuit 77 includes, for example, a read-only memory (ROM) 77h in place of the addition value selecting multiplexer 77e and the addition circuit 77f of the white level algorithm circuit 77 shown in FIG. 16. In particular, the output value (4 bits) of the counting section (Count) 77d, the output (3 bits) of the video signal comparator 77c and a white level value (8 bits) in the memory circuit 72-1 or 72-2 obtained by scanning in the last scanning cycle are applied as an address signal to the ROM 77h so that a white level value calculated and stored in advance in the ROM 77h is outputted from the ROM 77h.

The white level value outputted in this manner is stored into the position corresponding to the dot together with the value (Qa to Qd) of the counting section (Count) 77d and then used for calculation for white level correction upon analog to digital conversion in a next line.

Then, also in this instance (in the case of FIGS. 16 or 17), in such a case that paper sheets whose ground color is white have been read till now and blue print paper sheets of a different ground color are to be read subsequently, the white level value to be provided to the analog to digital conversion circuit 60 is varied in response to an instruction signal from the MPU circuit 150 by the white level information correction circuit 70 in a similar manner as described above. In particular, white level information stored in the memory circuit 72-1 (or 72-2) is taken out and stored into the register 73-1 (or 73-2), and then the output of the register 73-1 (or 73-2) is selected by the selection circuit 75a so that it is subsequently multiplied by m by the data magnification variation circuit 74. Then, the output of the data magnification variation circuit 74 is selected by the selection circuit 75b and then processed by required processing by the white level algorithm circuit 77, and then the white level of the thus varied magnification is stored into the other memory circuit 72-2 (or 72-1) by way of the selection circuit 75c.

Then, the white level of the varied magnification is used as a conversion reference of the analog to digital conversion circuit 60.

Thereafter, so far as such blue print paper sheets are used, the white level from the memory circuit 72-2 (or 72-1) is extracted, and now, the output of the memory circuit 72-2 (or 72-1) is inputted by way of the selection circuit 75b to the white level algorithm circuit 77. Then, the processing described above is performed subsequently by the white level algorithm circuit 77 shown in FIGS. 16 or 17 so that the white level value may have an appropriate value to update the white level.

Consequently, even in such a case that paper sheets whose ground color is white have been read till now and blue print paper sheets of a different ground color are to be read subsequently, the white level information correction apparatus copes with this sufficiently and can perform analog to digital conversion with a high degree of accuracy. Besides, by constructing the correction circuit for a white level from a digital circuit, analog parts in the entire circuit and patterns of a printed circuit board of an image inputting device can be reduced to the minimum. Further, since correction of a white level is performed by digital processing, no oscillation occurs in a high frequency band whereas it often occurs with an analog comparator. Accordingly, also the advantage that an increase in stability of operation and in efficiency and certainty in designing can be achieved is obtained.

Further, in the case described above, since the digital circuit portion of the white level algorithm circuit 77 can be constructed only from ordinary logical OR and AND gate circuits, it can be included readily into a large scale integrated circuit (LSI).

Further, in the arrangement shown in FIG. 17, since the addition value selecting multiplexer 77e and the addition circuit 77f described hereinabove with reference to FIG. 15 are replaced, for example, with the ROM 77h, the number of parts can be reduced, and higher density mounting can be anticipated.

Figure 19:
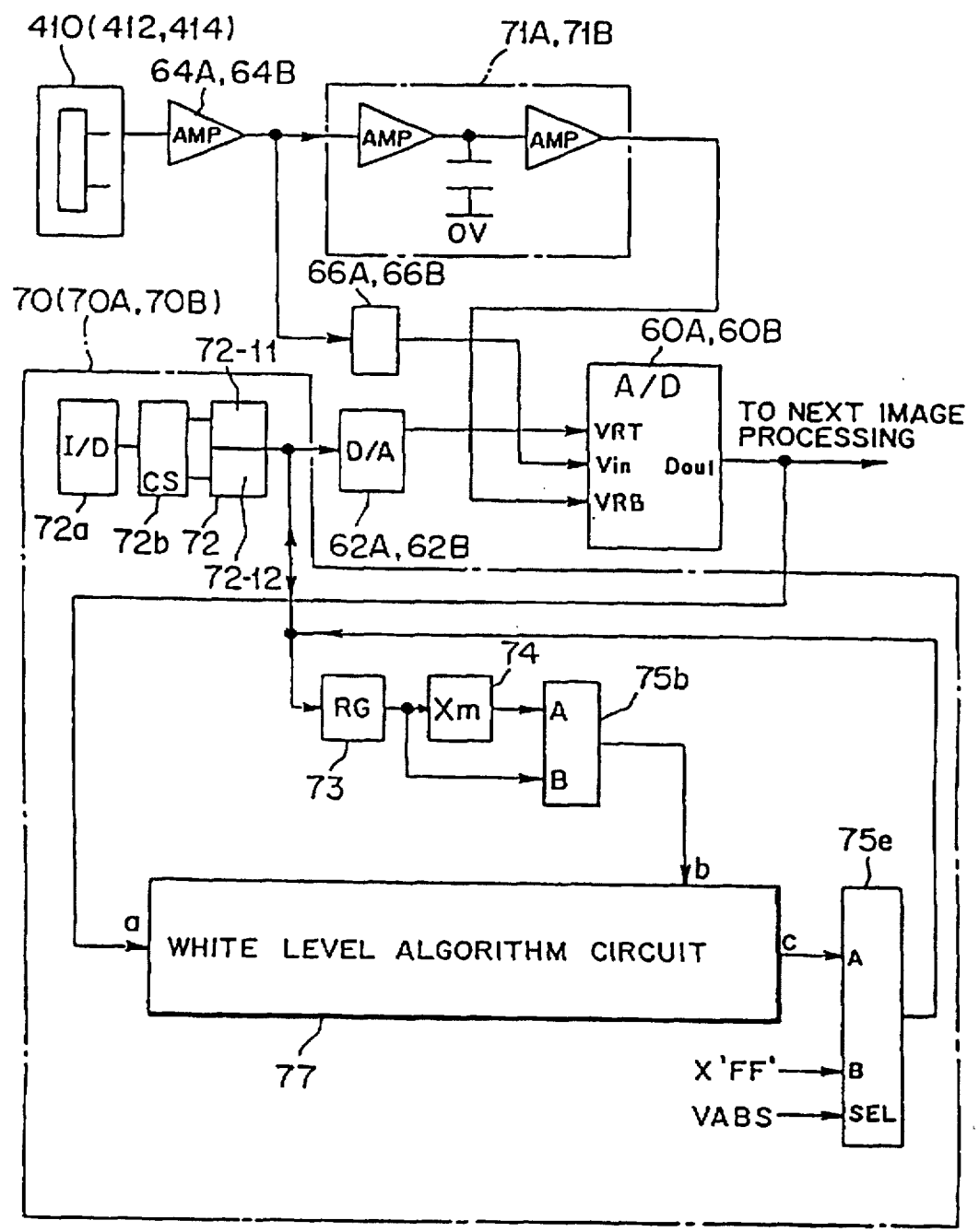
FIG. 19 is a block diagram showing the construction of another white level information correction apparatus to which the present invention is applied together with several associated elements.

By the way, in the arrangement shown in FIG. 14, the plurality of (two) memory circuits 72-1 and 72-2 are used in order to store white level information, and the memory circuits 72-1 and 72-2 are selectively used using a chip selection function of the address controller 72b. However, such an alternative arrangement as shown in FIG. 19 may be employed wherein a single memory circuit 72 is employed and an address of the memory circuit 72 is designated by the address controller 72b so as to selectively use a pair of different storage areas 72-11 and 72-12 of the memory circuit 72.

Also in this instance, for example, in such a case that paper sheets whose ground color is white have been read till now and blue print paper sheets of a different ground color are to be read subsequently, the white level value to be provided to the analog to digital conversion circuit 60 is varied by the white level information correction circuit 70 shown in FIG. 19 in a similar manner as described above. In particular, white level information stored in a certain storage area 72-11 (or 72-12) of the memory circuit 72 is taken out and stored into the register 73, and then the output of the register 73 is subsequently multiplied by m by the data magnification variation circuit 74. Then, the output of the data magnification variation circuit 74 is selected by the selection circuit 75b and then processed by required processing by the white level algorithm circuit 77 (refer to FIGS. 15 to 17), and then the white level of the thus varied magnification is stored into the other storage area 72-12 (or 72-11). Then, the white level of the thus varied magnification is used as a conversion reference of the analog to digital conversion circuit 60.

Thereafter, so far as such blue print paper sheets are used, white level information from the storage area 72-12 (or 72-11) is extracted, and now, the output of the storage area 72-12 (or 72-11) is inputted by way of the selection circuit 75b to the white level algorithm circuit 77. Then, the processing described above is performed subsequently by the white level algorithm circuit 77 shown in FIGS. 15 to 17 so that the white level value may have an appropriate value to update the white level.

In this manner, also in this instance, the effects or advantages achieved by the embodiment described above can be achieved. Further, since the single memory circuit 72 is employed and the storage area 72-11 and 72-12 of the memory circuit 72 are selectively used by designating the address by means of the address controller 72b, there is no necessity any more of preparing a plurality of independent memory circuits. Consequently, handling of the white level information correction circuit 70 is facilitated.

Figure 20:
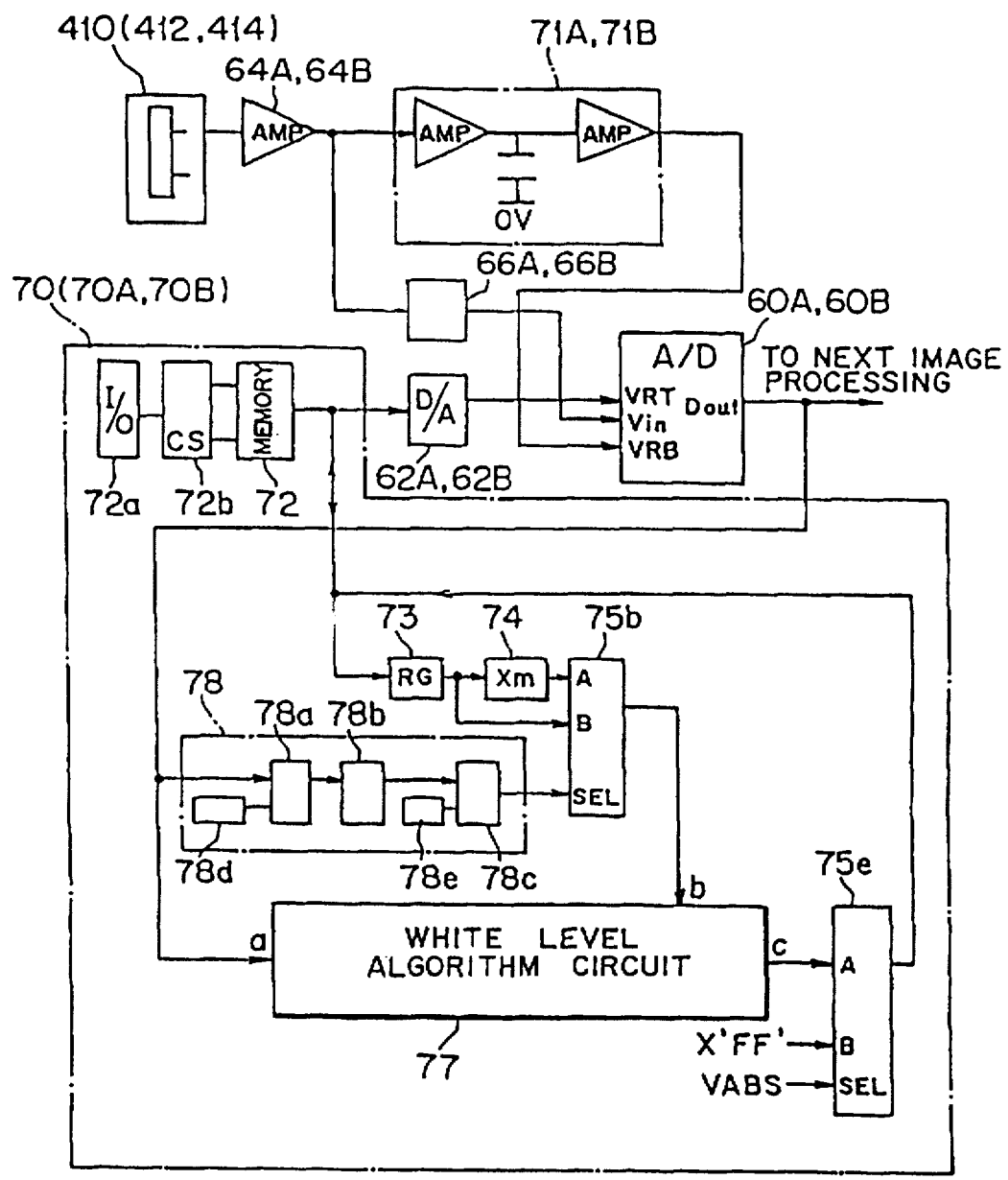
FIG. 20 is a block diagram showing the construction of a further white level information correction apparatus to which the present invention is applied together with several associated elements.

Such another alternative arrangement as shown in FIG. 20 may be employed wherein a switching control circuit 78 is additionally provided for automatically controlling selective switching of the selection circuit 75b in accordance with a result of determination which is conducted by the data magnification variation circuit 74 based on data obtained from the optical image reading unit 410 to determine whether white level information should be varied by magnification variation.

In particular, the switching control circuit 78 includes a pair of comparators 78a and 78c and a counter 78b. In the switching control circuit 78, the output of the analog to digital conversion circuit 60 is first compared with a reference value from reference value setting means 78d by the comparator 78a, and if the output of the analog to digital conversion circuit 60 is higher than the reference value, the counter 78b counts up by one. Further, the output of the counter 78b is compared with a dot reference value from dot reference value setting means 78e by the comparator 78c. If the output of the analog to digital conversion circuit 60 is higher by more than a predetermined line number than the reference value, then since the output of the counter 78b is higher than the dot reference value, a signal to instruct the selection circuit 75b to select the data magnification variation circuit 74 is developed from the comparator 78c. In response to the signal, the selection circuit 75b selects the output of the data magnification variation circuit 74, and consequently, the white level is varied more suddenly than that by variation by the white level algorithm circuit 77. Then, the variation is performed automatically based on data obtained from the optical image reading unit 410 as described above. It is to be noted that, when the output of the analog to digital conversion circuit 60 is still higher by more than the predetermined line number than the reference value even after the selection circuit 75b is switched to the data magnification variation circuit 74 side, the white level varied once is further varied by the data magnification variation circuit 74. In particular, if the white level is varied, for example, twice, then the white level is varied to $m^2$ times.

It is to be noted that, in FIG. 20, a selection circuit 75e is further provided. The selection circuit 75e selects the output of the white level algorithm circuit 77 or predetermined value data (X"FF" which corresponds to the maximum value). In particular, a control signal VABS is supplied from the MPU circuit 150 to the selection circuit 75e so that, in an initial state, the predetermined value data is outputted from the selection circuit 75e, and thereafter, the output of the white level algorithm circuit 77 is outputted from the selection circuit 75e.

In this manner, also with the white level information correction circuit 70 shown in FIG. 20, the effects or advantages which can be achieved by the embodiment described above can be achieved. Further, since it is determined by the data magnification variation circuit 74 based on data obtained from the optical image reading unit 410 whether or not white level information should be varied by magnification variation and then selective switching of the selection circuit 75b is automatically controlled in accordance with a result of the determination, even when paper sheets used are changed, the white level can be automatically varied rapidly.

It is to be noted that, while, in the several arrangements described above, the white level is varied for each picture element, it need not necessarily be corrected for each picture element, but may naturally be corrected, for example, for each line.

Referring back to FIG. 3, an image signal after digital conversion by the analog to digital conversion circuit 60 is transferred to the image processing section 68A or 68B for next image processing such as, for example, emphasis processing to emphasize the contrast between white and black or "dither processing: binary digitization processing" for a net point image (which is constituted from a large number of fine dots; dot image) such as a photograph image.

3-3. Outputting Section and Output Control Circuit

In each of the image data processing systems D1 and D2, information digitized by the analog to digital conversion circuit 60A or 60B is sent, after it is processed by emphasis processing and/or binary digitization processing by the image processing section 68A or 68B, to the outputting section 90 as seen from FIG. 3, and paper front face data and paper rear face data are transferred from the outputting section 90 to the host computer (not shown).

Figure 21:
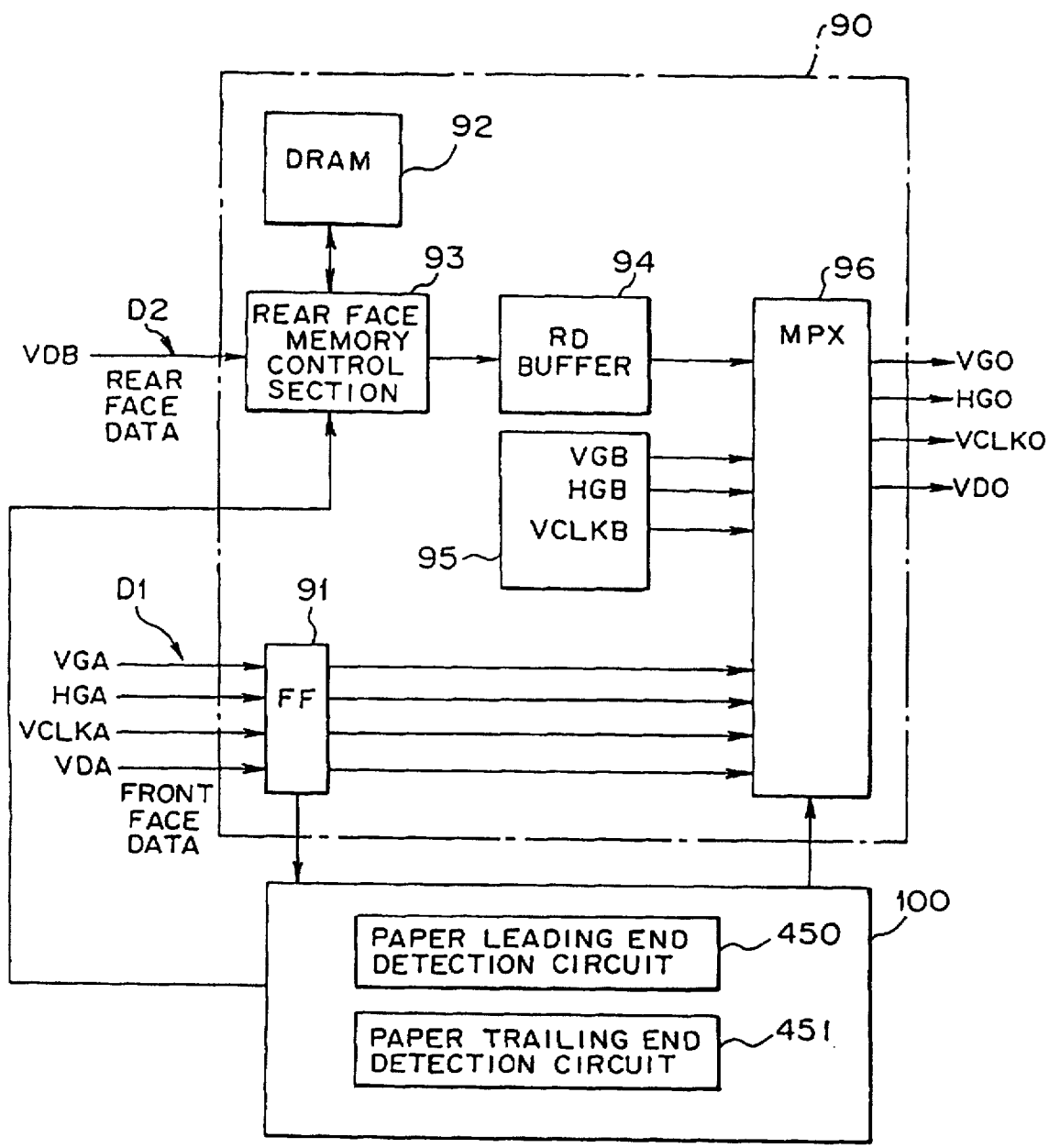
FIG. 21 is a block diagram showing the construction of an outputting section and an output control circuit of the image data processing system shown in FIG. 2.

Referring now to FIG. 21, the outputting section 90 includes a latch circuit 91, a DRAM (buffer storage apparatus) 92, a rear face memory control section 93, a read data buffer 94, a rear face timing generation section 95 and a selection circuit 96.

The latch circuit 91 latches paper front face data VDA and front face timing signals VGA, HGA and VCLKA from the image data processing system D1 for processing paper front face data and notifies to the output control circuit 100 that the paper front face data and the surface timing signals have been latched by the latch circuit 91. It is to be noted that a flip-flop may be used for the latch circuit 91.

The timing signal VGA is a gate signal in a horizontal direction (direction of a line; main scanning direction), and the timing signal HGA is a gate signal in a vertical direction (paper transporting direction; sub-scanning direction). One bit of a picture element in one line on the front face of a paper sheet can be extracted using the timing signal VGA and the timing signal HGA. Further, the timing signal VCLKA is a clock signal which defines the transfer rate of front face data.

The DRAM 92 is a memory circuit for storing paper rear face data VDB. Storage and read-out control of the DRAM 92 is performed by the rear face memory control section 93. In particular, the rear face memory control section 93 is constructed as a DMAC (dynamic memory access controller) and stores paper rear face data VDB sent thereto into the DRAM 92. After paper front face data VDA for one sheet are sent, the rear face memory control section 93 controls the DRAM 92 so that, between successive storing operations of paper rear face data VDB into the DRAM 92, the paper rear face data VDB are read out from the DRAM 92 (in this instance, the paper rear face data VDB are read out in units of one bit).

It is to be noted that all data for one full paper sheet from the later operating image reading unit 414 need not necessarily be stored into the DRAM 92, and actually, those data obtained after outputting of data for one full paper sheet from the first operating image reading unit 412 is completed until all information stored in the DRAM 92 is sent out are stored. In particular, data from the later operating image reading unit are stored for a period of time after outputting of data for one full paper sheet from the other first operating image reading unit is completed until it becomes possible to pass and output data from the later operating image reading unit through and from the rear face memory control section 93. This can decrease the memory capacity.

It is a matter of course that data from the later operating image reading unit 414 may all be stored for one full paper sheet into the DRAM 92. This facilitates memory control.

The read data buffer 94 temporarily stores, between successive storing operations of paper rear face data VDB into the DRAM 92, paper rear face data VDB partially read out from the DRAM 92 and produces arranged data to be sent. Where the read data buffer 94 is provided in this manner, data can be read out little from the DRAM 92 while giving priority to writing into the DRAM, and consequently, the data transfer time can be reduced.

It is to be noted that the rate at which data are read out from the DRAM 92 and the read data buffer 94 is set equal to twice the writing rate, that is, the transfer rate of front face data to the host computer.

The rear face timing generation section 95 generates rear face timing signals VGB, HGB and VCLKB. Also in this instance, the timing signal VGB is a gate signal in a horizontal direction (direction of a line; main scanning direction), and the timing signal HGB is a gate signal in a vertical direction (paper transporting direction; sub-scanning direction). One bit of a picture element in one line on the rear face of a paper sheet can be extracted using the timing signal VGB and the timing signal HGB. Further, the timing signal VCLKB is a clock signal which defines the transfer rate of front face data. In this instance, the rate of the rear face timing signal VCLKB is set to twice that of the front face timing signal VCLKA. Due to the rate and also due to the data read-out data rate from the DRAM 92 and the read data buffer 94, rear face data are transferred at the rate equal to twice that of front face data.

The selection circuit 96 receives a control signal from the output control circuit 100 and selectively outputs paper front face data or paper rear face data in accordance with the control signal. In this instance, after paper front face data are transferred for one full paper sheet, the data to be outputted are switched so that paper rear face data are thereafter transferred for one complete paper sheet.

It is to be noted that the output control circuit 100 is switched to the paper front face data side in response to paper leading end detection information but is switched to the paper rear face data side in response to paper trailing end detection information. Such detection of a leading end or a trailing end of a paper sheet will be hereinafter after described.

Therefore, it is considered that the outputting section 90 includes the storage means (DRAM) 92 for storing data (paper rear face data) from that one of the first optical image reading unit 412 and the second optical image reading unit 414 which serves as a later operating image reading unit (in the present example, the second optical image reading unit 414) from which paper image information is read out later than from the other image reading unit.

Also it is considered that the outputting section 90 further includes first data transfer means (the latch circuit 91 and the selection circuit 96) for successively transferring, by way of a data transfer line, paper front face data from that one of the first optical image reading unit 412 and the second optical image reading unit 414 which serves as a first operating image reading unit (in the present example, the first operating image reading unit 412) from which paper image information is read out first, and second data transfer means (the rear face memory control section 93, the rear face timing generation section 95 and the selection circuit 96) for successively transferring, by way of another data transfer line, after paper front face data from the first operating image reading unit 412 are transferred by the first data transfer means, paper rear face data from the later operating image reading unit 414 stored in the storage means 92 at a rate (in the present example, at the twice rate) higher than the data transfer rate by the first data transfer means.

Further, it is also considered that the outputting section 90 further includes auxiliary storage means (the read data buffer 94) for storing partial paper image information read out from the storage means 92 between successive writing operations of data into the storage means (DRAM) 92.

It is to be noted that the reason why paper rear face data are sent at a rate twice that of paper front face data is that it is desired that paper rear face data be transferred to the host computer side before the paper sheet 40 whose front face and rear face have been read is thereafter discharged to the stacking mechanism 500. This is because, if a paper sheet is discharged to the stacking mechanism 500, then transportation of a new paper sheet is started and reading of data of the paper sheet is started. In other words, paper rear face data are transferred at the rate twice that of paper front face data because it is desired to complete transfer of rear face data before transportation of a next paper sheet is started. Accordingly, naturally the value twice may possibly be varied depending upon the length of the paper transport path, the paper transport velocity or the like of the image reading apparatus.

Figure 22:
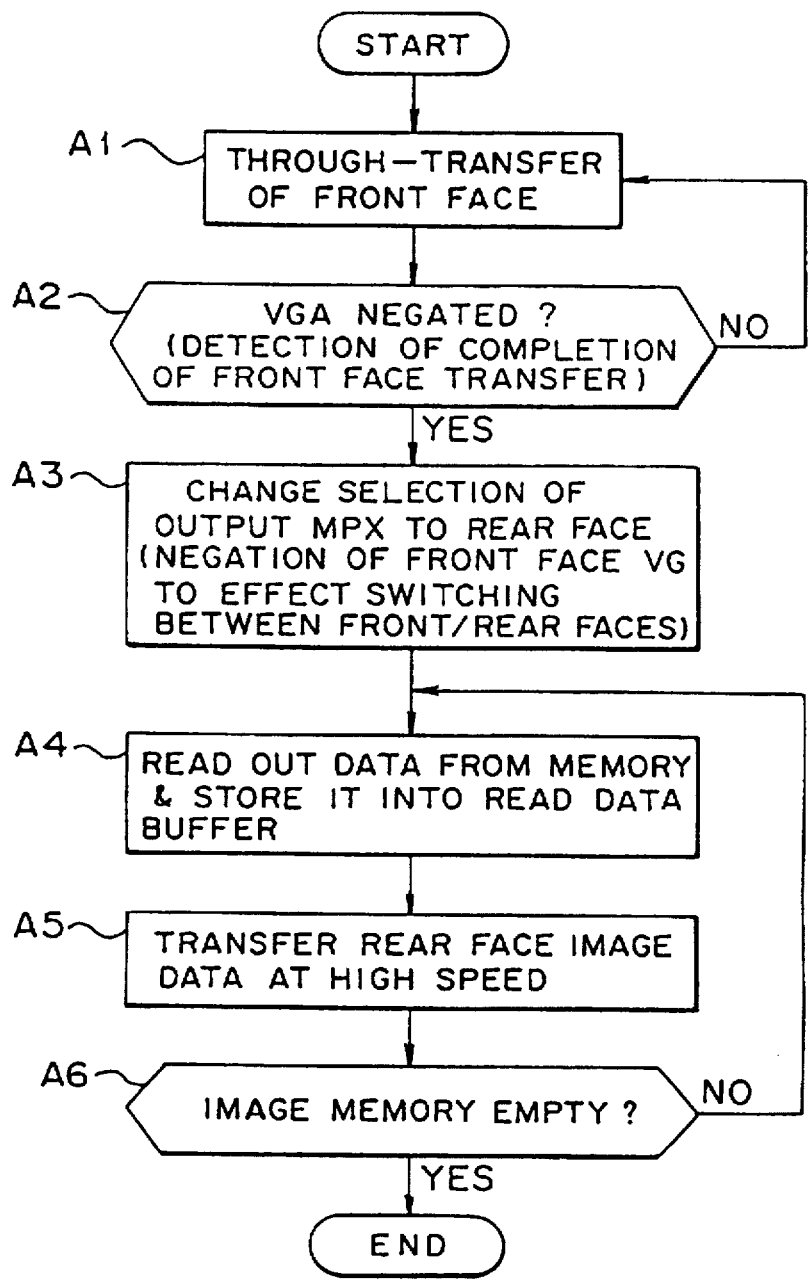
FIG. 22 is a flow chart illustrating operation of the outputting section and the output control section shown in FIG. 21.

Accordingly, the outputting section 90 operates in such a manner as illustrated in FIG. 22.

Referring to FIG. 22, since the selection circuit 96 is initially switched to the paper front face data side, paper front face data are transferred by through-transfer (step A1). Thereafter, when the signal VGA becomes negated, that is, when transfer of the front face data is completed, the route of "YES" is taken at step A2, and then the selection circuit 96 is switched to the paper rear face data side (step A3). Then, at step A4, paper rear face data are read out from the DRAM 92 and transferred at a high rate to the read data buffer 94 (step A5). Then, this operation is repeated until the DRAM (image sensor) 92 becomes emptied (step A6).

Due to the construction described above, data (paper front face data) from the first operating image reading unit 412 from one of the first optical image reading unit 412 and the second optical image reading unit 414 from which paper image information is to be read out first are first transferred successively by way of a data transfer line, and data (paper rear face data) from the later operating image reading unit 414 from one of the first optical image reading unit 412 and the second optical image reading unit 414 from which paper image information is to be read out later are temporarily stored into the DRAM 92 and, after the data from the first operating image reading unit 412 are transferred completely, the stored data from the later operating image reading unit 414 are successively transferred at a rate higher than the transfer rate of the data from the first operating image reading unit 412 by way of another data transfer line. Consequently, the following advantages can be obtained.

In particular, even if image reading by the later operating image reading unit 414 is started before image reading by the first operating image reading unit 412 is completed, data within the overlapping period can be held with certainty. Besides, data from the later operating image reading unit 414 from which data are transferred later can be transferred rapidly to the host computer side.

Accordingly, even where the image reading units 412 and 414 are disposed in the proximity of the paper transport path in order to achieve minimization, reduction in weight and compaction of the apparatus, data of the front and rear faces of a paper sheet can be transferred to the host computer side before the paper sheet is discharged to the stacking mechanism 500. Consequently, even if paper sheets are successively transferred at a high speed while achieving minimization, reduction in weight and compaction of the apparatus, data of the front and rear faces of each paper can be read and transferred to the host computer side satisfactorily.

By the way, the output control circuit 100 includes, as described hereinabove, the paper leading end detection circuit 450 for detecting paper leading end information and the paper trailing end detection circuit 451 for detecting paper trailing end information.

Figure 23:
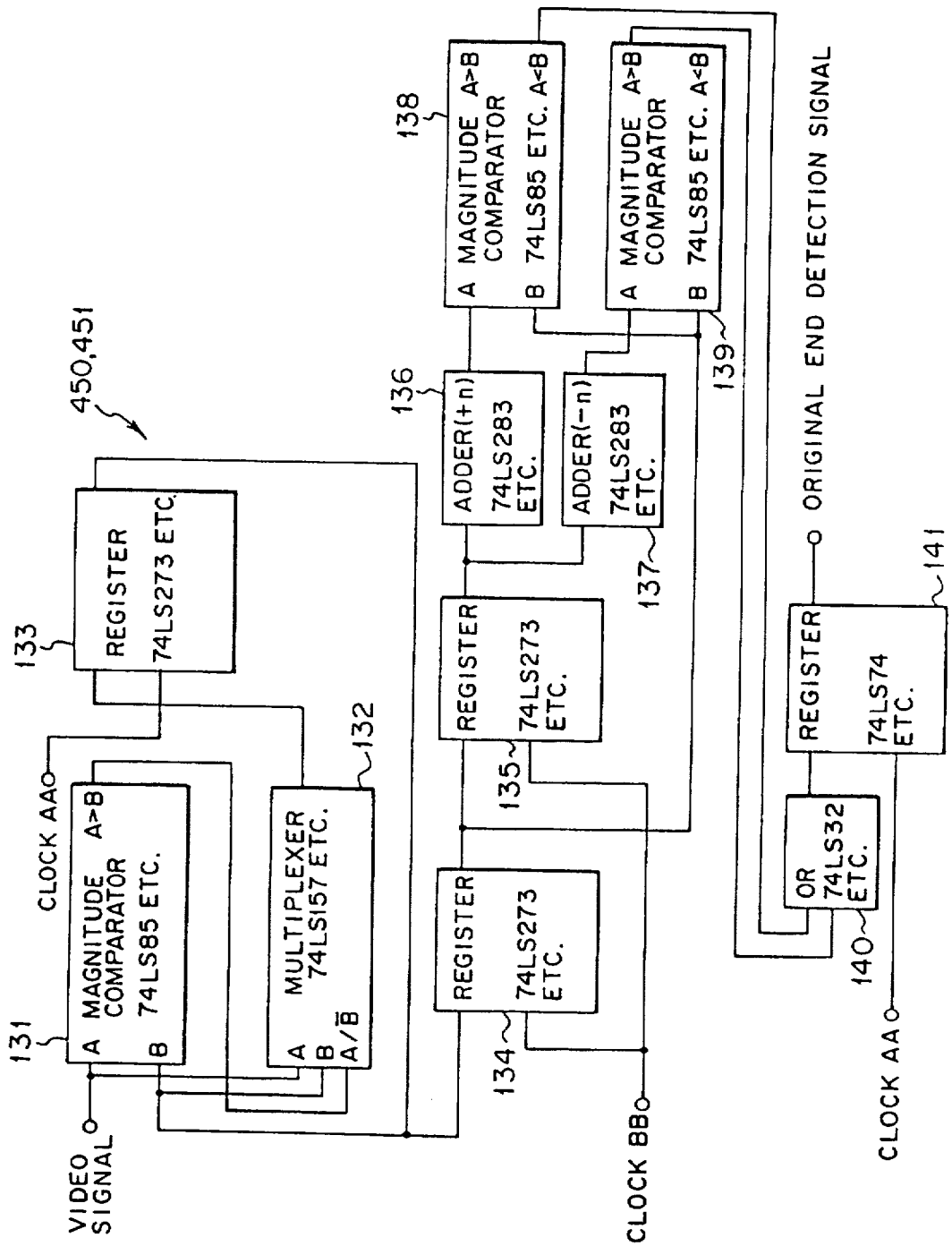
FIG. 23 is a block diagram showing the construction of an original end detection circuit of the image data processing system shown in FIG. 2.

The paper leading end detection circuit 450 and the paper trailing end detection circuit 451 have a same circuit construction and each includes, as shown in FIG. 23, magnitude comparators 131, 138 and 139, a multiplexer 132, registers 133, 134, 135 and 141, adders 136 and 137, and an OR gate 140.

Due to the construction, a video signal (paper front face data) from the image reading unit 412 is inputted to an input terminal A of the magnitude comparator 131. The magnitude comparator 131 thus compares the video signal from the image reading unit 412 with the output of the register 133 which is inputted to the magnitude comparator 131 by way of another input terminal B. In this instance, if the video signal is higher, then the video signal is outputted from the multiplexer 132 so that it is latched by the register 133. On the contrary if the output of the register 133 is higher, then the output of the register 133 is outputted from the multiplexer 132 so that it is latched by the register 133. Such comparison in magnitude is repeated. Consequently, at the end of the line, a maximum value (peak value) of the line is latched in the register 133.

Therefore, it can be understood that the magnitude comparator 131, the multiplexer 132 and the register 133 construct one-line peak value detection means for detecting a peak value in one line along the direction perpendicular to the paper transporting direction based on an image signal from an optical image reading unit.

Further, a clock BB (this clock BB is developed once for one line at the end of the line) causes the register 134 to latch a maximum value (peak value) in one line latched in the register 133 and simultaneously causes the register 135 to latch a maximum value (peak value) of the last line. Consequently, the registers 133 and 134 construct a shift register for storing both of a current peak value detected by the one-line peak value detection value and a past peak value in one line detected prior to the current peak value.

Meanwhile, the register 135 is constructed as storage means for storing a past peak value in one line detected prior to a current peak value detected by the one-line peak value detection means.

Thereafter, +n (n is a natural number) is added to a maximum value (peak value) of a preceding line by the adder 136, and −n is added to (that is, n is subtracted from) the maximum value by the adder 137. Then, the output of the adder 136 and the maximum value (peak value) of the current line from the register 134 are compared with each other by the magnitude comparator 138, and the output of the adder 137 and the maximum value (peak value) of the current value from the register 134 are compared with each other by the magnitude comparator 139.

Then, if the maximum value of the current line is higher than the sum of the maximum value of the preceding line and n, the magnitude comparator 138 outputs "1", but if the maximum value of the current line is lower than the difference of n from the maximum value of the preceding line, the magnitude comparator 139 outputs "1". Consequently, if the maximum value of the current line is higher than the sum of the maximum value of the preceding line and n or lower than the difference of n from the maximum value of the preceding line, then the OR gate 140 outputs "1".

Then, the output of the OR gate 140 is latched by the register 141 which operates in response to a clock AA (the clock AA is outputted once for one dot) in order to prevent fluctuation, and the output of the register 141 is used as a paper leading end detection signal or a paper trailing end detection signal. Then, such paper leading or trailing end detection signal is used as an interruption requesting signal (IRQ) to the MPU circuit 150.

Consequently, it can be seen that the magnitude comparators 138 and 139 cooperatively construct comparison means for comparing a current peak value detected by the one-line peak value detection means and a past peak value from the storage means with each other and outputting a result of the comparison as a paper leading or trailing end detection signal.

Meanwhile, the adder 136 constructs addition means for adding a predetermined value (n) to a past peak value from the register (storage means) 135. Thus, the magnitude comparator (comparison means) 138 is constructed so as to compare a current peak value detected by the one-line peak value detection means and an addition correction past peak value from the adder 136 with each other and output a result of the comparison as a paper end detection signal.

Further, the adder 137 constructs subtraction means for subtracting a predetermined value (n) from a past peak value from the register (storage means) 135. Thus, the magnitude comparator (comparison means) 139 is constructed so as to compare a current peak value detected by the one-line peak value detection means and a subtraction correction past peak value from the adder 137 with each other and output a result of the subtraction as a paper leading or trailing end detection signal.

Meanwhile, the magnitude comparator 138 constructs first comparison means for comparing a current peak value detected by the one-line peak value detection means and an addition correction past peak value from the adder (addition means) 136 with each other. The magnitude comparator 139 constructs second comparison means for comparing a current peak value detected by the one-line peak value detection means and a subtraction correction past peak value from the adder (subtraction means) 137 with each other. The OR gate 140 constructs outputting means for outputting, when a paper end detection signal is outputted from at least one of the first comparison means and the second comparison means, the paper end detection signal as a paper end detection signal.

Further, the register 141 constructs latching means for latching the outputs of the comparison means.

Figure 24:
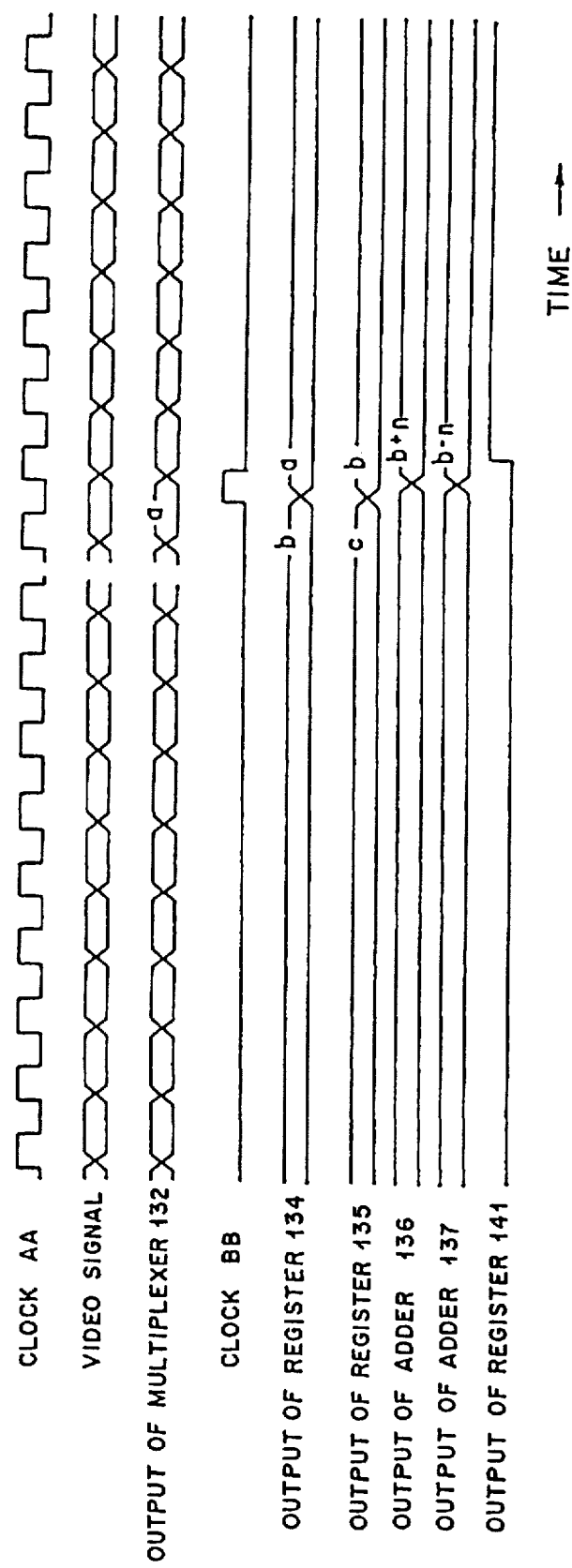
FIG. 24 is a time chart illustrating operation of the original end detection circuit shown in FIG. 23.
Figure 25:
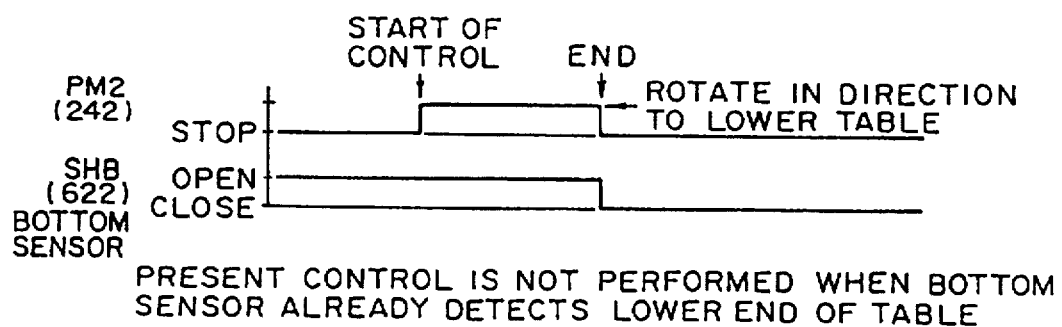
FIG. 25 is a sequence diagram illustrating initialization operation of a hopper system of the image reading apparatus of FIG. 4.

It is to be noted that FIG. 24 illustrates signal waveforms (time chart) at several locations of the circuit shown in FIG. 23.

The leading end or the trailing end of a paper sheet is detected in such a manner as described above. The paper leading end detection circuit 450 detects the leading end of a paper sheet based on a paper end detected for the first time, and when the MPU circuit 150 receives such paper leading end detection signal as an interruption requesting (IRQ) signal from the paper leading end detection circuit 450, the MPU circuit 150 develops, in response to the interruption requesting (IRQ) signal, a command signal to read the front face of the paper sheet. As a result, also the selection circuit 96 is switched to the paper front face data side.

Meanwhile, the paper trailing end detection circuit 451 detects the trailing end of the paper sheet based on a paper end detected for the second time, and when the MPU circuit 150 receives such paper trailing end detection signal as an interruption requesting (IRQ) signal from the paper trailing end detection circuit 451, the MPU circuit 150 develops, in response to the interruption requesting (IRQ) signal, a command signal to read the rear face of the paper sheet. As a result, also the selection circuit 96 is switched to the paper rear face data side.

Therefore, the outputting section 90 is constructed as image signal processing means for processing image signals obtained by the optical image reading units in response to a result of detection by the paper end detection apparatus.

Accordingly, if the paper leading end detection circuit 450 and the paper trailing end detection circuit 451 of such circuit construction as described above are employed, the the leading end and the trailing end of a paper sheet can be detected with certainty with a common circuit construction and with a simple construction. Consequently, reading timings of paper front face data and paper rear face data or reading switching timings between them can be controlled precisely irrespective of the type of a paper sheet being transported. As a result, it is comparatively simple for the image reading apparatus to allow paper sheets of various sizes to be transported to read information on them.

It is to be noted that, while any of the leading end and the trailing end of a paper sheet can be detected by the construction shown in FIG. 23, where the ground color of a paper sheet 40 is brighter than the color of the backing member provided on the paper transport path 310, if it is intended to only detect the leading end of the paper sheet 40, then the adder 137, the magnitude comparator 139 and the OR gate 140 can be omitted. Similarly, if it is intended to only detect the trailing end of the paper sheet 40, then the adder 136, the magnitude comparator 138 and the OR gate 140 can be omitted. On the contrary, where the ground color of a paper sheet 40 is darker than the color of the backing member provided on the paper transport path 310, if it is intended to only detect the leading end of the paper sheet 40, then the adder 136, the magnitude comparator 138 and the OR gate 140 can be omitted. Similarly, if it is intended to detect only the trailing end of the paper sheet 40, then the adder 137, the magnitude comparator 139 and the OR gate 140 can be omitted.

4. Control System

4-1. Operation Panel

Figure 31:
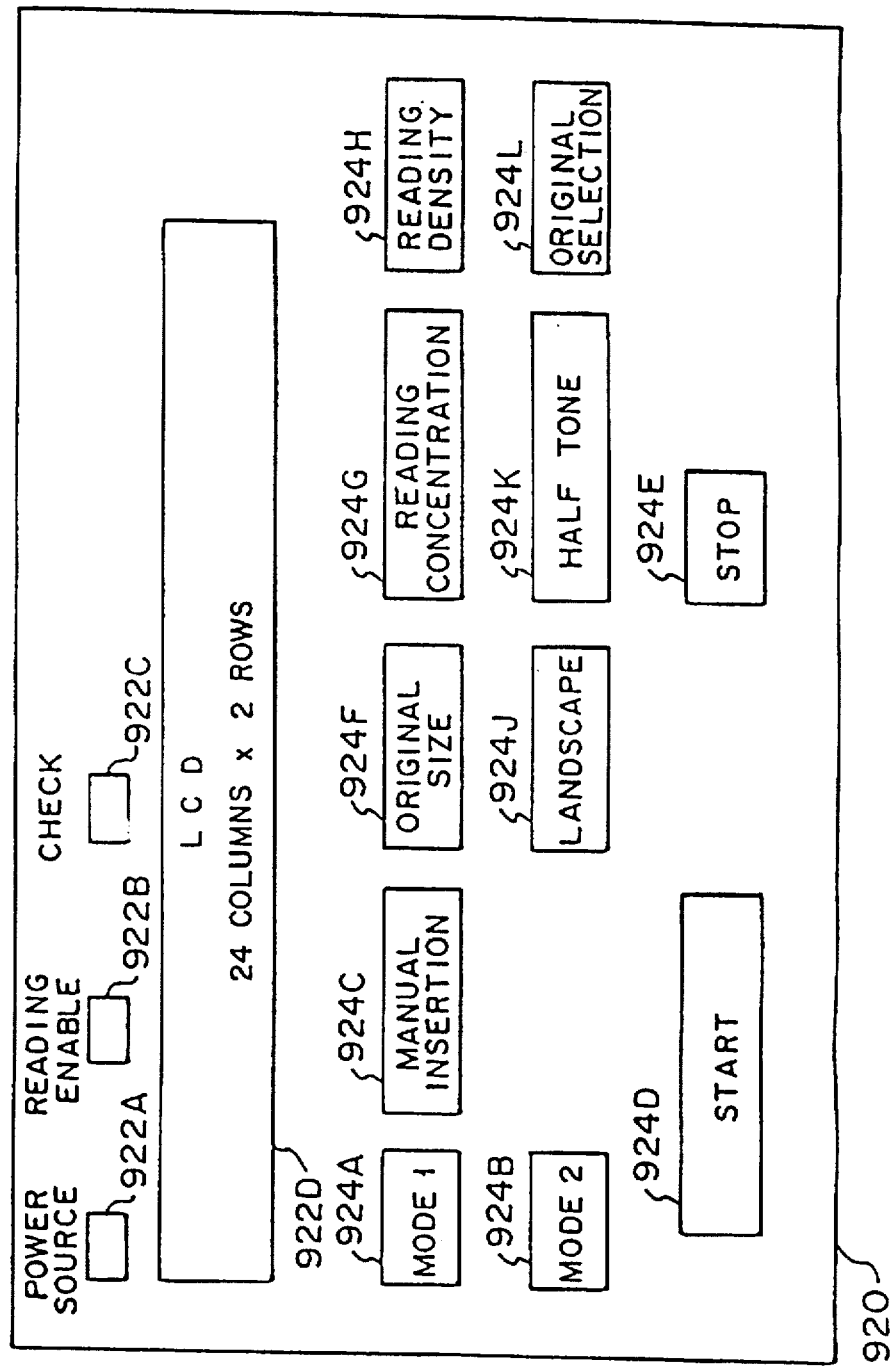
FIG. 31 is a front elevational view showing an operation panel of the image reading apparatus shown in FIG. 4.

Referring now to FIG. 31, the operation panel 920 has provided thereon various indication lamps including a power source input indication lamp 922A, a reading enable indication lamp 922B and a check lamp 922C, and a liquid crystal display unit 922D for displaying various information by characters. The liquid crystal display unit 922D suitably displays, for example, information of an operation input, an error message, and so forth.

The operation panel 920 further has provided thereon a plurality of automatic reading mode setting switches 924A and 924B each serving as insertion mode selection means for selectively setting one of a plurality of (two including a mode 1 and a mode 2 here) automatic reading modes, a manual insertion setting switch 924C serving as insertion mode selection means for setting a manual insertion mode, a start switch 924D for starting the image reading apparatus, and a stop switch 924E for stopping the image reading apparatus. In order to start the apparatus, one of the mode 1, the mode and the manual insertion mode is set, and then the start switch 924D will be operated.

The operation panel 920 further has provided thereon an original size inputting switch 924F, a reading concentration setting switch 924G, a reading density setting switch 924H, a landscape switch 924J, a half tone (half tone) setting switch 924K, and the original selection switch (paper reading selection means) 924L. The original selection switch 924L is a switch by which it can be set whether both face reading of an original should be performed or one face reading only of the front face or the rear face should be performed.

4-2. Construction of the Control System

Figure 32:
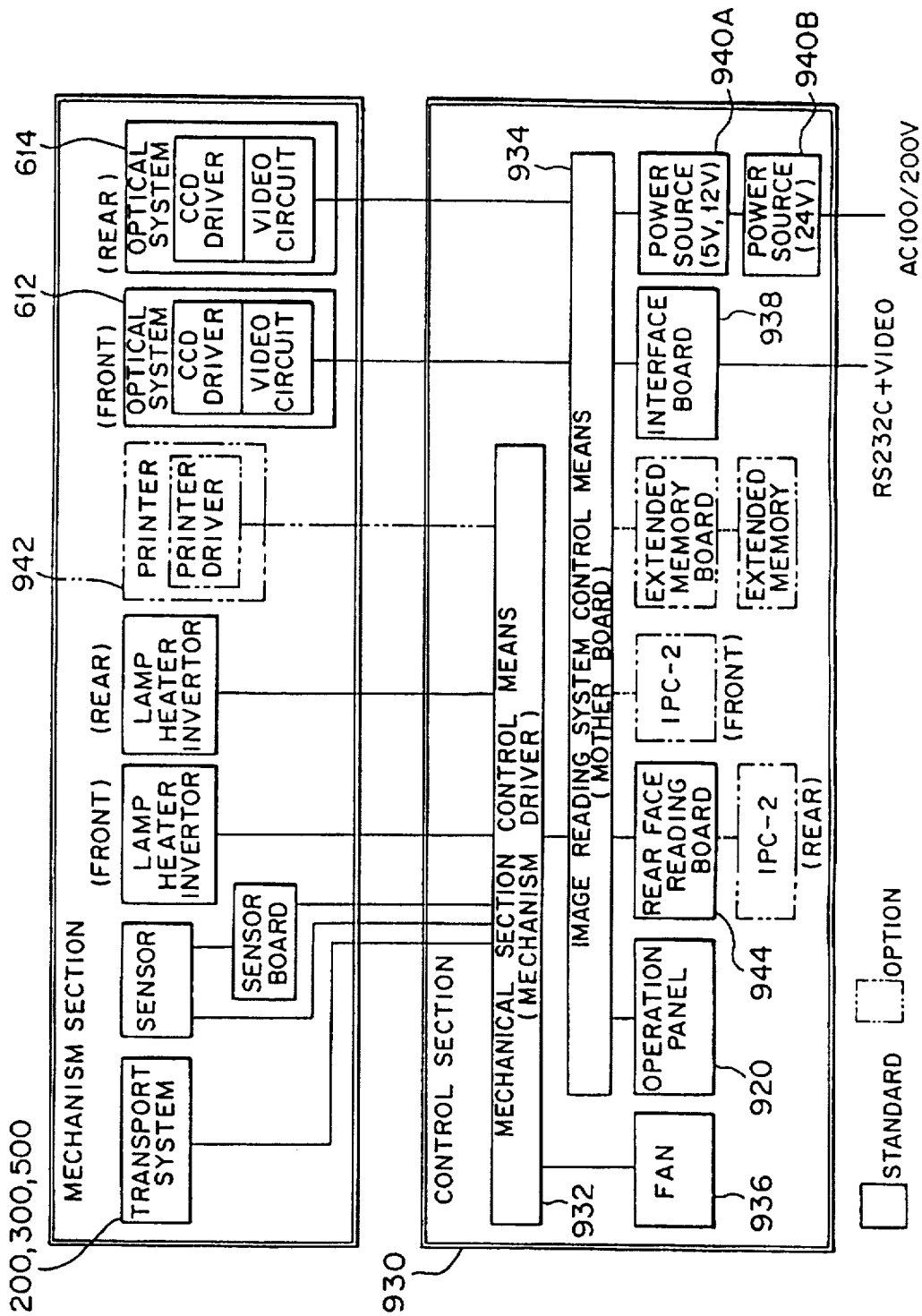
FIG. 32 is a block diagram schematically showing the construction of a control system of the image reading apparatus shown in FIG. 4.

FIG. 32 schematically shows the mechanical components described above and control sections for controlling the mechanical components. Referring to FIG. 32, a control section 930 includes a mechanical section control means 932 including a control circuit for controlling mechanical operations of the mechanical components, and image reading system control means 934 including a control circuit for controlling operation of the image reading system. A pair of power source adjustment sections 940A and 940B for transforming an external power source to required voltages are connected to the image reading system control means 934.

The mechanical section control means 932 controls operation of the transport systems (that is, the paper supply mechanism 200, the paper transport mechanism 300, the paper stacking mechanism 500 and so forth) and the heater of the lamp unit and an invertor of the fluorescent lamp in accordance with an instruction signal received by way of the image reading system control means 934 and detection information from the various sensors of the mechanical components. The mechanical section control means 932 also controls operation of a cooling fan 936 for the control section 930 itself. The paper supply hopper position control means (motor control means) 280, the pick clutch control means 250 serving as paper supply roller driving mechanism control means, the separation clutch control means 858 and the roller driving mechanism control means 350 described hereinabove are included in the mechanical section control means 932.

The image reading system control means 934 controls operation of CCD driver units of the first optical image reading unit 412 and the second optical image reading unit 414, a video circuit and a rear face reading board 944 and outputting to an outputting interface board 938 in response to setting information of the operation panel 920 and information from the mechanical section control means 932. The image information extraction control means 440, the paper leading end detection circuit 450, the paper trailing end detection circuit 451 and the discrimination mark image erasure means 460 described hereinabove are provided in the image reading system control means 934.

Where an endorser (endorsing printer) 942 is provided in the proximity of the terminal end of the paper transport path 310 as shown in FIG. 7, also a driver for the endorser 942 is controlled by the image reading system control means 934 as seen from FIG. 32. Also where an extension memory board and/or an auxiliary printed circuit board (IPC-2) are provided, they are controlled by the image reading system control means 934.

4-3. Operation

Operations of the hopper motor 242, the pick clutch 238, the separation clutch 854 and the transport motor 342 and control by the image information extraction control means 440 proceed, for example, in such a manner as illustrated in time charts of FIGS. 25 to 30.

First, control of the hopper motor 242 will be described. Upon starting of the control, control of an initialization mode is performed as seen from FIG. 25. In particular, in response to an operation starting instruction (that is, a control starting instruction) for the image reading apparatus such as, for example, throwing in of a power source to the apparatus, the hopper motor 242 is rotated in a direction to lower the hopper table 212. Then, when the hopper table 212 comes to its lowermost position, the bottom sensor 622 switches from an off-state (open) to an on-state (closed), and the hopper motor 242 stops in response to such detection signal of the bottom sensor 622. Naturally, the control is not performed if, upon reception of the control starting instruction, the hopper table 212 is already at the lowermost position and the bottom sensor 622 is in an on-state (closed).

The control of the hopper motor 242 after this is different between an automatic reading mode and the manual insertion mode in response to setting information of the switches.

Figure 26:
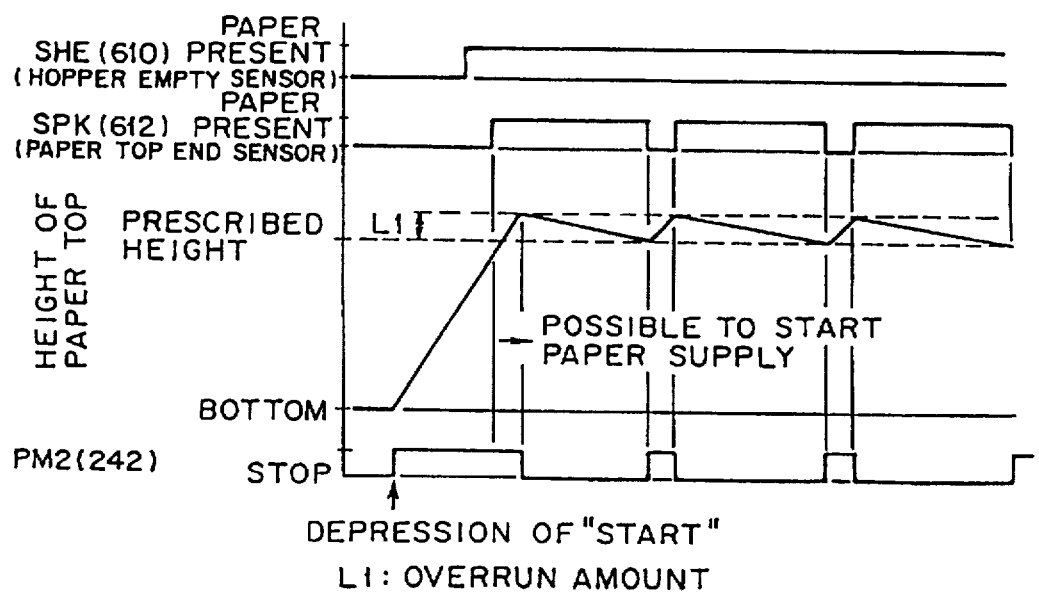
FIG. 26 is a sequence diagram illustrating operation of the hopper system in an automatic reading mode.

In particular, if paper sheets 42 are accommodated into the hopper table 212 and a switch operation (depression of the start button) for an automatic reading mode is performed, then the hopper motor 242 is rotated in a direction to raise the hopper table 212 as seen from FIG. 26. Then, when the top of the paper sheets 40 in the hopper table 212 rises from a position (bottom position) corresponding to the lowermost position of the hopper table 212, whereupon the hopper empty sensor 610 is turned on ("presence of a paper sheet"), to a prescribed height at which the paper supply sensor 612 is turned on ("presence of a paper sheet").

When the hopper table 212 is raised by a little distance after the paper supply sensor 612 is turned on, the hopper motor 242 is stopped. Thereafter, image reading is performed while paper supplying and transporting operations are performed. During the process, as the paper sheets 40 are supplied, the height of the top of the stack of paper sheets 40 decreases. Consequently, the paper supply sensor 612 is turned off finally, and in response to this, the hopper motor 242 is rotated in the direction to raise the hopper table 212.

Then, as the height of the top of the stack of paper sheets 40 in the hopper table 212 rises again, it finally reaches the prescribed height, whereupon the paper supply sensor 612 is turned on ("presence of a paper sheet"). While such a sequence of operations as described above is repeated to control the height of the top of the paper sheets within a fixed range, image reading operation is performed together with paper supplying and transporting operations.

Figure 27:
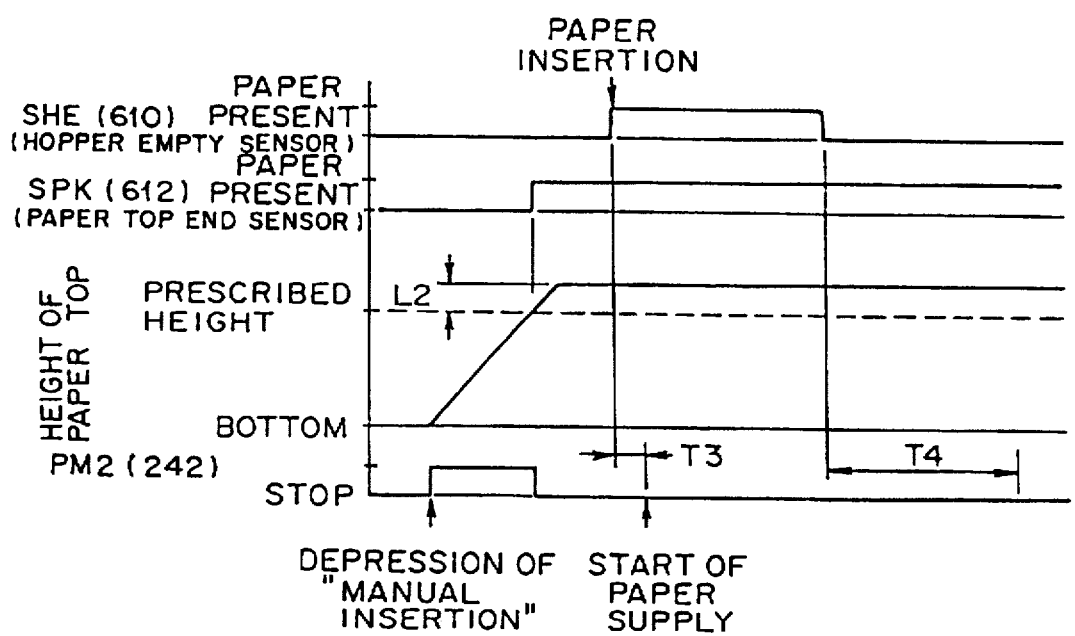
FIG. 27 is a sequence diagram illustrating operation of the hopper system in a manual insertion mode.

On the other hand, if a switch operation for the manual insertion mode (depression of the manual insertion button) is performed, then the hopper motor 242 is rotated in the direction to raise the hopper table 212 as seen from FIG. 27. Then, when the hopper table 212 is raised until the height of the top end thereof comes to a prescribed height, then the paper supply sensor 612 is turned on ("presence of a paper sheet"). When the hopper table 212 is further raised a little after the paper supply sensor 612 is turned on, the hopper motor 242 is stopped. Thereafter, the hopper motor 242 is kept stopped and the hopper table 212 keeps the position. Then, manual insertion of a paper sheet is performed as can be seen also from an on/off condition of the hopper empty sensor 610.

Subsequently, operations of the pick clutch 238, the separation clutch 854 and the transport motor 342 and control by the image information extraction control means 440 will be described together with operation of the hopper motor 242. Referring to FIG. 28, paper sheets 40 are first accommodated into the paper supply hopper 210 and a start command to instruct starting of image reading is developed (point T1). At this initial stage, since the paper supply hopper 210 is not at the paper supply position, the paper supply sensor 612 is in an off-state. The hopper empty sensor 610 also provides a signal indicating absence of a paper sheet.

Since the paper supply sensor 612 is in an off-state, the hopper motor 242 is rendered operative to raise the paper supply hopper 210 to the paper supply position (point T2). Consequently, the paper supply sensor 612 is turned on. As a result, the hopper motor 242 is stopped, and the pick clutch 238 and the separation clutch 854 are engaged. Thereafter, the transport motor 342 is started (point T3) after a small time lag (30 ms in the example shown) until the pick clutch 238 and the separation clutch 854 are engaged firmly. By the operation of the transport motor 342, the pick rollers 220 and the separation roller 820 are rotated by way of the pick clutch 238 and the separation clutch 854 to supply and transport a first paper sheet.

The transport motor 342 can be selectively set to one of a low speed mode of a velocity $V_1$ (for example, 12 to 13 cm/s), a high speed mode of another velocity $V_2$ (for example, about 50 cm/s) and an intermediate speed mode (mid speed mode) of an intermediate velocity between them. For the first paper sheet upon starting of paper supply, the transport motor 342 operates in the low speed mode. Accordingly, also the transportation speeds of the pick rollers 220 and the separation roller 820 are low.

When the leading end of the paper sheet being transported in this manner passes the transport sensor 614, the transport sensor 614 detects this and is turned on (point T4), and the pick clutch 238 is disengaged. At this point of time, the paper sheet is already at a position at which it can be driven by the separation roller 820, and consequently, the paper sheet is thereafter driven by the separation roller 820.

Then, when the leading end of the paper sheet being transported passes the transport sensor 616, the transport sensor 616 detects this and is turned on (point T5), and the separation clutch 854 is disengaged. At this point of time, the paper sheet is already at a position at which it can be driven by the transport roller 320, and consequently, the paper sheet is thereafter driven by the transport roller 320. Thereafter, the paper sheet is successively driven by the succeeding transport rollers 322 to 328. At the point of time T5, since the transport motor 342 is in the low speed mode, the transportation velocity of the transport roller 320 itself is low.

The transport sensor 616 serves also as a sensor for detecting a reading timing, and when the passage of the leading end of the paper sheet is detected by the transport sensor 616, a read command is developed in response to the detection (point T6). Upon reception of the read command, the transport motor 342 is accelerated from the low speed mode (velocity $V_1$) to the high speed mode (velocity $V_2$). Accordingly, also the speed of rotation of the transport rollers 320 to 328, that is, the transportation speed, increases until high speed transportation is reached.

Then, at a point of time T7 after lapse of a predetermined time $t_3$ after the leading end of the paper sheet passes the transport sensor 616, the first optical image reading unit 412 for reading information of the front face of the paper sheet is put into a reading condition. Thereafter, at another point of time T8 after lapse of another predetermined time $t_4$ after the leading end of the paper sheet passes the transport sensor 616, the second optical image reading unit 414 for reading information on the rear face of the paper sheet is put into a reading condition. In particular, each video gate (not shown) of the video circuit board 438 is put into an on-state.

It is to be noted that the predetermined times $t_3$ and $t_4$ are times required for a paper sheet to pass from the transport sensor 616 to the reading points 412A and 414A of the optical image reading units 412 and 414, respectively, and are given, from the distances $L_1$ and $L_2$ from the transport sensor 616 to the reading points 412A and 414A and the transportation speed $V_2$ by the transport roller 320, by the following equations, respectively;

$$t_3 = L_1/V_2, \quad t_4 = L_2/V_2$$

During such image reading (at points of time T9 and T10), the transport sensors 614 and 616 are switched from on to off when the trailing end of the paper sheet passes the transport sensors 614 and 616, respectively.

Then, in each of the optical image reading units 412 and 414, when a time $t_5$ required for image reading passes (point T11 or T12), the video gate is switched from on to off, thereby completing reading (Read Complete). It is to be noted that the time $t_5$ is given as a product between the reading line number and the integration time ($t_5$=reading line number×integration time).

In this manner, while the first paper sheet is transported in the high speed mode by the transport rollers 320 to 328, image reading of the front face and the rear face of the paper sheet is performed by the optical image reading units 412 and 414, respectively, and thereafter, the paper sheet is driven by the paper transport roller 328 and stacked into the paper stacker 510.

After reading of the first paper sheet is completed, a start command is developed immediately, and in response to the start command, transportation and reading of a second paper sheet are started. In the operation for the second or following paper sheet, the image reading apparatus operates in such a manner as illustrated in FIG. 29.

In particular, in the present example, since the paper supply hopper 210 is at the paper supply position (that is, the paper supply sensor 612 is in an on-state) when the start command is instructed (point T13), the pick clutch 238 and the separation clutch 854 are engaged simultaneously with the instruction of the start command. Since the transport motor 342 continues to operate in the high speed mode, the pick roller 220 and the separation roller 820 are rotated at a comparatively high speed due to the engagement of the clutches 238 and 854 to transport the second paper sheet. Naturally, in this instance, also the transport rollers 320 to 328 are being rotated by the transport motor 342.

Thereafter, transportation and reading of the second paper sheet are performed substantially in a similar manner to the first paper sheet. However, in transportation and reading of the second or following paper sheet, since the transport motor 342 is operating in the high speed mode from the beginning, the transport motor 342 is controlled to temporarily lower the speed thereof at a point of time when the main element for driving the paper sheet changes over from the separation roller 820 to the transport roller 320, different from the transportation and reading of the first paper sheet.

In particular, when the leading end of the second paper sheet which is supplied and transported at a comparatively high speed by the pick roller 220 and the separation roller 820 passes the transport sensor 614, the transport sensor 614 detects this and is turned on (point T15). Consequently, the pick clutch 238 is disengaged and the paper sheet is thereafter driven by the separation roller 820.

Then, when the leading end of the second paper sheet passes the transport sensor 616, the transport sensor 616 detects this and is turned on (point T19), and the separation clutch 854 is disengaged. Around the point of time T19 (between the points of time T17 to T20), the speed of the transport motor 342 is reduced temporarily from the high speed mode to the intermediate speed mode.

Such speed reduction control is started at a point of time T16 when a required time elapses after the transport sensor 614 is turn on (at a point of time before the leading end of the paper sheet passes the transport sensor 616) and is performed by holding, after the point of time T17 at which the speed drops to an intermediate speed, the intermediate speed till a point of time T20 at which a predetermined time (for example, 50 ms) elapses after the point of time T17.

Due to the speed reduction control, when the main element for driving the paper sheet changes over from the separation roller 820 to the transport roller 320, the transportation speed of the separation roller 820 and the transport roller 320 is suppressed, and consequently, changing over from the separation roller 820 to the transport roller 320 proceeds smoothly. This reduces a cause of a trouble such as paper jamming.

Within the period, a read command is developed (point T18), and similarly as in transportation of the first paper sheet, the first optical image reading unit 412 for reading information of the front face of a paper sheet is put into a reading condition at a point of time T21 at which the predetermined time $t_3$ elapses after the leading end of the paper sheet passes the transport sensor 616. Then, at another point of time T22 when the predetermined time $t_4$ elapses after the leading end of the paper sheet passes the transport sensor 616, the second optical image reading unit 414 for reading information of the rear face of a paper sheet is put into a reading condition. In particular, each video gate (not shown) of the video circuit board 438 is put into an on-state. It is to be noted that the predetermined times $t_3$ and $t_4$ mentioned above are given similarly as described hereinabove.

During such image reading, the transport sensors 614 and 616 are changed over from an on-state to an off-state (points T23 and T24) as the trailing end of the paper sheet passes the transport sensors 614 and 616, respectively.

Then, in each of the optical image reading units 412 and 414, the video gate is changed over from an on-state to an off-stage to complete the reading (Read Complete) when the time $t_5$ required for image reading elapses. Also the time $t_5$ is given similarly as described hereinabove.

In this manner, while the second or following paper sheet is transported in the high speed mode by the transport rollers 320 to 328, image reading of the front face and the rear face of the paper sheet is performed by the optical image reading units 412 and 414, respectively, and thereafter, the paper sheet is driven by the paper transport roller 328 and the paper discharge roller and stacked into the paper stacker 510.

If the paper supply sensor 612 is turned off as a result of reduction in quantity of the paper sheets 40 in the paper supply hopper 210 (point T14 in FIG. 29), then the hopper motor 242 is rendered operative at a point of time (T27) at which the operations of the pick roller 220 and the separation roller 820 and the speed reduction control of the transport motor 342 are completed to raise the paper supply hopper 210 to the paper supply position (point T2). Such height control of the paper supply hopper 210 is performed each time the paper supply sensor 612 is turned off as a result of reduction in quantity of the paper sheets 40 while the paper supplying and transporting operations are performed.

Figure 30:
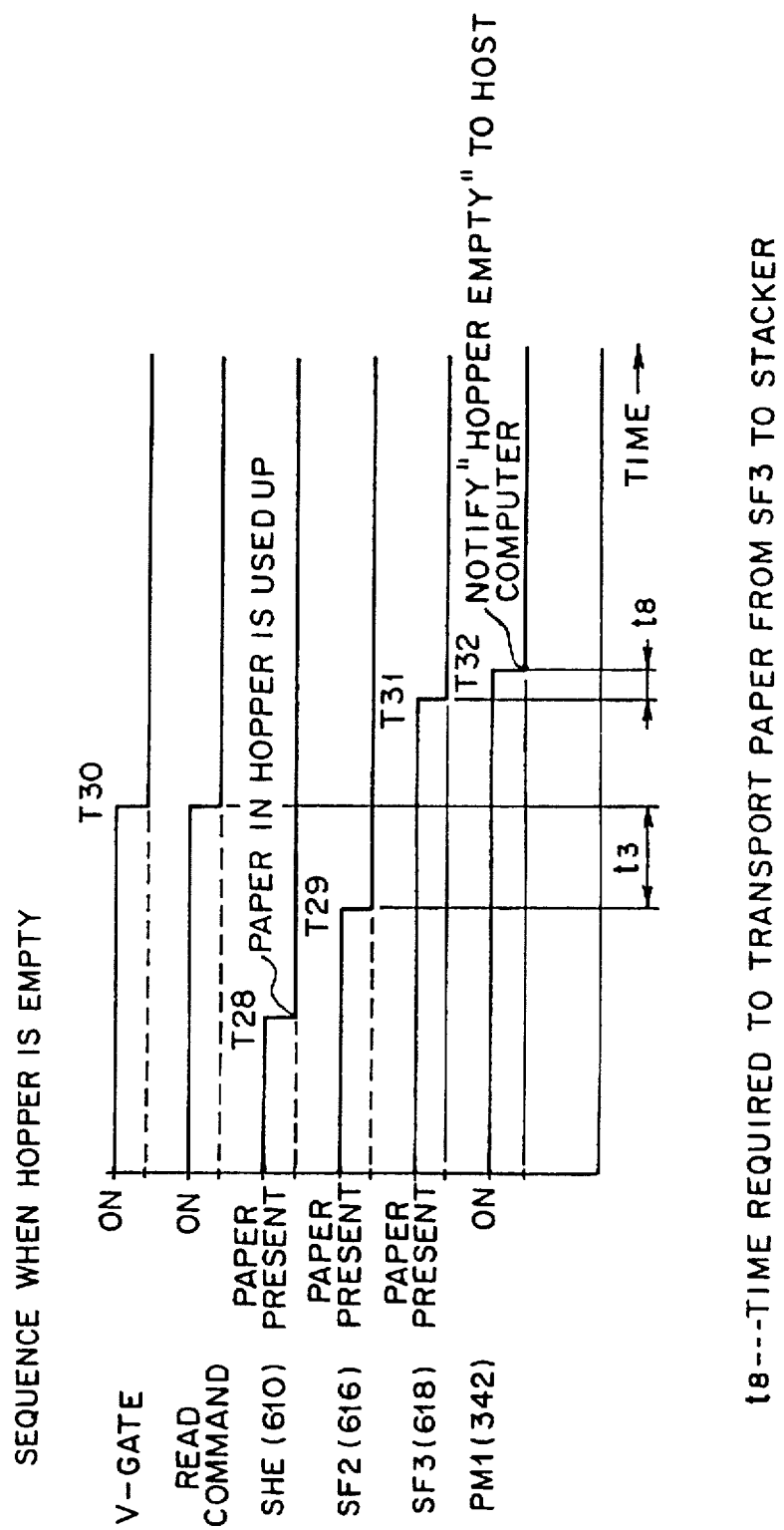
FIG. 30 is a similar view but illustrating operation of the transport system at another different stage.

Then, when the paper sheets 40 in the paper supply hopper 210 are reduced in quantity until the paper supply hopper 210 becomes empty, the hopper empty sensor 610 changes over from an off-state ("paper present") to an on-state ("paper absent") (point T28) as seen from FIG. 30, and then the transport sensor 616 changes over from an on-state ("during paper passage") to an off-state ("completion of paper passage") (point T29). Thereafter, the video gate of the second optical image reading unit 414 on the downstream side of the transport path is changed over from an on-state to an off-state and simultaneously the read command is changed over from an on-state to an off-state (point T30), and then the discharge sensor 618 changes over from an on-state ("during paper passage") to an off-state ("completion of paper passage") (point T31). The power supply to the transport motor 342 is cut to stop the transport motor 342 after lapse of a predetermined time $t_8$ after the discharge sensor 618 changes over to an off-state. The predetermined time $t_8$ corresponds to a time within which a paper sheet 40 is transported from the discharge sensor 618 to the stacker 500.

It is to be noted that, if a paper sheet to be read requires image reading of only one face thereof and it is intended to read, for example, only the front face of the paper sheet, when reading of the video gate of the first optical image reading unit 412 in FIGS. 28 and 29 comes to an end, it is determined that reading for the paper sheet is completed (Read Complete), and next control is started immediately.

Since transportation and image reading of paper sheets is performed in response to the hopper empty sensor 610, the paper supply sensor 612, the transport sensors 614 and 616 and the discharge sensor 618 in this manner, the image reading operation can be performed appropriately in accordance with a transportation condition of a paper sheet, which is suitable to high speed image reading. Further, if paper jamming (paper jamming) should occur intermediately of the paper transport path, this can be detected promptly and the operation of the image reading apparatus can be stopped immediately.

Further, since the control timings by the roller driving mechanism control means 350 and the image information extraction control means 440 are synchronized with each other, even if the processing speed for image reading is increased, the paper transportation operation and the image reading operation can be performed with certainty.

Furthermore, since reading of information of the front face of a paper sheet 40 is performed optically by the first optical image reading unit 412 and reading of information of the rear face of the paper sheet 40 is performed optically by the second optical image reading unit 414, reading of image information on the opposite faces of the paper sheet 40 can be performed rapidly, and the processing speed of a double-side original is improved significantly.

Further, with the image reading apparatus of the present embodiment, the following advantages can be achieved due to its structural characteristics.

In particular, since the paper transport path 310 connected to the paper supply mechanism 200 is constituted from the inclined transport path 312 and the paper reversing transport path 314 without involving a horizontal transport path, the paper transport path 310 requires a comparatively small depthwise space, and accordingly, there is an advantage in that the image reading apparatus can be reduced in size as much. Further, there is another advantage in that a paper sheet can be transported rapidly from the paper supply mechanism 200 to the stacker mechanism 300 and image reading can be performed at a high speed. Naturally, the reduction in space allows an increase in size of the paper sheet hopper or the paper stacker, which allows reading of a paper sheet of a greater size.

By the way, referring back to FIG. 3, analog video signals from the CCD arrays 436AA and 436AB of the image reading units 412 and 414 are amplified by the amplification circuits 64A and 64B, respectively, and the analog video signals of the outputs of the amplification circuits 64A and 64B in portions (bits) in which, for example, the photosensitive portions of the CCD arrays 436AA and 436AB are masked are sampled and held by the black level setting circuits (sample hold circuits) 71A and 71B and are connected as reference signals for a black level to the lower limit sides (VRB) of the analog to digital conversion circuits 60A and 60B, respectively. For a reference signal for a white level, a signal obtained by digital to analog conversion of a white level value of each bit of each line obtained by scanning in the last scanning cycle and stored in the memory circuit 72-1 or 72-2 by the digital to analog conversion circuit 62A or 62B is used and connected to the upper limit side (VRT) of the analog to digital conversion circuit 60A or 60B.

Consequently, the analog to digital conversion circuit 60A or 60B outputs a multiple value digital signal on the scale of 256 gradations between the reference level (VRT) for white and the reference level (VRB) for black. In this instance, for the reference level for white, an analog value of a white level produced with reference to a white level obtained by scanning of the image in the last scanning cycle is used, and for the reference value for black, an analog value at a dot at which the photosensitive element of the CCD array 436AA or 436AB is masked is used.

It is to be noted that, in this instance, for example, in such a case that paper sheets whose ground color is white have been read till now and blue print paper sheets of a different ground color are to be read subsequently, the white level value to be provided to the analog to digital conversion circuit 60 is varied in response to an instruction signal from the MPU circuit 150 by the white level information correction circuit 70. In particular, as seen from FIGS. 14 to 20, white level information stored in the memory circuit 72-1 (or 72-2) or the storage area 72-11 (or 72-12) is taken out and stored into the register 73-1 (or 73-2) or 73, and then the output of the register 73-1 (or 73-2) or 73 is multiplied by m by the data magnification variation circuit 74. Then, the output of the data magnification variation circuit 74 is selected by the selection circuit 75b and then processed by required processing by the white level algorithm circuit 77, and then the white level of the thus varied magnification is stored into the other memory circuit 72-2 (or 72-1) or the other storage area 72-12 (or 72-11) by way of the selection circuit 75c. Then, the white level of the varied magnification is used as a conversion reference of the analog to digital conversion circuit 60.

Thereafter, so far as such blue print paper sheets are used, the white level from the memory circuit 72-2 (or 72-1) or the storage area 72-12 (or 72-11) is extracted, and now, the output of the memory circuit 72-2 (or 72-1) or the storage area 72-12 (or 72-11) is inputted by way of the selection circuit 75b to the white level algorithm circuit 77. Then, the processing described above is performed subsequently by the white level algorithm circuit 77 so that the white level value may have an appropriate value to update the white level.

Consequently, even in such a case that paper sheets whose ground color is white have been read till now and blue print paper sheets of a different ground color are to be read subsequently, the white level information correction apparatus copes with this sufficiently and can perform analog to digital conversion with a high degree of accuracy.

Then, the image signal after digital conversion by the analog to digital conversion circuit 60A or 60B is transferred to the image processing section 68A or 68B for next image processing such as, for example, emphasis processing to emphasize the contrast between white and black or "dither processing; binary digitization processing" for a net point image such as a photograph image as described hereinabove.

Further, in each of the image data processing systems D1 and D2, digital information obtained from the analog to digital conversion circuit 60A or 60B is sent, after it is processed by emphasis processing and/or binary digitization processing by the image processing section 68A or 68B, to the outputting section 90 as seen from FIG. 3, and paper front face data and paper rear face data are transferred from the outputting section 90 to the host computer (not shown).

Upon such transfer, data (paper front face data) from the first operating image reading unit 412 from one of the first optical image reading unit 412 and the second optical image reading unit 414 from which paper image information is to be read out first are first transferred successively by way of a data transfer line. Meanwhile, data (paper rear face data) from the later operating image reading unit 414 from one of the first optical image reading unit 412 and the second optical image reading unit 414 from which paper image information is to be read out later are temporarily stored into the DRAM 92, and, after the data from the first operating image reading unit 412 are transferred completely, the stored data from the later operating image reading unit 414 are successively transferred at a rate higher than the transfer rate of the data from the first operating image reading unit 412 by way of another data transfer line.

Consequently, even if image reading by the later operating image reading unit 414 is started before image reading by the first operating image reading unit 412 is completed, data within the overlapping period can be held with certainty. Besides, data from the later operating image reading unit 414 from which data are to be transferred later can be transferred rapidly to the host computer side.

Accordingly, even where the image reading units 412 and 414 are disposed in the proximity of the paper transport path in order to achieve minimization, reduction in weight and compaction of the apparatus, data of the front and rear faces of a paper sheet can be transferred to the host computer side before the paper sheet is discharged to the stacking mechanism 500. Consequently, even if paper sheets are successively transferred at a high speed while achieving minimization, reduction in weight and compaction of the apparatus, data of the front and rear faces of each paper can be read and transferred to the host computer side satisfactorily.

In this instance, the paper leading end detection circuit 450 detects the leading end of a paper sheet based on a paper end detected for the first time, and then when the MPU circuit 150 receives such paper leading end detection signal as an interruption requesting (IRQ) signal from the paper leading end detection circuit 450, the MPU circuit 150 develops, in response to the interruption requesting (IRQ) signal, a command signal to read the front face of the paper sheet. As a result, also the selection circuit 96 is switched to the paper front face data side.

Meanwhile, the paper trailing end detection circuit 451 detects the trailing end of the paper sheet based on a paper end detected for the second time, and then when the MPU circuit 150 receives such paper trailing end detection signal as an interruption requesting (IRQ) signal from the paper trailing end detection circuit 451, the MPU circuit 150 develops, in response to the interruption requesting (IRQ) signal, a command signal to read the rear face of the paper sheet. As a result, also the selection circuit 96 is switched to the paper rear face data side.

Where the paper leading end detection circuit 450 and the paper trailing end detection circuit 451 of such circuit construction as described above are employed, the leading end and the trailing end of a paper sheet can be detected with certainty with a common circuit construction and with a simple construction. Consequently, reading timings of paper front face data and paper rear face data or reading switching timings between them can be controlled precisely irrespective of the type of a paper sheet being transported. As a result, it is comparatively possible for the image reading apparatus to allow paper sheets of various sizes to be transported to read information on them.

c. Other Embodiment

Figure 33:
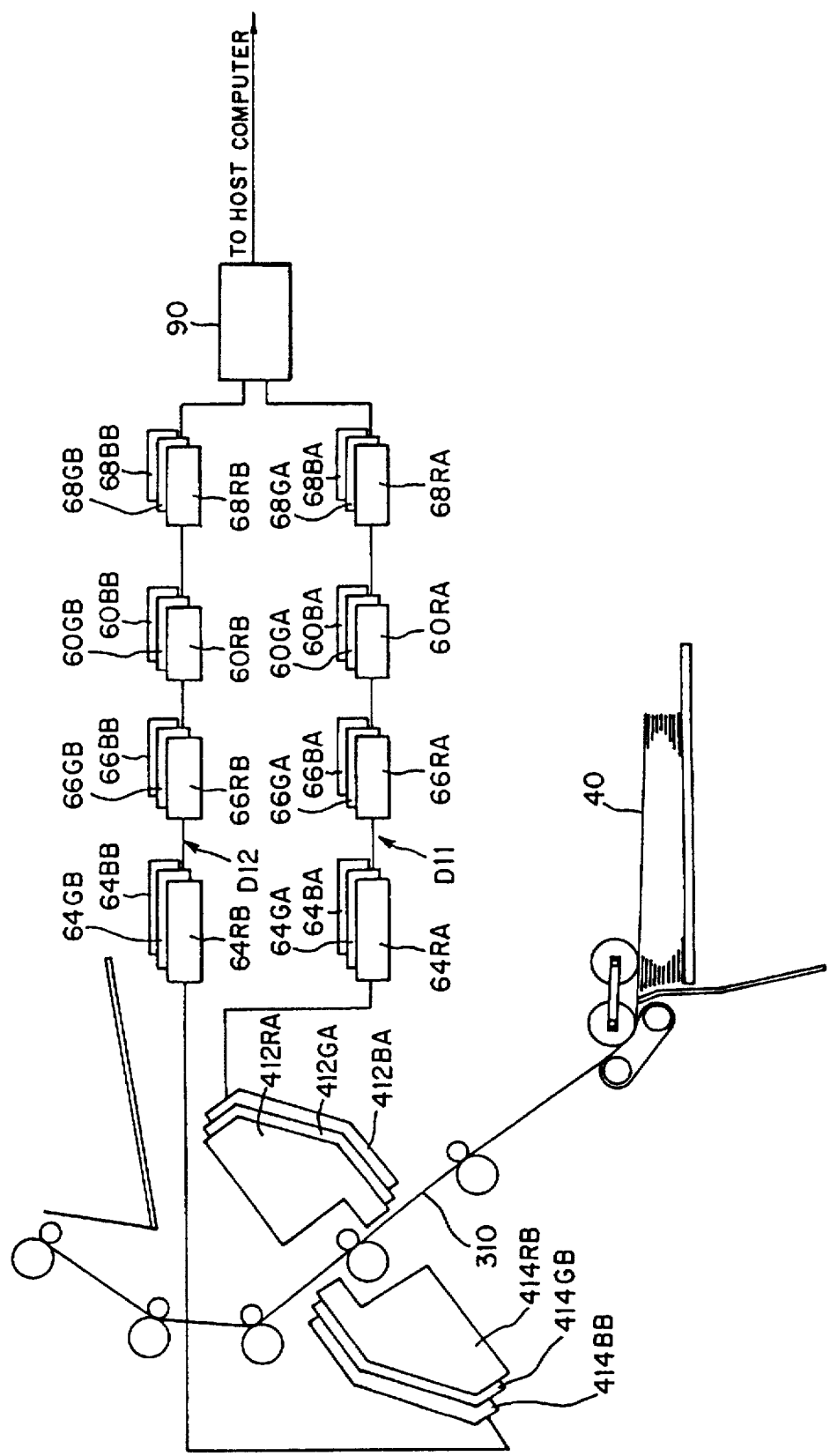
FIG. 33 is a diagrammatic view of another image data processing system showing another preferred embodiment of the present invention.

Referring now to FIG. 33, there is shown, in block diagram, a data processing system according to another preferred embodiment of the present invention. The data processing system is applied to an apparatus (image scanner) for reading color information of the opposite faces of an original. To this end, the data processing system shown includes a first image data processing system D11 for processing color image data read by first optical image reading units 412RA, 412GA and 412BA which are provided for reading information of three primary colors (red (R), green (G) and blue (B)) on a front face of a paper sheet, and a second image data processing system D12 for processing image data read by second optical image reading units 414RB, 414GB and 414BB which are provided for reading information of three primary colors (red (R), green (G) and blue (B)) on a rear face of a paper sheet.

The first image data processing system D11 includes CCD arrays (not shown) of the first optical image reading units 412RA, 412GA and 412BA, amplification circuits 64RA, 64GA and 64BA, sample hold circuits 66RA, 66GA and 66BA, analog to digital conversion circuits 60RA, 60GA and 60BA, and image processing sections 68RA, 68GA and 68BA. The second image data processing system D12 includes CCD arrays (not shown) of the second optical image reading units 414RB, 414GB and 414BB, amplification circuits 64RB, 64GB and 64BB, sample hold circuits 66RB, 66GB and 66BB, analog to digital conversion circuits 60RB, 60GB and 60BB, and image processing sections 68RB, 68GB and 68BB.

It is to be noted that the optical image reading units, the amplification circuits, the sample hold circuits, the analog to digital conversion circuits and the image processing sections may be similar to those described hereinabove in connection with the first embodiment, and overlapping description thereof is omitted herein to avoid redundancy.

Accordingly, analog video signals from the CCD arrays of the optical image reading units 412RA, 412GA, 412BA and 414RB, 414GB, 414BB are amplified by the amplification circuits 64RA, 64GA, 64BA and 64RB, 64GB, 64BB and then converted into digital signals by the analog to digital conversion circuits 60RA, 60GA, 60BA and 60RB, 60GB, 60BB, respectively, whereafter they are processed by emphasis processing, binary digitization processing and some other necessary processing by the image processing sections 68RA, 68GA, 68BA and 68RB, 68GB, 68BB, respectively, and then sent to an outputting section 90. Consequently, paper front face three primary color data and paper rear face three primary color data are transferred from the outputting section 90 to a host computer (not shown).

Figure 34:
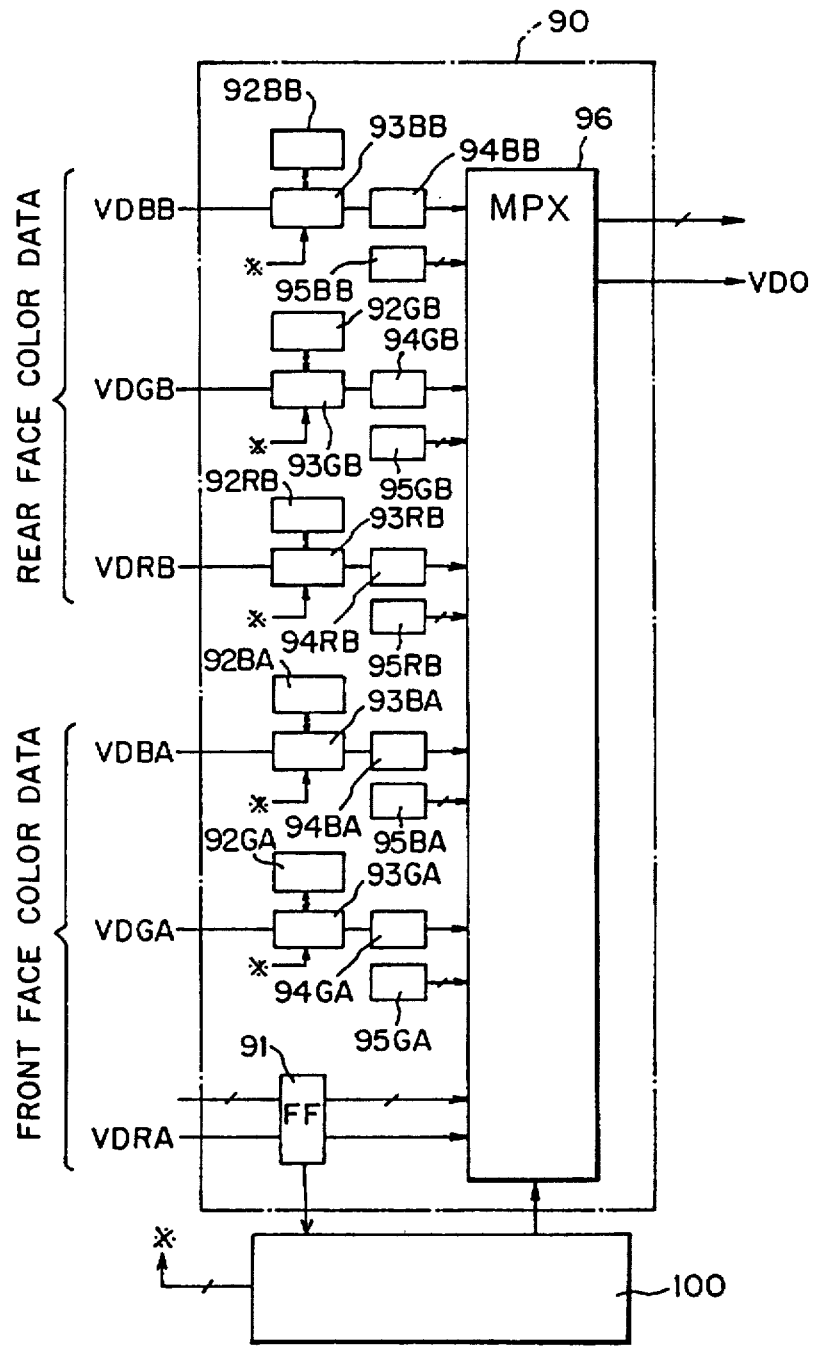
FIG. 34 is a block diagram showing an outputting section and an output control circuit of the image data processing system shown in FIG. 33.

Referring now to FIG. 34, the outputting section 90 includes a latch circuit 91, DRAMs (buffer storage apparatus) 92GA, 92BA, 92RB, 92GB and 92BB, memory control sections 93GA, 93BA, 93RB, 93GB and 93BB, read data buffers 94GA, 94BA, 94RB, 94GB and 94BB, timing production sections 95GA, 95BA, 95RB, 95GB and 95BB, and a selection circuit 96.

The latch circuit 91 latches paper front face first color data VDRA and front face first color timing signals VGRA, HGRA and VCLKRA from the first image data processing system D11 for processing data of the first color (red) of the front face of a paper sheet, and notifies it to an output control circuit 100 that paper front face first color data and front face first color timing signals have been latched by the latch circuit 91. It is to be noted that a flip-flop is used for the latch circuit 91.

Meanwhile, the timing signal VGGA is a horizontal direction (direction of a line; main scanning direction) gate signal, and the timing signal HGGA is a vertical direction (paper transporting direction; sub scanning direction) gate signal. In response to the timing signals VGGA and HGGA, one bit of a picture element in one line for the first color of the front face of a paper sheet scan be extracted. Further, the timing signal VCLKGA is a clock signal which defines the transfer rate of front face first color data.

The DRAM 92GA is a memory circuit for storing paper front face second color (green) data VDGA, and the memory control section 93GA controls storage and reading out into and from the DRAM 92GA. In particular, the memory control section 93GA is constructed as a DMAC (dynamic memory access control) and controls the DRAM 92GA such that paper front face second color data VDGA sent thereto are stored into the DRAM 92GA and, after paper front face first color data VDRA are received for one full paper sheet, the paper front face second color data VDGA are read out from the DRAM 92GA (in this instance, read out in units of one bit) between successive storing operations of subsequent paper front face second color data VDGA into the DRAM 92GA.

The read data buffer 94GA temporarily stores paper front face second color data VDGA read out partially from the DRAM 92GA between successive storing operations of paper front face second color data VDGA into the DRAM 92GA and produces collective data to be sent out.

It is to be noted that the the rates at which data are read out from the DRAM 92GA and the read data buffer 94GA are set higher than the writing rate, that is, the transfer rate of front face first color data to the host computer.

The timing production section 95GA produces timing signals VGGA, HGGA and VCLKGA. Also in this instance, the timing signal VGGA is a horizontal direction (direction of a line; main scanning direction) gate signal while the timing signal HGGA is a vertical direction (paper transporting direction; sub scanning direction) gate signal, and in response to those signals, one bit of a picture element in one line of the paper front face second color can be extracted. Further, the timing signal VCLKGA is a clock signal which defines the front face second color data transfer rate. In this instance, the rate of the front face second color timing signal VCLKGA is set higher than that of the front face first color timing signal VCLKRA. Since the rate of the front face second color timing signal VCLKGA is set in this manner and the data reading out rates from the DRAM 92GA and the read data buffer 94GA are set as described above, front face second color data are transferred at a rate higher than that of front face first color data.

The DRAM 92BA is a memory circuit for storing paper front face third color (blue) data VDBA, and the memory control section 93BA controls storage and reading out into and from the DRAM 92BA. In particular, the memory control section 93BA is constructed as a DMAC (dynamic memory access control) and controls the DRAM 92BA such that paper front face third color data VDBA sent thereto are stored into the DRAM 92BA and, after paper front face second color data VDGA are received for one full paper sheet, the paper front face third color data VDBA are read out from the DRAM 92BA (also in this instance, read out in units of one bit) between successive storing operations of subsequent paper front face third color data VDBA into the DRAM 92BA.

The read data buffer 94BA temporarily stores paper front face third color data VDBA read out partially from the DRAM 92BA between successive storing operations of paper front face third color data VDBA into the DRAM 92BA and produces collective data to be sent out.

It is to be noted that the the rates at which data are read out from the DRAM 92BA and the read data buffer 94BA are set higher than the transfer rate of front face second color data to the host computer.

The timing production section 95BA produces timing signals VGBA, HGBA and VCLKBA. Also in this instance, the timing signal VGBA is a horizontal direction (direction of a line; main scanning direction) gate signal while the timing signal HGBA is a vertical direction (paper transporting direction; sub scanning direction) gate signal, and in response to those signals, one bit of a picture element in one line of the paper front face second color can be extracted. Further, the timing signal VCLKBA is a clock signal which defines the front face third color data transfer rate. In this instance, the rate of the front face third color timing signal VCLKBA is set higher than those of the front face first color timing signal VCLKRA and the front face second color timing signal VCLKGA. Since the rate of the front face third color timing signal VCLKBA is set in this manner and the data reading out rates from the DRAM 92BA and the read data buffer 94BA are set as described above, front face third color data are transferred at a rate higher than those of front face first color data and front face second color data.

The DRAM 92RB is a memory circuit for storing paper rear face first color (red) data VDRB, and the memory control section 93RB controls storage and reading out into and from the DRAM 92RB. In particular, the memory control section 93RB is constructed as a DMAC (dynamic memory access control) and controls the DRAM 92RB such that paper rear face first color data VDRB sent thereto are stored into the DRAM 92RB and, after paper front face third color data VDBA are received for one full paper sheet, the paper rear face first color data VDRB are read out from the DRAM 92RB (also in this instance, read out in units of one bit) between successive storing operations of subsequent paper rear face first color data VDRB into the DRAM 92RB.

The read data buffer 94RB temporarily stores paper rear face first color data VDRB read out partially from the DRAM 92RB between successive storing operations of paper rear face first color data VDRB into the DRAM 92RB and produces collective data to be sent out.

It is to be noted that the the rates at which data are read out from the DRAM 92RB and the read data buffer 94RB are set higher than the transfer rates of front face first to third color data to the host computer.

The timing production section 95RB produces timing signals VGRB, HGRB and VCLKRB. Also in this instance, the timing signal VGRB is a horizontal direction (direction of a line; main scanning direction) gate signal while the timing signal HGRB is a vertical direction (paper transporting direction; sub scanning direction) gate signal, and in response to those signals, one bit of a picture element in one line of the paper front face second color can be extracted. Further, the rear face first color timing signal VCLKRB is a clock signal which defines the rear face first color data transfer rate. In this instance, the rate of the rear face first color timing signal VCLKRB is set higher than those of the front face first to third color timing signals. Since the rate of the rear face first color timing signal VCLKRB is set in this manner and the data reading out rates from the DRAM 92RB and the read data buffer 94RB are set as described above, rear face first color data are transferred at a rate higher than those of front face first to third color data.

The DRAM 92GB is a memory circuit for storing paper rear face second color (green) data VDGB, and the memory control section 93GB controls storage and reading out into and from the DRAM 92GB. In particular, the memory control section 93GB is constructed as a DMAC (dynamic memory access control) and controls the DRAM 92GB such that paper rear face second color data VDGB sent thereto are stored into the DRAM 92GB and, after paper rear face first color data VDRB are received for one full paper sheet, the paper rear face second color data VDGB are read out from the DRAM 92GB (in this instance, read out in units of one bit) between successive storing operations of subsequent paper rear face second color data VDGB into the DRAM 92GB.

The read data buffer 94GB temporarily stores paper rear face second color data VDGB read out partially from the DRAM 92GB between successive storing operations of paper rear face second color data VDGB into the DRAM 92GB and produces collective data to be sent out.

It is to be noted that the the rates at which data are read out from the DRAM 92GB and the read data buffer 94GB are set higher than the transfer rates of rear face first color data and front face first to third color data to the host computer.

The timing production section 95GB produces timing signals VGGB, HGGB and VCLKGB. Also in this instance, the timing signal VGGB is a horizontal direction (direction of a line; main scanning direction) gate signal while the timing signal HGGB is a vertical direction (paper transporting direction; sub scanning direction) gate signal, and in response to those signals, one bit of a picture element in one line of the paper front face second color can be extracted. Further, the rear face second color timing signal VCLKGB is a clock signal which defines the rear face second color data transfer rate. In this instance, the rate of the rear face second color timing signal VCLKGB is set higher than that of the rear face first color timing signal VCLKRB. Since the rate of the rear face second color timing signal VCLKGB is set in this manner and the data reading out rates from the DRAM 92GB and the read data buffer 94GB are set as described above, rear face second color data are transferred at a rate higher than those of rear face first color data and front face first to third color data.

The DRAM 92BB is a memory circuit for storing paper rear face third color (blue) data VDBB, and the memory control section 93BB controls storage and reading out into and from the DRAM 92BB. In particular, the memory control section 93BB is constructed as a DMAC (dynamic memory access control) and controls the DRAM 92BB such that paper rear face third color data VDBB sent thereto are stored into the DRAM 92BB and, after paper rear face second color data VDGB are received for one full paper sheet, the paper rear face third color data VDBB are read out from the DRAM 92BB (also in this instance, read out in units of one bit) between successive storing operations of subsequent paper rear face third color data VDBB into the DRAM 92BB.

The read data buffer 94BB temporarily stores paper rear face third color data VDBB read out partially from the DRAM 92BB between successive storing operations of paper rear face third color data VDBB into the DRAM 92BB and produces collective data to be sent out.

It is to be noted that the the rates at which data are read out from the DRAM 92BB and the read data buffer 94BB are set higher than the transfer rates of rear face first and second color data and front face first to third color data to the host computer.

The timing production section 96BB produces timing signals VGBB, HGBB and VCLKBB. Also in this instance, the timing signal VGBB is a horizontal direction (direction of a line; main scanning direction) gate signal while the timing signal HGBB is a vertical direction (paper transporting direction; sub scanning direction) gate signal, and in response to those signals, one bit of a picture element in one line of the paper front face second color can be extracted. Further, the rear face third color timing signal VCLKBB is a clock signal which defines the rear face third color data transfer rate. In this instance, the rate of the rear face third color timing signal VCLKBB is set higher than those of the rear face first and second color timing signals and the front face first to third color timing signals. Since the rate of the rear face third color timing signal VCLKBB is set in this manner and the data reading out rates from the DRAM 92BB and the read data buffer 94BB are set as described above, rear face third color data are transferred at a rate higher than those of rear face first and second color data and front face first to third color data.

The selection circuit 96 receives a control signal from the output control circuit 100 and selectively outputs paper front face first to third color data and paper rear face first to third color data. In particular, the selection circuit 96 is switched so that paper front face first to third color data are first transferred successively for one full paper sheet and then paper rear face first to third color data are successively transferred for one full paper sheet.

The output control circuit 100 controls switching of the selection circuit 96 and controls the memory control sections 93GA, 93BA, 93RB, 93GB and 93BB to successively transfer paper front face first to third color data and paper rear face first to third color data from the outputting section 90 to the host computer.

Accordingly, it is recognized that the outputting section 90 includes first storage means (the DRAMs 92GA and 92BA) for storing data from the first optical image reading units 412RA, 412GA and 412BA, and second storage means (the DRAMs 92RB, 92GB and 92BB) for storing data from the second optical image reading units 414RB, 414GB and 414BB.

Also it is recognized that the outputting section 90 includes first data transfer means (the latch circuit 91, memory control sections 93GA and 93BA, timing production sections 95GA and 95BA, selection circuit 96 and so forth) for reading out stored data obtained from ones of the first optical image reading units 412RA, 412GA and 412BA and the second optical image reading units 414RB, 414GB and 414BB at a reading out rate higher than the writing data, at which the stored data were stored, and successively transferring the thus read out data by way of a data transfer line, and second data transfer means (the memory control sections 93RB, 93GB and 93BB, timing production sections 95RB, 95GB and 95BB, selection circuit 96 and so forth) for reading out, after data stored in the first storage means have been transferred by the first data transfer means, stored data obtained from the other ones of the first optical image reading units 412RA, 412GA and 412BA and the second optical image reading units 414RB, 414GB and 414BB at a reading out rate higher than the writing rate, at which the stored data were stored, and successively transferring the thus read out data by way of the data transfer line.

It is to be noted that, in the present embodiment, the transfer rate of paper front face data increases in order of the first to third colors, and also the transfer rate of paper rear face data increases in order of the first to third colors.

Figure 35:
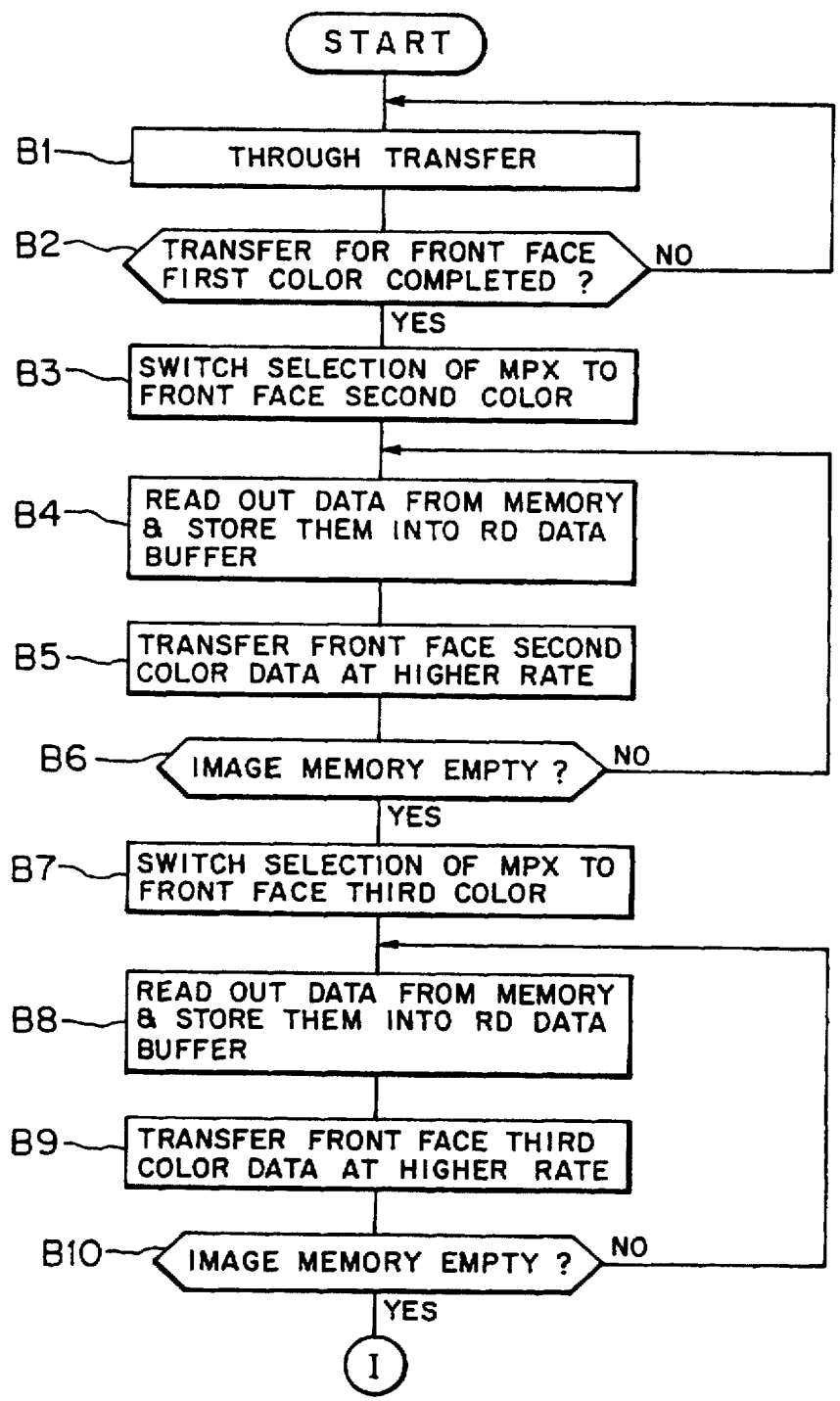
FIGS. 35 and 36 are flow charts illustrating operation of the outputting section and the output control circuit shown in FIG. 34.
Figure 36:
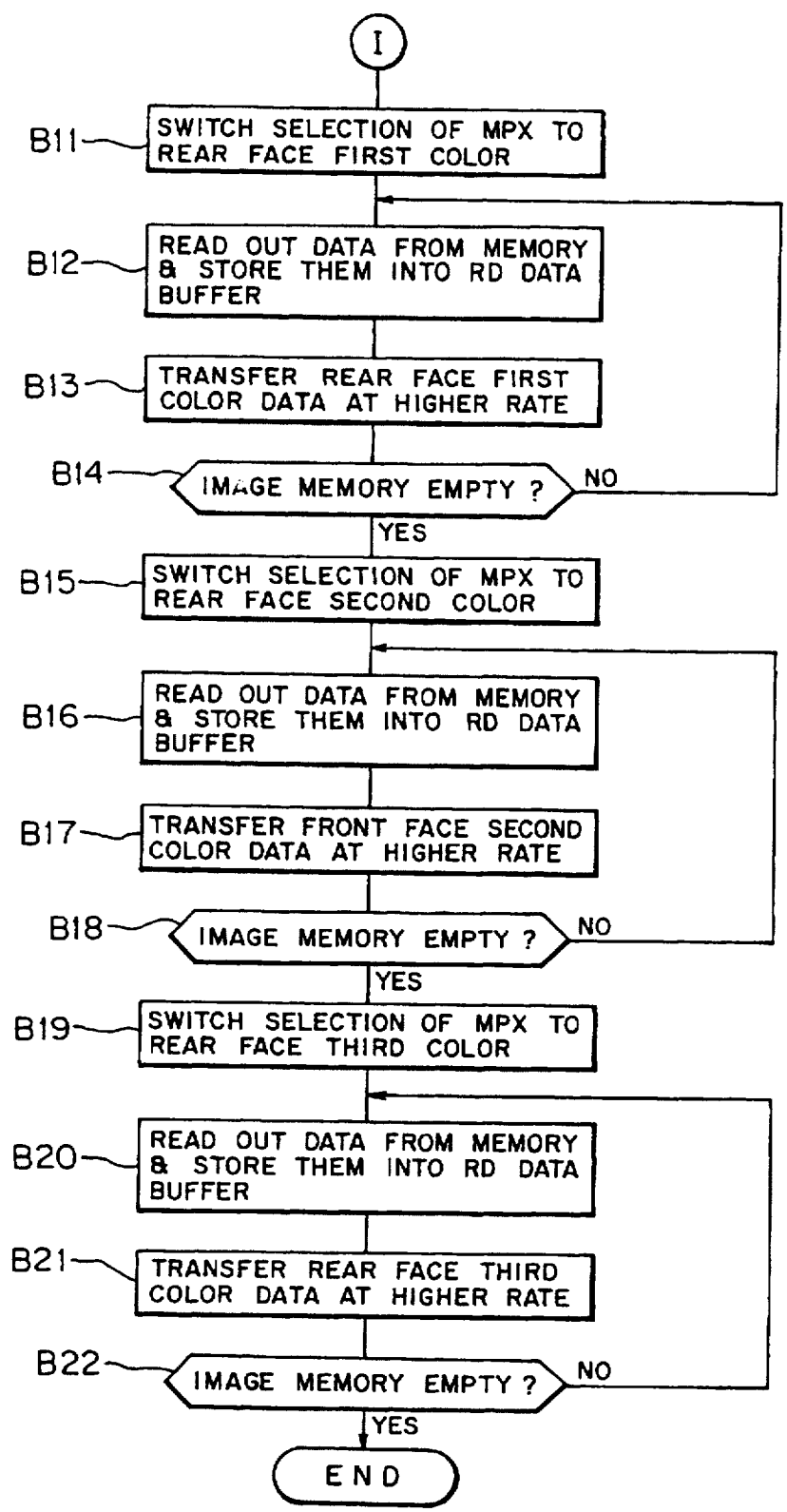

Accordingly, the outputting section 90 operates in such a manner as illustrated in FIGS. 35 and 36.

In particular, referring first to FIG. 35, since the selection circuit 96 initially is in a switched condition to the paper front face first color data side, paper front face first color data are transferred through the outputting section 90 (step B1). Then, if such transfer of front face first color data is completed, then the route of YES is taken at step B2, and the selection circuit 96 is switched to the paper front face second color data side (step B3). Then at step B4, data are read out from the DRAM 92GA and stored into the read data buffer 94GA, and the paper front face second data are transferred at a higher rate (step B5). Then, the operations at steps B4 and B5 are repeated until after the DRAM 92GA becomes empty (step B6).

Thereafter, the selection circuit 96 is switched to the paper front face third color data side (step B7). Then at step B8, data are read out from the DRAM 92BA and stored into the read data buffer 94BA, and the paper front face third color data are transferred at another higher rate (step B9). Then, the operations at step B7 and B8 are repeated until after the DRAM 92BA becomes empty (step B10).

Referring now to FIG. 35, the selection circuit 96 is thereafter switched to the paper rear face first color data side (step B11). Then at step B12, data are read out from the DRAM 92RB and stored into the read data buffer 94RB, and the paper rear face first color data are transferred at a further higher rate (step B13). Then, the operations at steps B12 and B13 are repeated until after the DRAM 92RB becomes empty (step B14).

Then, the selection circuit 96 is switched to the paper rear face second color data side (step B15). Then at step B16, data are read out from the DRAM 92GB and stored into the read data buffer 94GB, and the paper rear face second color data are transferred at a still further higher rate (step B17). Then, the operations at step B16 and B17 are repeated until after the DRAM 92GB becomes empty (step B18).

Thereafter, the selection circuit 96 is switched to the paper rear face third color data (step B19). Then at step B20, data are read out from the DRAM 92BB and stored into the read data buffer 94BB, and the paper rear face third color data are transferred at a yet further higher rate (step B21). Then, the operations at steps B20 and B21 are repeated until after the DRAM 92BB becomes empty (step B22).

Due to the construction described above, paper front face first to third color data and paper rear face first to third color data are successively transferred to the host computer. In this instance, data transferred later in time are transferred at a higher rate.

Accordingly, also in the data processing system of the present embodiment, even if image reading by a later operating image reading unit is started before image reading by a first or earlier operating image reading unit is completed, data during the overlapping period of time can be held with certainty, and besides, data from the later operating image reading unit which are to be transferred later can be transferred rapidly to the host computer side. Consequently, even where the image reading units are disposed in the proximity of the paper transport path in order to achieve minimization, reduction in weight and compaction of the apparatus, data of the front and rear faces of a paper sheet can be transferred to the host computer side before the paper sheet is discharged to the stacking mechanism. Consequently, even if paper sheets are successively transferred at a high speed while achieving minimization, reduction in weight and compaction of the apparatus, data of the front and rear faces of each paper sheet can be read and transferred to the host computer side satisfactorily.

d. Others

It is to be noted that, while, in the data processing systems according to embodiments described above, paper front face data are read and transferred to the host computer prior to paper rear face data, the arrangement of the first optical image reading unit or units and the second optical image reading unit or units may be reversed so that paper rear face data may be read and transferred to the host computer prior to paper front face data.

The present invention is not limited to the specifically described embodiment, and variations and modifications may be made without departing from the scope of the present invention.

What is claimed is:

1. A data transfer method for an image reading apparatus which includes a first optical image reading unit located at a location along a paper transport path for optically reading front face image information from a paper sheet transported along said paper transport path, and a second optical image reading unit located at another location along said paper transport path for optically reading rear face image information from the paper sheet transported along said paper transport path, comprising the steps of:

successively transferring, by way of a data transfer line, data from a first operating image reading unit from one of said first optical image reading unit and said second optical image reading unit from which paper image information is to be read out first; and temporarily storing data from a later operating image reading unit from one of said first optical image reading unit and said second optical image reading unit from which paper image information is to be read out later; and successively transferring, after the data from said first operating image reading unit have been transferred, the stored data from said later operating image reading unit at a rate higher than the transfer rate at which the data from said first operating image reading unit have been transferred.

2. A data transfer method for an image reading apparatus as claimed in claim 1, wherein the data from said later operating image reading unit are stored for one full paper sheet.

3. A data transfer method for an image reading apparatus as claimed in claim 1, wherein the data from said later operating image reading unit are held stored until the data from said later operating image reading unit are permitted to be transferred through said image reading apparatus after outputting of the data from said first operating image reading unit for one full paper sheet has been completed.

4. A data transfer method for an image reading apparatus as claimed in claim 1, wherein completion of transfer of the data from said first operating image reading unit is detected based on paper trailing end detection information.

5. A data transfer apparatus for an image reading apparatus which includes a first optical image reading unit located at a location along a paper transport path for optically reading front face image information from a paper sheet transported along said paper transport path, and a second optical image reading unit located at another location along said paper transport path for optically reading rear face image information from the paper sheet transported along said paper transport path, comprising:

storage means for storing data from a later operating image reading unit from one of said first optical image reading unit and said second optical image reading unit from which paper image information is to be read out later;

first data transfer means for successively transferring, by way of a data transfer line, data from a first operating image reading unit from one of said first optical image reading unit and said-second optical image reading unit from which paper image information is to be read out first; and second data transfer means for successively transferring, after the data from said first operating image reading unit have been transferred by said first data transfer means, the data from said later operating image reading unit stored in said storage means at a rate higher than the data transfer rate at which data are transferred by said first data transfer means by way of said data transfer line.

6. A data transfer apparatus for an image reading apparatus as claimed in claim 5, further comprising auxiliary storage means for storing partial paper image information read out from said storage means between successive writing operations of data into said storage means.

7. An image reading apparatus with a data transfer apparatus, comprising:

a first optical image reading unit located at a location along a paper transport path for optically reading front face image information from a paper sheet transported along said paper transport path;

a second optical image reading unit located at another location along said paper transport path for optically reading rear face image information from the paper sheet transported along said paper transport path; and a data transfer apparatus for transferring paper image information from said first optical image reading unit and said second optical image reading unit;

said data transfer apparatus including storage means for storing data from a later operating image reading unit from one of said first optical image reading unit and said second optical image reading unit from which paper image information is to be read out later, first data transfer means for successively transferring, by way of a data transfer line, data from a first operating image reading unit from one of said first optical image reading unit and said second optical image reading unit from which paper image information is to be read out first, and second data transfer means for successively transferring, after the data from said first operating image reading unit have been transferred by said first data transfer means, the data from said later operating image reading unit stored in said storage means at a rate higher than the data transfer rate at which data are transferred by said first data transfer means by way of said data transfer line.

8. A data transfer method for an image reading apparatus which includes a first optical image reading unit located at a location along a paper transport path for optically reading front face image information from a paper sheet transported along said paper transport path, and a second optical image reading unit located at another location along said paper transport path for optically reading rear face image information from the paper sheet transported along said paper transport path, comprising the steps of:

temporarily storing data from said first optical image reading unit and said second optical image reading unit;

reading out the stored data obtained from one of said first optical image reading unit and said second optical image reading unit at a reading out rate higher than the writing rate at which the stored data have been stored and successively transferring the thus read out data by way of a data transfer line; and reading out the stored data obtained from the other of said first optical image reading unit and said second optical image reading unit at a reading out rate higher than the writing rate at which the stored data have been stored and successively transferring the thus read out data by way of said data transfer line.

9. A data transfer method for an image reading apparatus as claimed in claim 8, wherein a plurality of data are obtained from each of said first optical image reading unit and said second optical image reading unit.

10. A data transfer apparatus for an image reading apparatus which includes a first optical image reading unit located at a location along a paper transport path for optically reading front face image information from a paper sheet transported along said paper transport path, and a second optical image reading unit located at another location along said paper transport path for optically reading rear face image information from the paper sheet transported along said paper transport path, comprising:

first storage means for storing data from said first optical image reading unit;

second storage means for storing data from said second optical image reading unit;

first data transfer means for reading out the stored data obtained from one of said first optical image reading unit and said second optical image reading unit at a reading out rate higher than the writing rate at which the stored data have been stored and successively transferring the thus read out data by way of a data transfer line; and second data transfer means for reading out, after the data stored in said first storage means have been transferred by said first data transfer means, the stored data obtained from the other of said first optical image reading unit and said second optical image reading unit at a reading out rate higher than the writing rate at which the stored data have been stored and successively transferring the thus read out data by way of said data transfer line.

11. An image reading apparatus with a data transfer apparatus, comprising:

a first optical image reading unit located at a location along a paper transport path for optically reading front face image information from a paper sheet transported along said paper transport path;

a second optical image reading unit located at another location along said paper transport path for optically reading rear face image information from the paper sheet transported along said paper transport path; and a data transfer apparatus for transferring paper image information from said first optical image reading unit and said second optical image reading unit;

said data transfer apparatus including first storage means for storing data from said first optical image reading unit, second storage means for storing data from said second optical image reading unit, first data transfer means for reading out the stored data obtained from one of said first optical image reading unit and said second optical image reading unit at a reading out rate higher than the writing rate at which the stored data have been stored and successively transferring the thus read out data by way of a data transfer line, and second data transfer means for reading out, after the data stored in said first storage means have been transferred by said first data transfer means, the stored data obtained from the other of said first optical image reading unit and said second optical image reading unit at a reading out rate higher than the writing rate at which the stored data have been stored and successively transferring the thus read out data by way of said data transfer line.

* * * * *